US006661421B1

(12) United States Patent
Schlapp

(10) Patent No.: US 6,661,421 B1
(45) Date of Patent: Dec. 9, 2003

(54) METHODS FOR OPERATION OF SEMICONDUCTOR MEMORY

(75) Inventor: Elizabeth J. Schlapp, San Jose, CA (US)

(73) Assignee: Mitsubishi Electric & Electronics USA, Inc., Cypress, CA (US)

(*) Notice: Subject to any disclaimer, the term of this patent is extended or adjusted under 35 U.S.C. 154(b) by 0 days.

(21) Appl. No.: 09/264,261

(22) Filed: Mar. 8, 1999

Related U.S. Application Data
(60) Provisional application No. 60/086,554, filed on May 21, 1998.

(51) Int. Cl.[7] .................................................. G06T 1/60
(52) U.S. Cl. ...................... 345/530; 345/501; 345/531; 345/538; 345/546; 382/232; 382/233
(58) Field of Search ................................. 345/501, 530, 345/531, 538, 546; 382/232, 233, 238, 166

(56) References Cited

U.S. PATENT DOCUMENTS

| | | | |
|---|---|---|---|
| 3,394,354 A | 7/1968 | Senzig | 340/172.5 |
| 3,675,218 A | 7/1972 | Sechler | 340/173 |
| 3,848,234 A | 11/1974 | MacDonald | 340/172.5 |
| 4,056,845 A | 11/1977 | Churchill, Jr. | 364/200 |
| 4,086,662 A | 4/1978 | Itoh | 365/189 |
| 4,104,719 A | 8/1978 | Chu et al. | 340/172.5 |
| 4,106,109 A | 8/1978 | Fassbender | 365/238 |
| 4,110,842 A | 8/1978 | Sarkissian et al. | 365/233 |
| 4,156,290 A | 5/1979 | Lanza | 365/230 |
| 4,156,905 A | 5/1979 | Fassbender | 364/200 |
| 4,156,938 A | 5/1979 | Proebsting et al. | 365/63 |

(List continued on next page.)

OTHER PUBLICATIONS

M5M410092 Specification (Rev. 3.11) 3D–RAM Frame Buffer Memory for High–Performance 3–D Graphics, Mitsubishi Electronic Device Group.

Watanabe, "An 8Kbyte Intelligent Cache Memory", 1987 IEEE International Solid–State Circuits Conference Digest of Technical Papers, Feb., 1987.

Scales et al. "The Design and Implementation of the MC68030 Cache Memories", 1987 IEEE International Conference on Computer Design: VLSI in Computers & Processors, Oct. 5–8, 1987.

Smith et al., "A Study of Instruction Cache Organizations and Replacement Policies", Conference Proceedings The $10^{th}$ Annual International Symposium on Computer Architecture.

Smith, "Cache Memories", Computing Surveys, The Survey and Tutorial Journal of the ACM, vol. 14, No. 3, Sep., 1982.

Norton et al, "Using Write Back Cache to Improve Performance of Multiuser Multiprocessors", Proceedings of the 1982 International Conference on Parallel Processing, Aug. 24–27, 1982.

Smith, "Cache Memory Design: An Evolving Art", IEEE Spectrum, vol. 24, No. 12, Dec., 1987.

Goodman, "Using Cache Memory to Reduce Processor–Memory Traffic", Conference Proceedings The $10^{th}$ Annual International Symposium on Computer Architecture.

Hill et al, "Experimental Evaluation of On–Chip Microprocessor Cache Memories", The $11^{th}$ Annual International Symposium on Computer Architecture, Jun. 5–7, 1984.

Hill, "A Case for Direct–Mapped Caches", Computer, Dec. 1988, pp 25–40.

Deering et al, "FBRAM: A New Form of Memory Optimized for 3D Graphics".

*Primary Examiner*—Mark Zimmerman
*Assistant Examiner*—Mackly Monestime

(57) ABSTRACT

Methods for operating a frame buffer memory device are disclosed which provide for accelerated rendering of two-dimensional and three-dimensional images in a computer graphics system One disclosed operation is a method for compressing data to be transmitted from a controller to the memory device and then decompressing the data within the memory device once it has been transmitted and received.

3 Claims, 84 Drawing Sheets

U.S. PATENT DOCUMENTS

| | | | |
|---|---|---|---|
| 4,217,640 A | 8/1980 | Porter et al. | 364/200 |
| 4,355,377 A | 10/1982 | Sud et al. | 365/203 |
| 4,376,972 A | 3/1983 | Johnson et al. | 364/200 |
| 4,381,541 A | 4/1983 | Baumann, Jr. et al. | 364/200 |
| 4,382,278 A | 5/1983 | Appelt | 364/200 |
| 4,489,381 A | 12/1984 | Lavallee et al. | 364/200 |
| 4,493,026 A | 1/1985 | Olnowich | 364/200 |
| 4,495,575 A | 1/1985 | Eguchi | 364/200 |
| 4,542,454 A | 9/1985 | Brcich et al. | 364/200 |
| 4,577,293 A | 3/1986 | Matick et al. | 365/189 |
| 4,616,310 A | 10/1986 | Dill et al. | 364/200 |
| 4,631,660 A | 12/1986 | Woffinden et al. | 364/200 |
| 4,636,987 A | 1/1987 | Norwood et al. | 365/208 |
| 4,644,503 A | 2/1987 | Bantz et al. | 365/230 |
| 4,649,516 A | 3/1987 | Chung et al. | 364/900 |
| 4,672,614 A | 6/1987 | Yoshida | 371/38 |
| 4,725,945 A | 2/1988 | Kronstadt et al. | 364/200 |
| 4,755,974 A | 7/1988 | Yamada et al. | 365/49 |
| 4,797,850 A | 1/1989 | Amitai | 364/900 |
| 4,803,621 A | 2/1989 | Kelly | 364/200 |
| 4,825,411 A | 4/1989 | Hamano | 365/189 |
| 4,860,244 A | 8/1989 | Bruckert et al. | 364/900 |
| 4,894,770 A | 1/1990 | Ward et al. | 364/200 |
| 4,926,385 A | 5/1990 | Fujishima et al. | 365/230 |
| 4,953,164 A | 8/1990 | Asakura et al. | 371/40.1 |
| 4,991,136 A | 2/1991 | Mihara | 365/49 |
| 5,014,240 A | 5/1991 | Suzuki | 365/49 |
| 5,111,386 A | 5/1992 | Fujishima et al. | 395/425 |
| 5,142,671 A | 8/1992 | Ishida et al. | 395/425 |
| 5,179,687 A | 1/1993 | Hidaka et al. | 395/425 |
| 5,184,320 A | 2/1993 | Dye | 365/49 |
| 5,214,610 A | 5/1993 | Houston | 365/233.5 |
| 5,226,009 A | 7/1993 | Arimoto | 365/189.04 |
| 5,226,139 A | 7/1993 | Fujishima et al. | 395/425 |
| 5,226,147 A | 7/1993 | Fujishima et al. | 395/425 |
| 5,361,386 A | 11/1994 | Watkins et al. | 395/130 |
| 5,381,519 A | 1/1995 | Brown et al. | 395/132 |
| 5,408,606 A | 4/1995 | Eckart | 395/163 |
| 5,490,238 A | 2/1996 | Watkins | 395/122 |
| 5,506,604 A * | 4/1996 | Nally et al. | 345/154 |
| 5,544,306 A | 8/1996 | Deering et al. | 395/164 |
| 5,561,745 A | 10/1996 | Jackson et al. | 395/119 |
| 5,574,847 A | 11/1996 | Eckart et al. | 395/505 |
| 5,579,456 A | 11/1996 | Cosman | 395/128 |
| 5,579,473 A | 11/1996 | Schlapp et al. | 395/501 |
| 5,588,130 A | 12/1996 | Fujishima et al. | 395/445 |
| 5,598,517 A | 1/1997 | Watkins | 395/141 |
| 5,651,104 A | 7/1997 | Cosman | 395/128 |
| 5,699,497 A | 12/1997 | Erdahl et al. | 395/128 |
| 5,799,138 A * | 8/1998 | Yoshida | 395/114 |
| 5,862,263 A * | 1/1999 | Kim et al. | 382/249 |
| 6,262,748 B1 * | 7/2001 | Deering et al. | 345/519 |

* cited by examiner

COMPONENTS OF PIXEL ALU

ROP/BLEND UNIT

ROP PORTION

| | | |
|---|---|---|
| inputs | | 1..511 |
| products | 000 | 1..261,121 |
| dither(8) | sssssssssssdddd10000 | -480..480 |
| dither(6) | ssssssssssdddd1000000 | -1920..1920 |
| dither(5) | sssssssssdddd10000000 | -3840..3840 |
| dither(4) | ssssssssdddd100000000 | -7680..7680 |
| sum | | -268,801..529,922 |
| truncate | | -263..517 |
| clamp | | 0..255 |

Eight-bit Blend Unit Calculations

| Y%4 | | 0 | 1 | 2 | 3 |
|---|---|---|---|---|---|
| | 0 | -15/32 | +1/32 | -11/32 | +5/32 |
| | 1 | +9/32 | -7/32 | +13/32 | -3/32 |
| | 2 | -9/32 | +7/32 | -13/32 | +3/32 |
| | 3 | +15/32 | -1/32 | +11/32 | -5/32 |

X%4

| 0 | 1 | 2 | 3 |
|---|---|---|---|
| 10001 | 00001 | 10101 | 00101 |
| 01001 | 11001 | 01101 | 11101 |
| 10111 | 00111 | 10011 | 00011 |
| 01111 | 11111 | 01011 | 11011 |

Dispersed-dot Ordered Dither Algorithm

*FIG. 9*

| | | |
|---|---|---|
| inputs | | 1..2047 |
| products | 0 0 0 | 1..4,190,209 |
| dither(10) | s s s s s s s s s s s d d d d 1 0 0 0 0 0 0 0 | -1920..1920 |
| dither(8) | s s s s s s s s s d d d d 1 0 0 0 0 0 0 0 0 0 | -7680..7680 |
| dither(6) | s s s s s s s d d d d 1 0 0 0 0 0 0 0 0 0 0 0 | -30,720..30,720 |
| dither(5) | s s s s s s d d d d 1 0 0 0 0 0 0 0 0 0 0 0 0 | -61,440..61,440 |
| dither(4) | s s s s s d d d d 1 0 0 0 0 0 0 0 0 0 0 0 0 0 | -122,880..122,880 |
| sum | | -4,313,089..8,503,298 |
| truncate | | -1054..2076 |
| clamp | | 0..1023 |

10-bit Blend Unit Calculations

FIG. 11

DEPTH COMPARE

STENCIL COMPARE

DRAM ARRAY MEMORY CONFIGURATION

PORT BLOCK DIAGRAM

ACCESS PAGE

CP (CHANGE PAGE) COMBINES A PP OPERATION FOLLOWED BY AN AP OPERATION

CHANGE PAGE

IDLE COMMAND

RL, WL, ML, AND CL COMMANDS

FL COMMAND

RL OPERATION

WDAT, BDAT, WREG, BREG
WRITE AND BROADCAST OPERATIONS

MIXED 2-CYCLE READ AND 2-CYCLE WRITE OPERATIONS

MIXED 2-CYCLE READ AND 3-CYCLE WRITE OPERATIONS

MIXED 3-CYCLE READ AND 2-CYCLE WRITE OPERATIONS

MIXED 3-CYCLE READ AND 3-CYCLE WRITE OPERATIONS

FOUR 2-CYCLE READ OPERATIONS

FIG. 48 EIGHT 2-CYCLE DPIX OPERATIONS

FIG. 49  EIGHT 2-CYCLE DPIX OPERATIONS (CONT.)

REGISTER DATA FORMATS

PIXELCONFIG REGISTER DATA FORMAT

STENCILDEPTHCONFIG REGISTER DATA FORMAT

COLOROP[0] REGISTER DATA FORMAT

COLOROP[1] REGISTER DATA FORMAT

CONSTANTCOLOR REGISTER DATA FORMAT

DISPLAYCONFIG REGISTER DATA FORMAT

WREG TO BYTEMASK AND ML OPERATIONS PERFORM FAST FILL

FL OPERATIONS PERFORM REALLY FAST FILL

Color and Depth Accumulators

Color Component Formatting for ROP/Blend Units

SRAM-to-DQ Routing

SRAM-TO-DQ ROUTING: RPIX OPERATION

SRAM-to-DQ Routing

SRAM-to-DQ Routing

SRAM-to-DQ Routing

SRAM-TO-DQ ROUTING: 96 BPP

SRAM-to-DQ Routing

SRAM-TO-DQ ROUTING

SRAM-TO-PIXEL ALU ROUTING

| 255 | 224 | 223 | 192 | 191 | 160 | 159 | 128 |
|---|---|---|---|---|---|---|---|
| 3c | | 2c | | 1c | | 0c | |
| 7c | | 6c | | 5c | | 4c | |
| 11c | | 10c | | 9c | | 8c | |
| 15c | | 14c | | 13c | | 12c | |

| 127 | 96 | 95 | 64 | 63 | 32 | 31 | 0 |
|---|---|---|---|---|---|---|---|
| 3c | | 2c | | 1c | | 0c | |
| 7c | | 6c | | 5c | | 4c | |
| 11c | | 10c | | 9c | | 8c | |
| 15c | | 14c | | 13c | | 12c | |

SRAM Organization 8, 16, 32 bpp

FIG. 81

| 255 | 224 | 223 | 192 | 191 | 160 | 159 | 128 |
|---|---|---|---|---|---|---|---|
| 3de | | 3ab | | 1de | | 1ab | |
| 7de | | 7ab | | 5de | | 5ab | |
| 11de | | 11ab | | 9de | | 9ab | |
| 15de | | 15ab | | 13de | | 13ab | |

| 127 | 96 | 95 | 64 | 63 | 32 | 31 | 0 |
|---|---|---|---|---|---|---|---|
| 2de | | 2ab | | 0de | | 0ab | |
| 6de | | 6ab | | 4de | | 4ab | |
| 10de | | 10ab | | 8de | | 8ab | |
| 14de | | 14ab | | 12de | | 12ab | |

SRAM Organization 64 bpp

FIG. 82

| 255 | 224 | 223 | 192 | 191 | 160 | 159 | 128 |
|---|---|---|---|---|---|---|---|
| 0de | | 1de | | 1b | | 1a | |
| 2de | | 3de | | 3b | | 3a | |
| 8de | | 9de | | 9b | | 9a | |
| 10de | | 11de | | 11b | | 11a | |

| 127 | 96 | 95 | 64 | 63 | 32 | 31 | 0 |
|---|---|---|---|---|---|---|---|
| 2b | | 2a | | 0b | | 0a | |
| ///// | | 4de | | 4b | | 4a | |
| 10b | | 10a | | 8b | | 8a | |
| ///// | | 12de | | 12b | | 12a | |

SRAM Organization 96 bpp

FIG. 83

| 255 | 224 | 223 | 192 | 191 | 160 | 159 | 128 |
|---|---|---|---|---|---|---|---|
| 2e | | 2d | | 2b | | 2a | |
| 6e | | 6d | | 6b | | 6a | |
| 10e | | 10d | | 10b | | 10a | |
| 14e | | 14d | | 14b | | 14a | |

| 127 | 96 | 95 | 64 | 63 | 32 | 31 | 0 |
|---|---|---|---|---|---|---|---|
| 0e | | 0d | | 0b | | 0a | |
| 4e | | 4d | | 4b | | 4a | |
| 8e | | 8d | | 8b | | 8a | |
| 12e | | 12d | | 12b | | 12a | |

SRAM Organization 128 bpp

Unpack Functions

UnpackWid

PIXEL ALU-TO-SRAM ROUTING

PIXEL ALU-TO-SRAM MASK GENERATION 8 bpp Display Mapping

8 bpp Cache Line Organization for RPIX, SPIX, DPIX

FIG. 95

|  | 71 64 | 63 56 | 55 48 | 47 40 | 39 32 | 31 24 | 23 16 | 15 8 | 7 0 |
|---|---|---|---|---|---|---|---|---|---|
| RDAT 0 |  | 7 | 6 | 5 | 4 | 3 | 2 | 1 | 0 |
| RDAT 1 |  | 15 | 14 | 13 | 12 | 11 | 10 | 9 | 8 |
| RDAT 2 |  | 23 | 22 | 21 | 20 | 19 | 18 | 17 | 16 |
| RDAT 3 |  | 31 | 30 | 29 | 28 | 27 | 26 | 25 | 24 |
| RDAT 4 |  | 39 | 38 | 37 | 36 | 35 | 34 | 33 | 32 |
| RDAT 5 |  | 47 | 46 | 45 | 44 | 43 | 42 | 41 | 40 |
| RDAT 6 |  | 55 | 54 | 53 | 52 | 51 | 50 | 49 | 48 |
| RDAT 7 |  | 63 | 62 | 61 | 60 | 59 | 58 | 57 | 56 |
| RDAT 8 |  | 71 | 70 | 69 | 68 | 67 | 66 | 65 | 64 |
| RDAT 9 |  | 79 | 78 | 77 | 76 | 75 | 74 | 73 | 72 |
| RDAT 10 |  | 87 | 86 | 85 | 84 | 83 | 82 | 81 | 80 |
| RDAT 11 |  | 95 | 94 | 93 | 92 | 91 | 90 | 89 | 88 |
| RDAT 12 |  | 103 | 102 | 101 | 100 | 99 | 98 | 97 | 96 |
| RDAT 13 |  | 111 | 110 | 109 | 108 | 107 | 106 | 105 | 104 |
| RDAT 14 |  | 119 | 118 | 117 | 116 | 115 | 114 | 113 | 112 |
| RDAT 15 |  | 127 | 126 | 125 | 124 | 123 | 122 | 121 | 120 |

8 bpp Cache Line Organization Using RDAT

*FIG. 96*

8 bpp Pixel Format

8 BPP DISPLAY REFRESH

16 BPP DISPLAY MAPPING

| 127 | 112 | 111 | 96 | 95 | 80 | 79 | 64 | 63 | 48 | 47 | 32 | 31 | 16 | 15 | 0 |
|---|---|---|---|---|---|---|---|---|---|---|---|---|---|---|---|
| 15 | P13 | 0 15 | P12 | 0 15 | P9 | 0 15 | P8 | 0 15 | P5 | 0 15 | P4 | 0 15 | P1 | 0 15 | P0 0 |
| 15 | P29 | 0 15 | P28 | 0 15 | P25 | 0 15 | P24 | 0 15 | P21 | 0 15 | P20 | 0 15 | P17 | 0 15 | P16 0 |
| 15 | P45 | 0 15 | P44 | 0 15 | P41 | 0 15 | P40 | 0 15 | P37 | 0 15 | P36 | 0 15 | P33 | 0 15 | P32 0 |
| 15 | P61 | 0 15 | P60 | 0 15 | P57 | 0 15 | P56 | 0 15 | P53 | 0 15 | P52 | 0 15 | P49 | 0 15 | P48 0 |

| 255 | 240 | 239 | 224 | 223 | 208 | 207 | 192 | 191 | 176 | 175 | 160 | 159 | 144 | 143 | 128 |
|---|---|---|---|---|---|---|---|---|---|---|---|---|---|---|---|
| 15 | P15 | 0 15 | P14 | 0 15 | P11 | 0 15 | P10 | 0 15 | P7 | 0 15 | P6 | 0 15 | P3 | 0 15 | P2 0 |
| 15 | P31 | 0 15 | P30 | 0 15 | P27 | 0 15 | P26 | 0 15 | P23 | 0 15 | P22 | 0 15 | P19 | 0 15 | P18 0 |
| 15 | P47 | 0 15 | P46 | 0 15 | P43 | 0 15 | P42 | 0 15 | P39 | 0 15 | P38 | 0 15 | P35 | 0 15 | P34 0 |
| 15 | P63 | 0 15 | P62 | 0 15 | P59 | 0 15 | P58 | 0 15 | P55 | 0 15 | P54 | 0 15 | P51 | 0 15 | P50 0 |

CACHE LINE ORGANIZATION FOR RPIX, SPIX, DPIX

|       | 71 64 | 63 56 | 55 48 | 47 40 | 39 32 | 31 24 | 23 16 | 15 8 | 7 0 |
|-------|-------|-------|-------|-------|-------|-------|-------|------|-----|
| RDAT 0  | // | 15 P3 0 | 15 P2 0 | // | 15 P1 0 | 15 P0 0 |
| RDAT 1  | // | 15 P7 0 | 15 P6 0 | // | 15 P5 0 | 15 P4 0 |
| RDAT 2  | // | 15 P11 0 | 15 P10 0 | // | 15 P9 0 | 15 P8 0 |
| RDAT 3  | // | 15 P15 0 | 15 P14 0 | // | 15 P13 0 | 15 P12 0 |
| RDAT 4  | // | 15 P19 0 | 15 P18 0 | // | 15 P17 0 | 15 P16 0 |
| RDAT 5  | // | 15 P23 0 | 15 P22 0 | // | 15 P21 0 | 15 P20 0 |
| RDAT 6  | // | 15 P27 0 | 15 P26 0 | // | 15 P25 0 | 15 P24 0 |
| RDAT 7  | // | 15 P31 0 | 15 P30 0 | // | 15 P29 0 | 15 P28 0 |
| RDAT 8  | // | 15 P35 0 | 15 P34 0 | // | 15 P33 0 | 15 P32 0 |
| RDAT 9  | // | 15 P39 0 | 15 P38 0 | // | 15 P37 0 | 15 P36 0 |
| RDAT 10 | // | 15 P43 0 | 15 P42 0 | // | 15 P41 0 | 15 P40 0 |
| RDAT 11 | // | 15 P47 0 | 15 P46 0 | // | 15 P45 0 | 15 P44 0 |
| RDAT 12 | // | 15 P51 0 | 15 P50 0 | // | 15 P49 0 | 15 P48 0 |
| RDAT 13 | // | 15 P55 0 | 15 P54 0 | // | 15 P53 0 | 15 P52 0 |
| RDAT 14 | // | 15 P59 0 | 15 P58 0 | // | 15 P57 0 | 15 P56 0 |
| RDAT 15 | // | 15 P63 0 | 15 P62 0 | // | 15 P61 0 | 15 P60 0 |

16 BPP CACHE LINE ORGANIZATION USING RDAT

FIG. 101

| 15 | 8 | 7 | 0 |
|----|---|---|---|
| α | R | G | B |

16 BPP PIXEL FORMAT 4:4:4:4

FIG. 102

| 71 64 | 63 56 | 55 48 | 47 40 | 39 32 | 31 24 | 23 16 | 15 8 | 7 0 |
|-------|-------|-------|-------|-------|-------|-------|------|-----|
| // | α | R | G | B | α | R | G | B | // | α | R | G | B | α | R | G | B |

16 BPP DISPLAY REFRESH 4:4:4:4

FIG. 103

16 BPP PIXEL FORMAT 5:6:5

16 BPP DISPLAY REFRESH 5:6:5

16 BPP PIXEL FORMAT 1:5:5:5

16 BPP DISPLAY REFRESH 1:5:5:5

32 BPP DISPLAY MAPPING

| 127 | 112 | 111 | 96 | 95 | 80 | 79 | 64 | 63 | 48 | 47 | 32 | 31 | 16 | 15 | 0 |
|---|---|---|---|---|---|---|---|---|---|---|---|---|---|---|---|
| 31 | PIXEL 6 | | 0 | 31 | PIXEL 4 | | 0 | 31 | PIXEL 2 | | 0 | 31 | PIXEL 0 | | 0 |
| 31 | PIXEL 14 | | 0 | 31 | PIXEL 12 | | 0 | 31 | PIXEL 10 | | 0 | 31 | PIXEL 8 | | 0 |
| 31 | PIXEL 22 | | 0 | 31 | PIXEL 20 | | 0 | 31 | PIXEL 18 | | 0 | 31 | PIXEL 16 | | 0 |
| 31 | PIXEL 30 | | 0 | 31 | PIXEL 28 | | 0 | 31 | PIXEL 26 | | 0 | 31 | PIXEL 24 | | 0 |

| 255 | 240 | 239 | 224 | 223 | 208 | 207 | 192 | 191 | 176 | 175 | 160 | 159 | 144 | 143 | 128 |
|---|---|---|---|---|---|---|---|---|---|---|---|---|---|---|---|
| 63 | PIXEL 7 | | 32 | 63 | PIXEL 5 | | 32 | 63 | PIXEL 3 | | 32 | 63 | PIXEL 1 | | 32 |
| 63 | PIXEL 15 | | 32 | 63 | PIXEL 13 | | 32 | 63 | PIXEL 11 | | 32 | 63 | PIXEL 9 | | 32 |
| 63 | PIXEL 23 | | 32 | 63 | PIXEL 21 | | 32 | 63 | PIXEL 19 | | 32 | 63 | PIXEL 17 | | 32 |
| 63 | PIXEL 31 | | 32 | 63 | PIXEL 29 | | 32 | 63 | PIXEL 27 | | 32 | 63 | PIXEL 25 | | 32 |

32 BPP CACHE LINE ORGANIZATION FOR RPIX, SPIX, DPIX

FIG. 109

| | 71 | 64 | 63 | 56 | 55 | 48 | 47 | 40 | 39 | 32 | 31 | 24 | 23 | 16 | 15 | 8 | 7 | 0 |
|---|---|---|---|---|---|---|---|---|---|---|---|---|---|---|---|---|---|---|
| RDAT 0 | | | 31 | | PIXEL 1 | | | 0 | | | 31 | | PIXEL 0 | | | | 0 |
| RDAT 1 | | | 31 | | PIXEL 3 | | | 0 | | | 31 | | PIXEL 2 | | | | 0 |
| RDAT 2 | | | 31 | | PIXEL 5 | | | 0 | | | 31 | | PIXEL 4 | | | | 0 |
| RDAT 3 | | | 31 | | PIXEL 7 | | | 0 | | | 31 | | PIXEL 6 | | | | 0 |
| RDAT 4 | | | 31 | | PIXEL 9 | | | 0 | | | 31 | | PIXEL 8 | | | | 0 |
| RDAT 5 | | | 31 | | PIXEL 11 | | | 0 | | | 31 | | PIXEL 10 | | | | 0 |
| RDAT 6 | | | 31 | | PIXEL 13 | | | 0 | | | 31 | | PIXEL 12 | | | | 0 |
| RDAT 7 | | | 31 | | PIXEL 15 | | | 0 | | | 31 | | PIXEL 14 | | | | 0 |
| RDAT 8 | | | 31 | | PIXEL 17 | | | 0 | | | 31 | | PIXEL 16 | | | | 0 |
| RDAT 9 | | | 31 | | PIXEL 19 | | | 0 | | | 31 | | PIXEL 18 | | | | 0 |
| RDAT 10 | | | 31 | | PIXEL 21 | | | 0 | | | 31 | | PIXEL 20 | | | | 0 |
| RDAT 11 | | | 31 | | PIXEL 23 | | | 0 | | | 31 | | PIXEL 22 | | | | 0 |
| RDAT 12 | | | 31 | | PIXEL 25 | | | 0 | | | 31 | | PIXEL 24 | | | | 0 |
| RDAT 13 | | | 31 | | PIXEL 27 | | | 0 | | | 31 | | PIXEL 26 | | | | 0 |
| RDAT 14 | | | 31 | | PIXEL 29 | | | 0 | | | 31 | | PIXEL 28 | | | | 0 |
| RDAT 15 | | | 31 | | PIXEL 31 | | | 0 | | | 31 | | PIXEL 30 | | | | 0 |

32 BPP CACHE LINE ORGANIZATION USING RDAT

FIG. 110

32 BPP PIXEL FORMAT 8:8:8:8

32 BPP DISPLAY REFRESH 8:8:8:8

32 BPP PIXEL FORMAT 10:10:10

RGB 2:10:10:10 DISPLAY REFRESH

64 BPP DISPLAY MAPPING

| | 127 | 112 | 111 | 96 | 95 | 80 | 79 | 64 | 63 | 48 | 47 | 32 | 31 | 16 | 15 | 0 |
|---|---|---|---|---|---|---|---|---|---|---|---|---|---|---|---|---|
| | 63 | | | PIXEL 2 | | | | 0 | 63 | | | PIXEL 0 | | | | 0 |
| | 63 | | | PIXEL 6 | | | | 0 | 63 | | | PIXEL 4 | | | | 0 |
| | 63 | | | PIXEL 10 | | | | 0 | 63 | | | PIXEL 8 | | | | 0 |
| | 63 | | | PIXEL 14 | | | | 0 | 63 | | | PIXEL 12 | | | | 0 |

| | 255 | 240 | 239 | 224 | 223 | 208 | 207 | 192 | 191 | 176 | 175 | 160 | 159 | 144 | 143 | 128 |
|---|---|---|---|---|---|---|---|---|---|---|---|---|---|---|---|---|
| | 63 | | | PIXEL 3 | | | | 0 | 63 | | | PIXEL 1 | | | | 0 |
| | 63 | | | PIXEL 7 | | | | 0 | 63 | | | PIXEL 5 | | | | 0 |
| | 63 | | | PIXEL 11 | | | | 0 | 63 | | | PIXEL 9 | | | | 0 |
| | 63 | | | PIXEL 15 | | | | 0 | 63 | | | PIXEL 13 | | | | 0 |

64 BPP CACHE LINE ORGANIZATION FOR RPIX, SPIX, DPIX

FIG. 116

| | 71 | 64 | 63 | 56 | 55 | 48 | 47 | 40 | 39 | 32 | 31 | 24 | 23 | 16 | 15 | 8 | 7 | 0 |
|---|---|---|---|---|---|---|---|---|---|---|---|---|---|---|---|---|---|---|
| RDAT 0 | | | 31 | | PIXEL 1 | | | | 0 | | 31 | | PIXEL 0 | | | | | 0 |
| RDAT 1 | | | 63 | | PIXEL 1 | | | | 32 | | 63 | | PIXEL 0 | | | | | 32 |
| RDAT 2 | | | 31 | | PIXEL 3 | | | | 0 | | 31 | | PIXEL 2 | | | | | 0 |
| RDAT 3 | | | 63 | | PIXEL 3 | | | | 32 | | 63 | | PIXEL 2 | | | | | 32 |
| RDAT 4 | | | 31 | | PIXEL 5 | | | | 0 | | 31 | | PIXEL 4 | | | | | 0 |
| RDAT 5 | | | 63 | | PIXEL 5 | | | | 32 | | 63 | | PIXEL 4 | | | | | 32 |
| RDAT 6 | | | 31 | | PIXEL 7 | | | | 0 | | 31 | | PIXEL 6 | | | | | 0 |
| RDAT 7 | | | 63 | | PIXEL 7 | | | | 32 | | 63 | | PIXEL 6 | | | | | 32 |
| RDAT 8 | | | 31 | | PIXEL 9 | | | | 0 | | 31 | | PIXEL 8 | | | | | 0 |
| RDAT 9 | | | 63 | | PIXEL 9 | | | | 32 | | 63 | | PIXEL 8 | | | | | 32 |
| RDAT 10 | | | 31 | | PIXEL 11 | | | | 0 | | 31 | | PIXEL 10 | | | | | 0 |
| RDAT 11 | | | 63 | | PIXEL 11 | | | | 32 | | 63 | | PIXEL 10 | | | | | 32 |
| RDAT 12 | | | 31 | | PIXEL 13 | | | | 0 | | 31 | | PIXEL 12 | | | | | 0 |
| RDAT 13 | | | 63 | | PIXEL 13 | | | | 32 | | 63 | | PIXEL 12 | | | | | 32 |
| RDAT 14 | | | 31 | | PIXEL 15 | | | | 0 | | 31 | | PIXEL 14 | | | | | 0 |
| RDAT 15 | | | 63 | | PIXEL 15 | | | | 32 | | 63 | | PIXEL 14 | | | | | 32 |

64 BPP CACHE LINE ORGANIZATION USING RDAT

FIG. 117

64 BPP PIXEL FORMAT 4:8:8:8:8
FIG. 118
64 BPP DISPLAY REFRESH 4:8:8:8:8
FIG. 119
64 BPP PIXEL FORMAT 2:10:10:10
FIG. 120
64 BPP DISPLAY REFRESH 4:10:10:10
FIG. 121
64 BPP PIXEL FORMAT 4:28:2*(4:4:4:4)
FIG. 122

64 BPP DISPLAY REFRESH 4:28:2*(4:4:4:4)

64 BPP PIXEL FORMAT 4:4:24:2*(4:4:4:4)

64 BPP DISPLAY REFRESH 4:4:24:2*(4:4:4:4)

64 BPP PIXEL FORMAT 4:28:2*(5:6:5)

64 BPP DISPLAY REFRESH 4:28:2*(5:6:5)

64 BPP PIXEL FORMAT 4:4:24:2*(5:6:5)

64 bpp Display Refresh 4:4:24:2*(5:6:5)

64 bpp Pixel Format 4:28:2*(1:5:5:5)

64 bpp Display Refresh 4:28:2*(1:5:5:5)

64 bpp Pixel Format 4:4:24:2*(1:5:5:5)

64 bpp Display Refresh 4:4:24:2*(1:5:5:5)

96 bpp Display Mapping

| 127 | 112\|111 | 96\|95 | 80\|79 | 64\|63 | 48\|47 | 32\|31 | 16\|15 | 0 |
|---|---|---|---|---|---|---|---|---|
| 63 | Pixel 2 | | | 0\|63 | Pixel 0 | | | 0 |
| ///// | | 95 | Pixel 4 | | | | | 0 |
| 63 | Pixel 10 | | | 0\|63 | Pixel 8 | | | 0 |
| ///// | | 95 | Pixel 12 | | | | | 0 |

| 255 | 240\|239 | 224\|223 | 208\|207 | 192\|191 | 176\|175 | 160\|159 | 144\|143 | 128 |
|---|---|---|---|---|---|---|---|---|
| 95 | Pixel 0 | 64\|95 | | Pixel 1 | | | | 0 |
| 95 | Pixel 2 | 64\|95 | | Pixel 3 | | | | 0 |
| 95 | Pixel 8 | 64\|95 | | Pixel 9 | | | | 0 |
| 95 | Pixel 10 | 64\|95 | | Pixel 11 | | | | 0 |

96 bpp Cache Line Organization for RPIX, SPIX, DPIX

| | 71 | 64\|63 | 56\|55 | 48\|47 | 40\|39 | 32\|31 | 24\|23 | 16\|15 | 8\|7 | 0 |
|---|---|---|---|---|---|---|---|---|---|---|
| RDAT 0 | | 31 | | Pixel 1 | | 0 | 31 | | Pixel 0 | 0 |
| RDAT 1 | | 63 | | Pixel 1 | | 32 | 63 | | Pixel 0 | 32 |
| RDAT 2 | | 95 | | Pixel 1 | | 64 | 31 | | Pixel 2 | 0 |
| RDAT 3 | | 95 | | Pixel 0 | | 64 | 63 | | Pixel 2 | 32 |
| RDAT 4 | | 31 | | Pixel 3 | | 0 | 31 | | Pixel 4 | 0 |
| RDAT 5 | | 63 | | Pixel 3 | | 32 | 63 | | Pixel 4 | 32 |
| RDAT 6 | | 95 | | Pixel 3 | | 64 | 95 | | Pixel 4 | 64 |
| RDAT 7 | | 95 | | Pixel 2 | | 64 | | | | |
| RDAT 8 | | 31 | | Pixel 9 | | 0 | 31 | | Pixel 8 | 0 |
| RDAT 9 | | 63 | | Pixel 9 | | 32 | 63 | | Pixel 8 | 32 |
| RDAT 10 | | 95 | | Pixel 9 | | 64 | 31 | | Pixel 10 | 0 |
| RDAT 11 | | 95 | | Pixel 8 | | 64 | 63 | | Pixel 10 | 32 |
| RDAT 12 | | 31 | | Pixel 11 | | 0 | 31 | | Pixel 12 | 0 |
| RDAT 13 | | 63 | | Pixel 11 | | 32 | 63 | | Pixel 12 | 32 |
| RDAT 14 | | 95 | | Pixel 11 | | 64 | 95 | | Pixel 12 | 64 |
| RDAT 15 | | 95 | | Pixel 10 | | 64 | | | | |

96 bpp Cache Line Organization Using RDAT

FIG. 136

| 95 | 80\|79 | 64\|63 | 48\|47 | 32\|31 | 16\|15 | 0 |
|---|---|---|---|---|---|---|
| W | Z/S | Ob \| Rb | Gb \| Bb | Oa \| Ra | Ga \| Ba | |

96 bpp Pixel Format 4:28:2*(8:8:8:8)

FIG. 137

| 107\|103 | 96\|95 | 88\|87 | 80\|79 | 72\|71 | 64\|63 | 56\|55 | 48\|47 | 40\|39 | 32\|31 | 24\|23 | 16\|15 | 8\|7 | 0 |
|---|---|---|---|---|---|---|---|---|---|---|---|---|---|
| WID | | Over | R | G | G | B | | WID | | Over | R | G | B |
| | | | | | | | | WID | | Over | R | G | B |

96 bpp Display Refresh 4:28:2*(8:8:8:8)

FIG. 138

| 95 | 80 | 79 | 64 | 63 | 48 | 47 | 32 | 31 | 16 | 15 | 0 |
|---|---|---|---|---|---|---|---|---|---|---|---|
| W | | Z/S | | αb | Rb | Gb | Bb | αa | Ra | Ga | Ba |

96 bpp Pixel Format 4:28:2*(8:8:8:8)

FIG. 139

| 107 | 103 | 96 | 95 | 88 | 87 | 80 | 79 | 72 | 71 | 64 | 63 | 56 | 55 | 48 | 47 | 40 | 39 | 32 | 31 | 24 | 23 | 16 | 15 | 8 | 7 | 0 |
|---|---|---|---|---|---|---|---|---|---|---|---|---|---|---|---|---|---|---|---|---|---|---|---|---|---|---|
| WID | | | | | | α | | R | | G | G | B | | | WID | | | | α | | R | | G | | | B |
| | | | | | | | | | | | | | | | WID | | | | α | | R | | G | | | B |

96 bpp Display Refresh 4:28:2*(8:8:8:8)

FIG. 140

| 95 | 80 | 79 | 64 | 63 | 48 | 47 | 32 | 31 | 16 | 15 | 0 |
|---|---|---|---|---|---|---|---|---|---|---|---|
| W | O | Z/S | | αb | Rb | Gb | Bb | αa | Ra | Ga | Ba |

96 bpp Pixel Format 4:4:24:2*(8:8:8:8)

FIG. 141

| 107 | 103 | 96 | 95 | 88 | 87 | 80 | 79 | 72 | 71 | 64 | 63 | 56 | 55 | 48 | 47 | 40 | 39 | 32 | 31 | 24 | 23 | 16 | 15 | 8 | 7 | 0 |
|---|---|---|---|---|---|---|---|---|---|---|---|---|---|---|---|---|---|---|---|---|---|---|---|---|---|---|
| WID | O | | | | | α | | R | | G | G | B | | | WID | O | | | α | | R | | G | | | B |
| | | | | | | | | | | | | | | | WID | O | | | α | | R | | G | | | B |

96 bpp Display Refresh 4:4:24:2*(8:8:8:8)

FIG. 142

| 95 | 80|79 | 64|63 | 48|47 | 32|31 | 16|15 | 0 |
|---|---|---|---|---|---|---|
| W | Z/S | | Rb | Gb | Bb | Ra | Ga | Ba |

96 bpp Pixel Format 4:28:2*(2:10:10:10)

FIG. 143

96 bpp Display Refresh 4:28:2*(2:10:10:10)

FIG. 144

| 95 | 80|79 | 64|63 | 48|47 | 32|31 | 16|15 | 0 |
|---|---|---|---|---|---|---|---|
| W | O | Z/S | | Rb | Gb | Bb | Ra | Ga | Ba |

96 bpp Pixel Format 4:4:24:2*(10:10:10)

FIG. 145

96 bpp Display Refresh 4:4:24:2*(10:10:10)

FIG. 146

96 bpp Pixel Format 4:4:24:4*(4:4:4:4)

96 bpp Display Refresh 4:4:24:4*(4:4:4:4)

128 bpp Display Mapping

| | 127 | 112\|111 | 96\|95 | 80\|79 | 64\|63 | 48\|47 | 32\|31 | 16\|15 | 0 |
|---|---|---|---|---|---|---|---|---|---|
| | 127 | | | | Pixel 0 | | | | 0 |
| | 127 | | | | Pixel 4 | | | | 0 |
| | 127 | | | | Pixel 8 | | | | 0 |
| | 127 | | | | Pixel 12 | | | | 0 |

| | 255 | 240\|239 | 224\|223 | 208\|207 | 192\|191 | 176\|175 | 160\|159 | 144\|143 | 128 |
|---|---|---|---|---|---|---|---|---|---|
| | 127 | | | | Pixel 2 | | | | 0 |
| | 127 | | | | Pixel 6 | | | | 0 |
| | 127 | | | | Pixel 10 | | | | 0 |
| | 127 | | | | Pixel 14 | | | | 0 |

128 bpp Cache Line Organization for RPIX, SPIX, DPIX

FIG. 150

| | 71 | 64\|63 | 56\|55 | 48\|47 | 40\|39 | 32\|31 | 24\|23 | 16\|15 | 8\|7 | 0 |
|---|---|---|---|---|---|---|---|---|---|---|
| RDAT 0 | | 31 | | Pixel 2 | | 0 | 31 | | Pixel 0 | 0 |
| RDAT 1 | | 63 | | Pixel 2 | | 32 | 63 | | Pixel 0 | 32 |
| RDAT 2 | | 95 | | Pixel 2 | | 64 | 95 | | Pixel 0 | 64 |
| RDAT 3 | | 127 | | Pixel 2 | | 96 | 127 | | Pixel 0 | 96 |
| RDAT 4 | | 31 | | Pixel 6 | | 0 | 31 | | Pixel 4 | 0 |
| RDAT 5 | | 63 | | Pixel 6 | | 32 | 63 | | Pixel 4 | 32 |
| RDAT 6 | | 95 | | Pixel 6 | | 64 | 95 | | Pixel 4 | 64 |
| RDAT 7 | | 127 | | Pixel 6 | | 96 | 127 | | Pixel 4 | 96 |
| RDAT 8 | | 31 | | Pixel 10 | | 0 | 31 | | Pixel 8 | 0 |
| RDAT 9 | | 63 | | Pixel 10 | | 32 | 63 | | Pixel 8 | 32 |
| RDAT 10 | | 95 | | Pixel 10 | | 64 | 95 | | Pixel 8 | 64 |
| RDAT 11 | | 127 | | Pixel 10 | | 96 | 127 | | Pixel 8 | 96 |
| RDAT 12 | | 31 | | Pixel 14 | | 0 | 31 | | Pixel 12 | 0 |
| RDAT 13 | | 63 | | Pixel 14 | | 32 | 63 | | Pixel 12 | 32 |
| RDAT 14 | | 95 | | Pixel 14 | | 64 | 95 | | Pixel 12 | 64 |
| RDAT 15 | | 127 | | Pixel 14 | | 96 | 127 | | Pixel 12 | 96 |

128 bpp Cache Line Organization Using RDAT

FIG. 151

| 127 | 112\|111 | 96\|95 | 80\|79 | 64\|63 | 48\|47 | 32\|31 | 16\|15 | 0 |
|---|---|---|---|---|---|---|---|---|
| WID | S | Ob\|Oa | Z | αb\|Rb | Gb\|Bb | αa\|Ra | Ga\|Ba | |

128 bpp Pixel Format 8:32:8:2*(8:8:8:8:8)

FIG. 152

| 107\|103 | 96\|95 | 88\|87 | 80\|79 | 72\|71 | 64\|63 | 56\|55 | 48\|47 | 40\|39 | 32\|31 | 24\|23 | 16\|15 | 8\|7 | 0 |
|---|---|---|---|---|---|---|---|---|---|---|---|---|---|
| WID | Over | α | R | G\|G | B | ///// | WID | O\|O | α | R | G | B | |

128 bpp Display Refresh 8:32:8:2*(8:8:8:8:8)

FIG. 153

| 127 | 112\|111 | 96\|95 | 80\|79 | 64\|63 | 48\|47 | 32\|31 | 16\|15 | 0 |
|---|---|---|---|---|---|---|---|---|
| WID | S | Ob\|Oa | Z | Rb | Gb\|Bb | Ra | Ga | Ba |

128 bpp Pixel Format 8:32:8:2*(8:2:10:10:10)

FIG. 154

| 107\|103 | 96\|95 | 88\|87 | 80\|79 | 72\|71 | 64\|63 | 56\|55 | 48\|47 | 40\|39 | 32\|31 | 24\|23 | 16\|15 | 8\|7 | 0 |
|---|---|---|---|---|---|---|---|---|---|---|---|---|---|
| WID | Over | R | G | B | ///// | WID | O\|O | R | G | B | | | |

128 bpp Display Refresh 8:32:8:2*(8:10:10:10)

FIG. 155

| 127 | 112\|111 | 96\|95 | 80\|79 | 64\|63 | 48\|47 | 32\|31 | 16\|15 | 0 |
|---|---|---|---|---|---|---|---|---|
| WID | S | αb\|αa | Z | Rb | Gb\|Bb | Ra | Ga | Ba |

128 bpp Pixel Format 8:8:32:2*(10:10:10:10)

FIG. 156

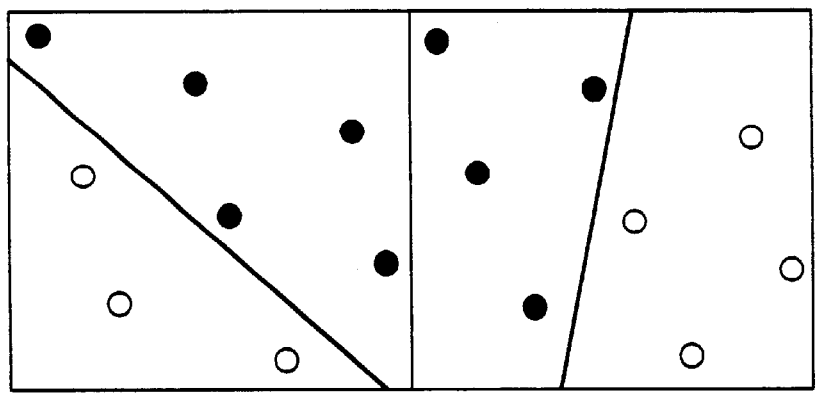
128 bpp Display Refresh 8:8:32:2*(10:10:10:10)
*FIG. 157*
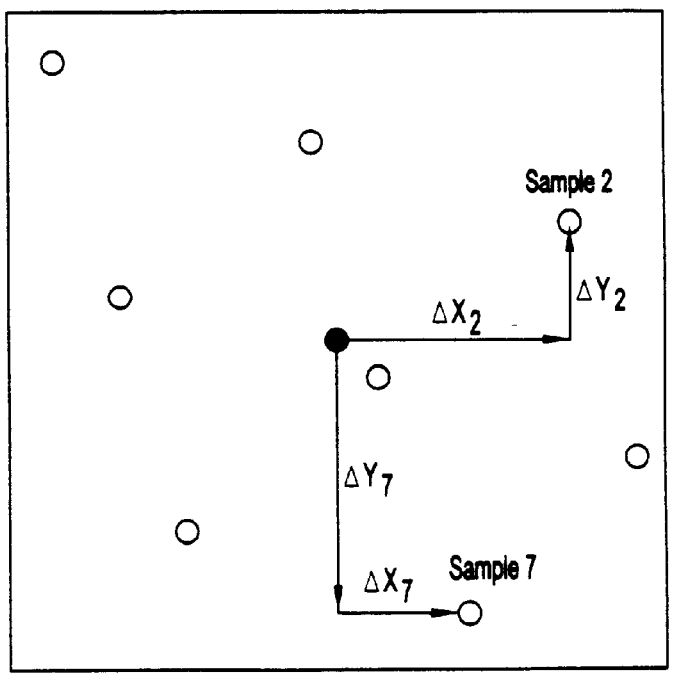
*FIG. 158*
*FIG. 159*

256 bpp Display Mapping

| |127|112|111|96|95|80|79|64|63|48|47|32|31|16|15|0|
|---|---|---|---|---|---|---|---|---|---|---|---|---|---|---|---|---|
|127| | | | | | |Pixel 0| | | | | | | | |0|
|383| | | | | | |Pixel 4| | | | | | | | |256|
|127| | | | | | |Pixel 8| | | | | | | | |0|
|383| | | | | | |Pixel 12| | | | | | | | |256|

| |255|240|239|224|223|208|207|192|191|176|175|160|159|144|143|128|
|---|---|---|---|---|---|---|---|---|---|---|---|---|---|---|---|---|
|255| | | | | | |Pixel 0| | | | | | | | |128|
|511| | | | | | |Pixel 4| | | | | | | | |384|
|255| | | | | | |Pixel 8| | | | | | | | |128|
|511| | | | | | |Pixel 12| | | | | | | | |384|

256 bpp Cache Line Organization for RPIX, SPIX, DPIX

| | 71 64 | 63 56 | 55 48 | 47 40 | 39 32 | 31 24 | 23 16 | 15 8 | 7 0 |
|---|---|---|---|---|---|---|---|---|---|
| RDAT 0 | | 159 | Pixel 0 | | 128 | 31 | Pixel 0 | | 0 |
| RDAT 1 | | 191 | Pixel 0 | | 160 | 63 | Pixel 0 | | 32 |
| RDAT 2 | | 223 | Pixel 0 | | 192 | 95 | Pixel 0 | | 64 |
| RDAT 3 | | 255 | Pixel 0 | | 224 | 127 | Pixel 0 | | 96 |
| RDAT 4 | | 159 | Pixel 4 | | 128 | 31 | Pixel 4 | | 0 |
| RDAT 5 | | 191 | Pixel 4 | | 160 | 63 | Pixel 4 | | 32 |
| RDAT 6 | | 223 | Pixel 4 | | 192 | 95 | Pixel 4 | | 64 |
| RDAT 7 | | 255 | Pixel 4 | | 224 | 127 | Pixel 4 | | 96 |
| RDAT 8 | | 159 | Pixel 8 | | 128 | 31 | Pixel 8 | | 0 |
| RDAT 9 | | 191 | Pixel 8 | | 160 | 63 | Pixel 8 | | 32 |
| RDAT 10 | | 223 | Pixel 8 | | 192 | 95 | Pixel 8 | | 64 |
| RDAT 11 | | 255 | Pixel 8 | | 224 | 127 | Pixel 8 | | 96 |
| RDAT 12 | | 159 | Pixel 12 | | 128 | 31 | Pixel 12 | | 0 |
| RDAT 13 | | 191 | Pixel 12 | | 160 | 63 | Pixel 12 | | 32 |
| RDAT 14 | | 223 | Pixel 12 | | 192 | 95 | Pixel 12 | | 64 |
| RDAT 15 | | 255 | Pixel 12 | | 224 | 127 | Pixel 12 | | 96 |

256 bpp Cache Line Organization Using RDAT

*FIG. 162*

| 127 112 | 111 96 | 95 80 | 79 64 | 63 48 | 47 32 | 31 16 | 15 0 |
|---|---|---|---|---|---|---|---|
| WID S | Ob Oa | αa Ra | Ga Ba | α2 R2 | G2 B2 | α0 R0 | G0 B0 |

| 255 240 | 239 224 | 223 208 | 207 192 | 191 176 | 175 160 | 159 144 | 143 128 |
|---|---|---|---|---|---|---|---|
| Z | αb Rb | Gb Bb | α3 R3 | G3 B3 | α1 R1 | G1 B1 | |

256 bpp Pixel Format 8:2*(8:8:8:8:8):6*(8:8:8:8:32)

*FIG. 163*

| 71 64 | 63 56 | 55 48 | 47 40 | 39 32 | 31 24 | 23 16 | 15 8 | 7 0 |
|---|---|---|---|---|---|---|---|---|
| | | | WID | 0 0 | α | R | G | B |

256 bpp Display Refresh 8:2*(8:8:8:8:8):6*(8:8:8:8:32)

*FIG. 164*

SRAM Read/Write Format

Figure 178: 512 bpp Display Mapping

| | 127 | 112\|111 | 96\|95 | 80\|79 | 64\|63 | 48\|47 | 32\|31 | 16\|15 | 0 |
|---|---|---|---|---|---|---|---|---|---|
| | 127 | | | | Pixel 0 | | | | 0 |
| | 383 | | | | Pixel 0 | | | | 256 |
| | 127 | | | | Pixel 8 | | | | 0 |
| | 383 | | | | Pixel 8 | | | | 256 |

| | 255 | 240\|239 | 224\|223 | 208\|207 | 192\|191 | 176\|175 | 160\|159 | 144\|143 | 128 |
|---|---|---|---|---|---|---|---|---|---|
| | 255 | | | | Pixel 0 | | | | 128 |
| | 511 | | | | Pixel 0 | | | | 384 |
| | 255 | | | | Pixel 8 | | | | 128 |
| | 511 | | | | Pixel 8 | | | | 384 |

512 bpp Cache Line Organization for RPIX, SPIX, DPIX

*FIG. 167*

| | 71 | 64\|63 | 56\|55 | 48\|47 | 40\|39 | 32\|31 | 24\|23 | 16\|15 | 8\|7 | 0 |
|---|---|---|---|---|---|---|---|---|---|---|
| RDAT 0 | | 159 | | Pixel 0 | 128 | | 31 | | Pixel 0 | 0 |
| RDAT 1 | | 191 | | Pixel 0 | 160 | | 63 | | Pixel 0 | 32 |
| RDAT 2 | | 223 | | Pixel 0 | 192 | | 95 | | Pixel 0 | 64 |
| RDAT 3 | | 255 | | Pixel 0 | 224 | | 127 | | Pixel 0 | 96 |
| RDAT 4 | | 415 | | Pixel 0 | 384 | | 287 | | Pixel 0 | 256 |
| RDAT 5 | | 447 | | Pixel 0 | 416 | | 319 | | Pixel 0 | 288 |
| RDAT 6 | | 479 | | Pixel 0 | 448 | | 352 | | Pixel 0 | 320 |
| RDAT 7 | | 511 | | Pixel 0 | 480 | | 383 | | Pixel 0 | 352 |
| RDAT 8 | | 159 | | Pixel 8 | 128 | | 31 | | Pixel 8 | 0 |
| RDAT 9 | | 191 | | Pixel 8 | 160 | | 63 | | Pixel 8 | 32 |
| RDAT 10 | | 223 | | Pixel 8 | 192 | | 95 | | Pixel 8 | 64 |
| RDAT 11 | | 255 | | Pixel 8 | 224 | | 127 | | Pixel 8 | 96 |
| RDAT 12 | | 415 | | Pixel 8 | 384 | | 287 | | Pixel 8 | 256 |
| RDAT 13 | | 447 | | Pixel 8 | 416 | | 319 | | Pixel 8 | 288 |
| RDAT 14 | | 479 | | Pixel 8 | 448 | | 352 | | Pixel 8 | 320 |
| RDAT 15 | | 511 | | Pixel 8 | 480 | | 383 | | Pixel 8 | 352 |

512 bpp Cache Line Organization Using RDAT

*FIG. 168*

FIG. 169 — 512 bpp Pixel Format 8:2*(8:8:8:8:8):6*(8:8:8:8:32)

FIG. 170 — 512 bpp Display Refresh 8:2*(8:8:8:8:8):6*(8:8:8:8:32)

SRAM Read/Write Format 512 bpp Pixel Format 8:2*(8:10:10:10):6*(10:10:10:32)

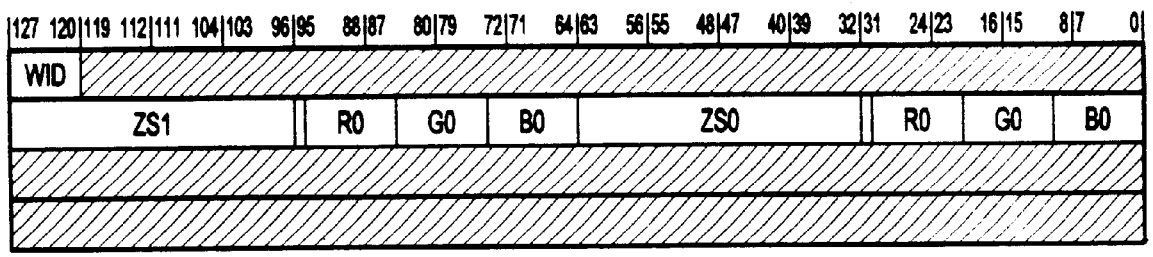
FIG. 173
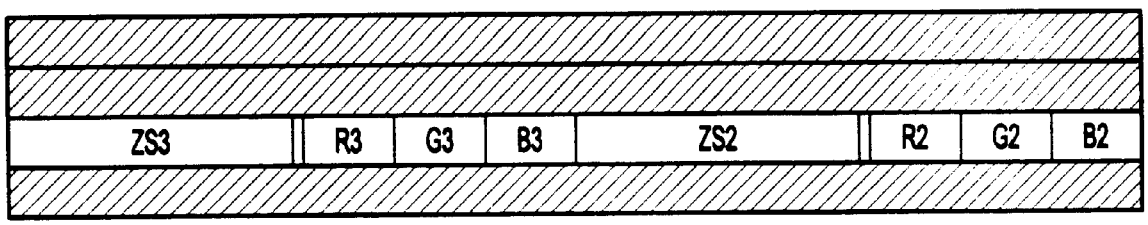
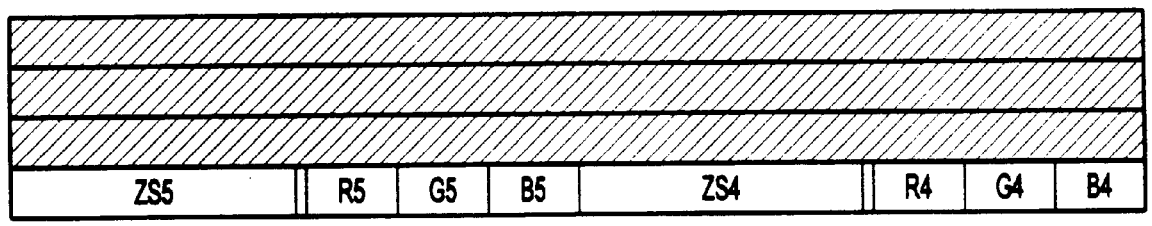
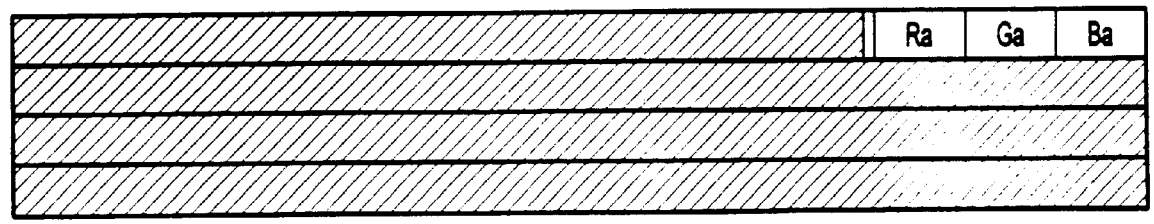
FIG. 174

METHODS FOR OPERATION OF SEMICONDUCTOR MEMORY

This is a continuing application of Provisional Patent Application Serial No. 60/086,554 filed May 21, 1998.

FIELD OF THE INVENTION

The disclosed invention relates generally to computer systems. More particularly, the present invention relates to a dynamic random access memory (DRAM) frame buffer device, and system based on that device, which provides an architecture for performing accelerated two-dimensional and three-dimensional graphics rendering operations.

BACKGROUND

The Dual Pixel 3DRAM chip and graphics processing system is used to implement high performance, high capacity frame buffers. Certain aspects of the disclosed Dual Pixel 3DRAM chip, and graphics processing system based upon the Dual Pixel 3DRAM chip, are disclosed in U.S. Pat. No. 5,544,306, issued to Deering et al. on Aug. 6, 1996, which patent is incorporated by reference in its entirety into this disclosure as if it were fully set forth herein.

The disclosed invention presents an alternative to the use of external DRAM frame buffers. To meet near term performance objectives, it is tempting to use embedded DRAM for frame buffer memory, because it might be feasible to fit between 4 and 8 Megabits on a die with surface area remaining to implement an interesting amount of logic. However, in the same time frame, graphics-oriented computing products will require between 10 and 80 Megabits of frame buffer memory. Thus, between 2 and 10 embedded DRAM devices would be necessary to implement a frame buffer that would meet the requirements of graphics processing computing systems. While the fill rate for such a frame buffer would be very high, the cost would be prohibitive for a large segment of the computing market.

In processing two-dimensional and three-dimensional graphic images, texture mapping must be accelerated to match fill rate. However the distributed frame buffer described above makes this difficult to do efficiently. The easiest way to distribute texture data would be for each device to have its own copy of everything, however this method is a very inefficient use of embedded DRAM bits. An alternate approach would distribute texture data among the devices comprising a frame buffer such that data is not duplicated. This alternative would use embedded DRAM bits efficiently, but would also requires the routing of massive amounts of texture data between devices.

Using embedded DRAM to implement a texture cache on a single device might be more practical. Texture data would have to be paged in from system memory, which would work more efficiently if the texture data were compressed.

Embedded DRAM could also be used to implement a primitive FIFO between the setup unit and the rasterizer. This FIFO would allow geometry and setup processing to continue while big triangles are being rendered. It could also be used to tolerate the latency of paging and decompressing texture data in from system memory.

Region-based rendering architectures, such as Talisman, PixelFlow, or Oak's WARP 5, render a small portion of the frame buffer on the rendering controller and then transfer the final color values to external DRAM. The controller then renders the next region, and the one after that, until the entire frame is covered.

All of the bandwidth used for hidden surface removal and anti-aliasing remains entirely on the rendering controller, so fill rate is not limited by external bandwidth. All of the storage used for hidden surface removal and anti-aliasing needs only to be implemented for a small portion of the frame buffer and can be kept on the rendering controller.

The big disadvantage of region-based rendering is that all of the geometry for a frame needs to be sorted into regions and stored somewhere before rendering can begin. This requirement generally places an upper limit on the amount of geometry that can be rendered per frame. This limitation is unacceptable for many applications. Some region-based rendering architectures can still function somewhat correctly when given too much geometry, by writing depth and color values for regions to and from external DRAM. However, this implementation loses all of the benefits of region-based rendering, while retaining all of the disadvantages.

Mechanical CAD and other content creation applications cannot tolerate limits on geometric complexity. Such applications require the ability to smoothly trade off geometric complexity for frame rate. Thus neither embedded DRAM nor region-based rendering approaches provide adequate solutions to meet the performance demands and practical cost constraints of present graphics processing applications.

Another concern with respect to frame buffer design is the performance trade off between single-ported and dual-ported frame buffer memories. Dual-ported frame buffers have a dedicated display port which enables the render port to spend more of its time rendering. Typically, a dual-ported frame buffer comprised of video random access memory (VRAM) chips loses only approximately one to two percent of its fill rate to video transfer operations, because its video buffers are quite large. Frame buffers comprised of FBRAM chips (also referred to as 3D-RAM™ chips) lose approximately five to ten percent of their fill rate to video transfer operations, because their video buffers are smaller.

A single-port memory cannot render when it is reading pixel data for display, unless the port supports high speed, bidirectional signaling. If one compares single- and dual-ported memories where both render port bandwidths are identical, then the dual-ported memory will have both a higher fill rate and a higher cost. If one compares single- and dual-ported memories where the bandwidth of the single port is equal to the sum of the dual-port bandwidths, then the single-ported memory's fill rate is likely to be higher than the dual-ported memory, because the single-ported memory is more efficient. Thus, to the extent that bandwidth limitations are presently being relaxed due to the emergence high bandwidth input/output (I/O) capacities, a single-ported memory architecture promises more efficient frame buffer performance.

Dual-ported memories allow a smoother flow of pixels to the frame buffer. A single-ported memory is unavailable for rendering on a periodic basis while it reads bursts of display data. The rendering controller requires a larger pixel FIFO to smooth out pixel flow when interfacing with a single-ported memory. In a lower cost system, the renderer may be idle during such display bursts.

A single-ported memory is cheaper due to savings in die area, pins, packaging, testing, and power consumption. A single-ported memory has a significantly lower cost per bit of storage than a dual-ported memory of the same size. If the cost per bit is lower, storing non-displayable data in the frame buffer is easier to justify.

A dual-ported memory has a fixed display bandwidth. If the required display bandwidth is lower, then bandwidth is being wasted. If the required display bandwidth is higher, then the memory is not suited to the display requirements. A single-ported memory has the flexibility to trade off render bandwidth and display bandwidth. In a pinch, a single-ported memory can actually provide much higher display bandwidth.

The dedicated display port of a dual-ported memory is not used during horizontal and vertical blanking intervals, which means the display port is idle approximately twenty percent of the time.

A dual-ported memory dictates a fixed mapping of pixels and blocks to the screen. A single-ported memory can map pixel and blocks to the screen with much greater flexibility.

A dual-ported frame buffer memory only makes sense if the render and display ports are connected to different chips. If both ports are connected to the same chip, then a single-port memory, with equivalent bandwidth, would be more efficient for the reasons stated above.

A single-ported memory enables the building of lower cost systems, because the cost per bit of frame buffer storage is cheaper, and because the rendering and display chips can be merged into a single device.

Thus, a single-ported memory enables one to design lower cost, low-end systems than could be designed with a dual-ported memory. The cost per bit of storage is significantly lower with a single-ported memory which will make the bill of materials significantly lower for high resolution/high pixel depth designs. Due to its greater flexibility, a single-ported memory yields a design which offers a wider range of product capabilities.

SUMMARY OF THE INVENTION

The present invention is directed to a single-ported frame buffer access memory (Dual Pixel 3DRAM) chip which provides accelerated rendering of two-dimensional and three-dimensional images in a computer graphics system.

The Dual Pixel 3DRAM chip features a single-ported, high speed memory which is accessed by a rendering controller over a rendering bus. The Dual Pixel 3DRAM chip comprises a DRAM array, an SRAM pixel buffer, at least one pixel arithmetic-logic unit (ALU), and a global bus. The Dual Pixel 3DRAM chip also comprises a number of data buses and data formatters which route and format graphics data as that graphics data is processed, updated, transmitted off of, and stored within the Dual Pixel 3DRAM chip.

In a first aspect of the present invention, the Dual Pixel 3DRAM chip is configurable to process varying pixel sizes and formats, ranging from 8-bit pixels up to 512-bit pixels. The Dual Pixel 3DRAM chip features novel protocol and data packing schemes to implement these capabilities.

In another aspect of the present invention, the Dual Pixel 3DRAM chip supports variable input and output data rates over the rendering bus, which permits both 2-cycle and 3-cycle pixel ALU operations on the chip.

In another aspect of the present invention, the Dual Pixel 3DRAM chip processes two separate pixels or samples per operation simultaneously.

In another aspect of the present invention, the Dual Pixel 3DRAM chip features data compression capabilities which permit higher fill rates and throughput between the chip and the rendering controller.

In another aspect of the present invention, the Dual Pixel 3DRAM chip employs a multi-sampling scheme which employs a novel delta Z algorithm to render antialiased polygons.

In another aspect of the present invention, the Dual Pixel 3DRAM chip employs a novel scheme for retaining DRAM bank and column addresses on-chip to minimize bandwidth requirements over the address and control bus between the rendering controller and the chip.

In another aspect of the present invention, the Dual Pixel 3DRAM chip comprises a relationship between data transfer speed and width of the data buses internal to the chip, such that bandwidth is balanced to optimize the operational efficiency of the chip.

In another aspect of the present invention, the Dual Pixel 3DRAM chip performs multi-precision pixel blend operations such that inputs of any bit width may be blended.

In another aspect of the present invention, the Dual Pixel 3DRAM chip divides address and control information into three separate sets of signals which are simultaneously transmitted to control DRAM bank operations, global bus operations, and pixel AlU operations on the chip.

In another aspect of the present invention, the Dual Pixel 3DRAM chip features a Flash Line operation which writes to multiple buses between DRAM bank column decoders and sense amps resulting in an increase in the clear rate of the frame buffer by a factor of four or more.

In another aspect of the present invention, the Dual Pixel 3DRAM chip features a novel operation, Change Cache Line, which permits simultaneous transfer of data between different levels of cache due to a bi-directional global bus between the DRAM array and the SRAM pixel buffer.

In another aspect of the present invention, the Dual Pixel 3DRAM chip features a Change Page bank operation in which the precharge page and the access page bank operations are combined into a single operation.

In another aspect of the present invention, the Dual Pixel 3DRAM chip features pixel ALU operations in which data or the contents of certain registers is broadcast over certain buses on the chip.

In another aspect of the present invention, the Dual Pixel 3DRAM chip features innovative means for reading pixel data, in either single or dual pixel format, from the SRAM pixel buffer.

The above-described and other features of the present invention, including various novel details of operation, construction, assembly and combination of parts, will now be more particularly described with reference to the accompanying drawings. It shall be understood that the particular embodiments of the invention are disclosed herein by way of illustration only and shall not impose limitations on the invention as claimed. The principles and features of this invention may be employed in numerous and varying embodiments without departing from the scope of the present invention.

BRIEF DESCRIPTION OF THE DRAWINGS

FIG. 8 illustrates a set of eight-bit blend unit calculations.

FIG. 9 illustrates a dispersed-dot ordered dither algorithm used in the blend unit.

FIG. 11 illustrates a set of 10-bit blend unit calculations.

FIG. 81 illustrates an SRAM pixel buffer organization: 8, 16, 32 bits per pixel.

FIG. 82 illustrates an SRAM pixel buffer organization: 64 bits per pixel.

FIG. 83 illustrates an SRAM pixel buffer organization: 96 bits per pixel.

FIG. 95 illustrates an 8-bit per pixel cache line organization for RPIX, SPIX, DPIX operations.

FIG. 96 illustrates an 8-bit per pixel cache line organization using the RDAT operation.

FIG. 101 illustrates a 16-bit per pixel cache line organization for RPIX, SPIX, DPIX operations.

FIG. 102 illustrates a 16-bit per pixel cache line organization using the RDAT operation.

FIG. 103 illustrates a 16-bit per pixel format: 4:4:4:4.

FIG. 109 illustrates a 32-bit per pixel cache line organization for the RPIX, SPIX, DPIX operations.

FIG. 110 illustrates a 32- bit per pixel cache line organization for using the RDAT operation.

FIG. 116 illustrates a 64-bit per pixel cache line organization for the RPIX, SPIX, DPIX operations.

FIG. 117 illustrates a 64-bit per pixel cache line organization using the RDAT operation.

FIG. 118 illustrates a 64-bit per pixel format: 4:8:8:8:8.

FIG. 119 illustrates a 64-bit per pixel display refresh: 4:8:8:8:8.

FIG. 120 illustrates a 64-bit per pixel format: 2:10:10:10.

FIG. 121 illustrates a 64-bit per pixel display refresh: 4:10:10:10.

FIG. 122 illustrates a 64-bit per pixel format: 4:28:2* (4:4:4:4).

FIG. 123 illustrates a 64-bit per pixel display refresh: 4:28:2*(4:4:4:4).

FIG. 124 illustrates a 64-bit per pixel format: 4:4:24:2* (4:4:4:4).

FIG. 125 illustrates a 64-bit per pixel display refresh: 4:4:24:2* (4:4:4:4).

FIG. 126 illustrates a 64-bit per pixel format: 4:28:2* (5:6:5).

FIG. 127 illustrates a 64-bit per pixel display refresh: 4:28:2* (5:6:5).

Figure 128:
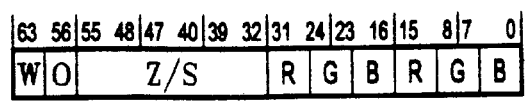

FIG. 128 is illustrates a 64-bit per pixel format: 4:4:24:2* (5:6:5).

Figure 129:
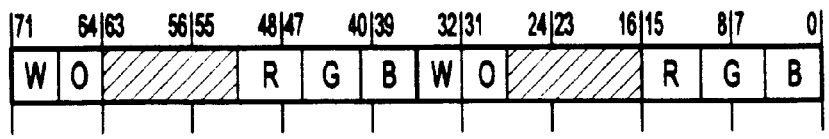

FIG. 129 illustrates a 64-bit per pixel display refresh: 4:4:24:2* (5:6:5).

Figure 130:
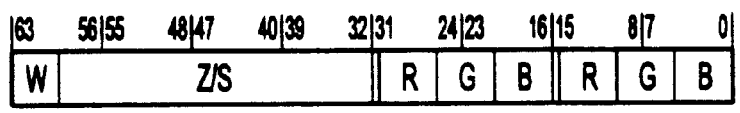

FIG. 130 illustrates a 64-bit per pixel format: 4:28:2* (1:5:5:5).

Figure 131:
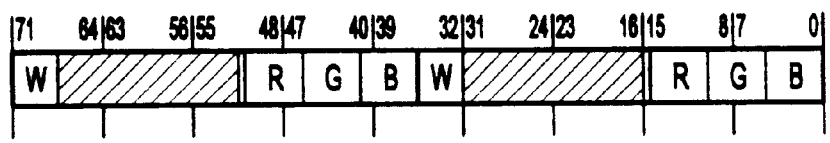

FIG. 131 illustrates a 64-bit per pixel display refresh: 4:28:2*(1:5:5:5).

Figure 132:
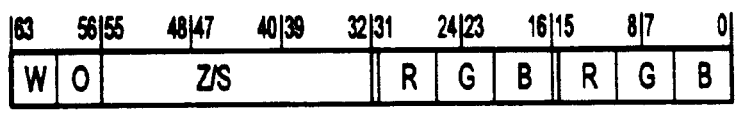

FIG. 132 illustrates a 64-bit per pixel format: 4:4:24:2* (1:5:5:5).

Figure 133:
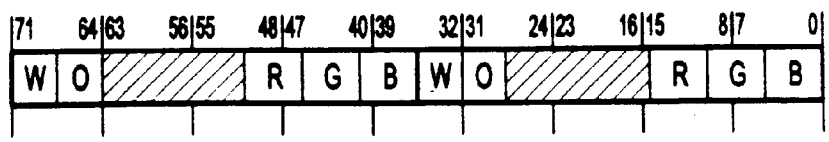

FIG. 133 illustrates a 64-bit per pixel display refresh: 4:4:24:2*(1:5:5:5).

Figures 134, 135:

FIG. 134 illustrates a 96-bit per pixel display mapping.

FIG. 135 illustrates a 96-bit per pixel cache line organization for the RPIX, SPIX, DPIX operations.

FIG. 136 illustrates a 96-bit per pixel cache line organization for the RPIX, SPIX, DPIX operations.

FIG. 137 illustrates a 96-bit per pixel format: 4:28:2*(8:8:8:8).

FIG. 138 illustrates a 96-bit per pixel display refresh: 4:28:2*(8:8:8:8).

FIG. 139 illustrates a 96-bit per pixel format: 4:28:2*(8:8:8:8).

FIG. 140 illustrates a 96-bit per pixel display refresh: 4:28:2*(8:8:8:8).

FIG. 141 illustrates a 96-bit per pixel format: 4:4:24:2*(8:8:8:8).

FIG. 142 illustrates a 96-bit per pixel display refresh: 4:4:24:2*(8:8:8:8).

FIG. 143 illustrates a 96-bit per pixel format: 4:28:2*(2:10:10:10).

FIG. 144 illustrates a 96-bit per pixel display refresh: 4:28:2*(2:10:10:10).

FIG. 145 illustrates a 96-bit per pixel format: 4:4:24:2*(10:10:10).

FIG. 146 illustrates a 96-bit per pixel format: 4:4:24:2*(10:10:10).

Figure 147:
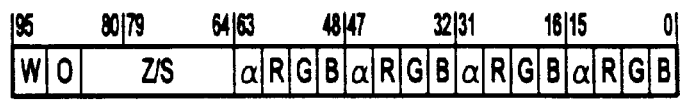

FIG. 147 illustrates a 96-bit per pixel format: 4:4:24:2*(4:4:4:4).

Figure 148:
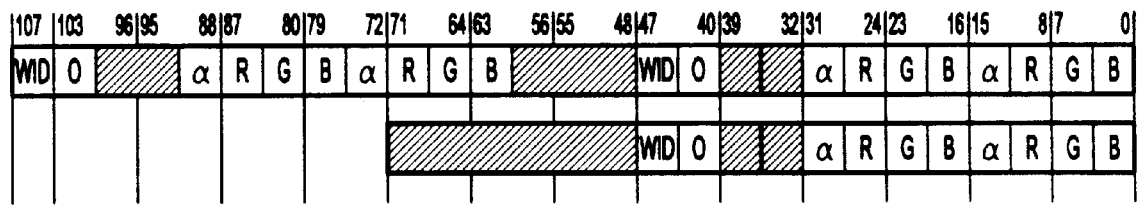

FIG. 148 illustrates a 96-bit per pixel display refresh: 4:4:24:4*(4:4:4:4).

Figure 149:

FIG. 149 illustrates a 128-bit per pixel display mapping.

FIG. 150 illustrates a 128-bit per pixel cache line organization for the RPIX, SPIX, DPIX operations.

FIG. 151 illustrates a 128-bit per pixel cache line organization using the RDAT operations.

FIG. 152 illustrates a 128-bit per pixel format: 8:32:8:2*(8:8:8:8:8).

FIG. 153 illustrates a 128-bit per pixel display refresh: 8:32:8:2*(8:8:8:8:8).

FIG. 154 illustrates a 128-bit per pixel format: 8:32:8:2*(8:2:10:10:10).

FIG. 155 illustrates a 128-bit per pixel display refresh: 8:32:8:2*(8:10:10:10).

FIG. 156 illustrates a 128-bit per pixel format: 8:8:32:2*(10:10:10:10).

FIG. 157 illustrates a 128-bit per pixel display refresh: 8:8:32:2*(10:10:10:10).

FIG. 158 illustrates two pixels and the locations of each sample within each pixel.

FIG. 159 illustrates the offset between samples within a pixel.

Figures 160, 161:
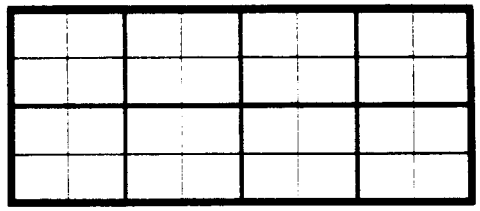

FIG. 160 illustrates a 256-bit per pixel display mapping.

FIG. 161 illustrates a 256-bit per pixel cache line organization for the RPIX, SPIX, DPIX operations.

FIG. 162 illustrates a 256-bit per pixel cache line organization using the RDAT operations.

FIG. 163 illustrates a 256-bit per pixel format: 8:2*(8:8:8:8:8):6*(8:8:8:8:32).

FIG. 164 illustrates a 256-bit per pixel display refresh: 8:2*(8:8:8:8:8):6*(8:8:8:8:32).

Figure 165:
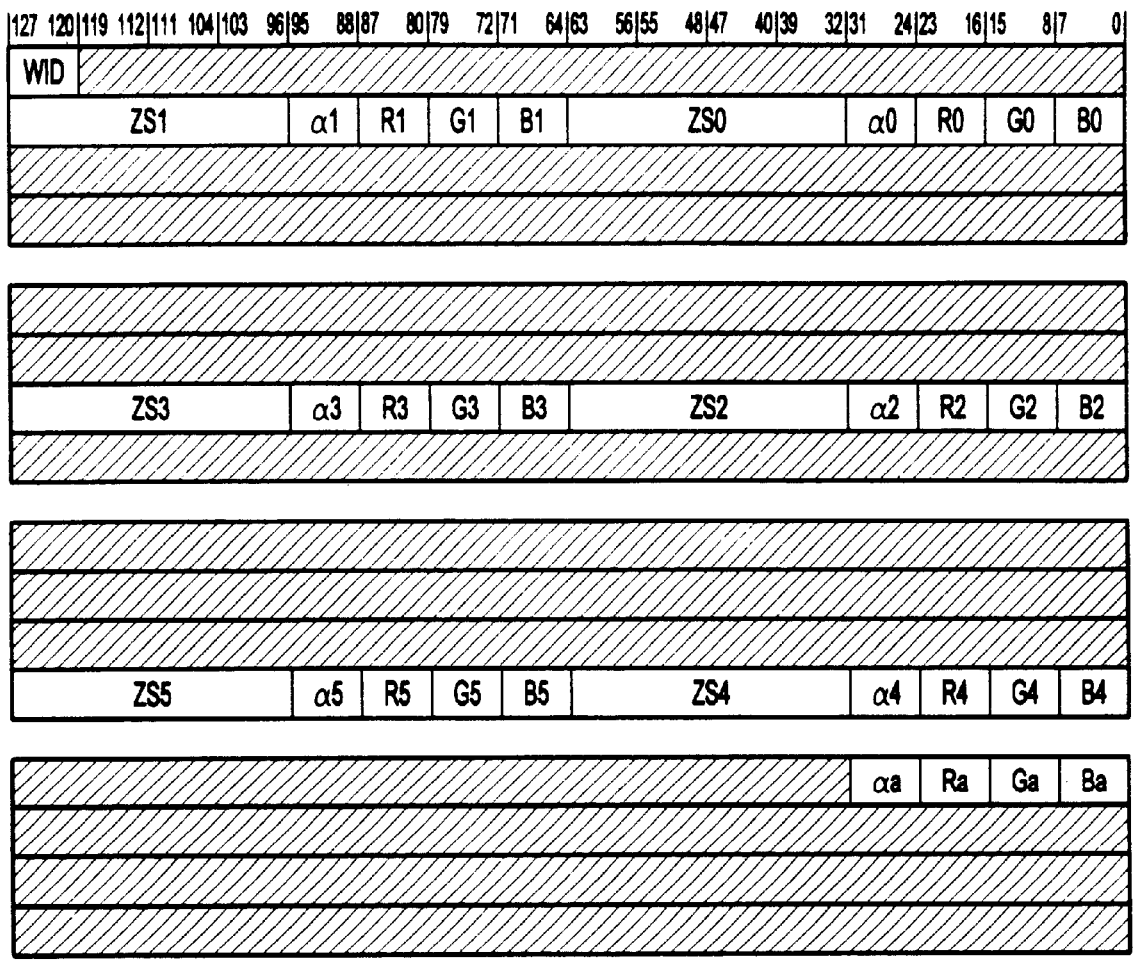

FIG. 165 illustrates an SRAM pixel buffer read/write format.

Figure 166:

FIG. 166 illustrates a 512-bit per pixel display mapping.

FIG. 167 illustrates a 512-bit per pixel cache line organization for the RPIX, SPIX, DPIX operations.

FIG. 168 illustrates 512-bit per pixel cache line organization using the RDAT operation.

FIG. 169 illustrates a 512-bit per pixel format: 8:2*(8:8:8:8:8):6*(8:8:8:8:32).

FIG. 170 illustrates a 512-bit per pixel display refresh: 8:2*(8:8:8:8:8):6*(8:8:8:8:32).

Figure 171:
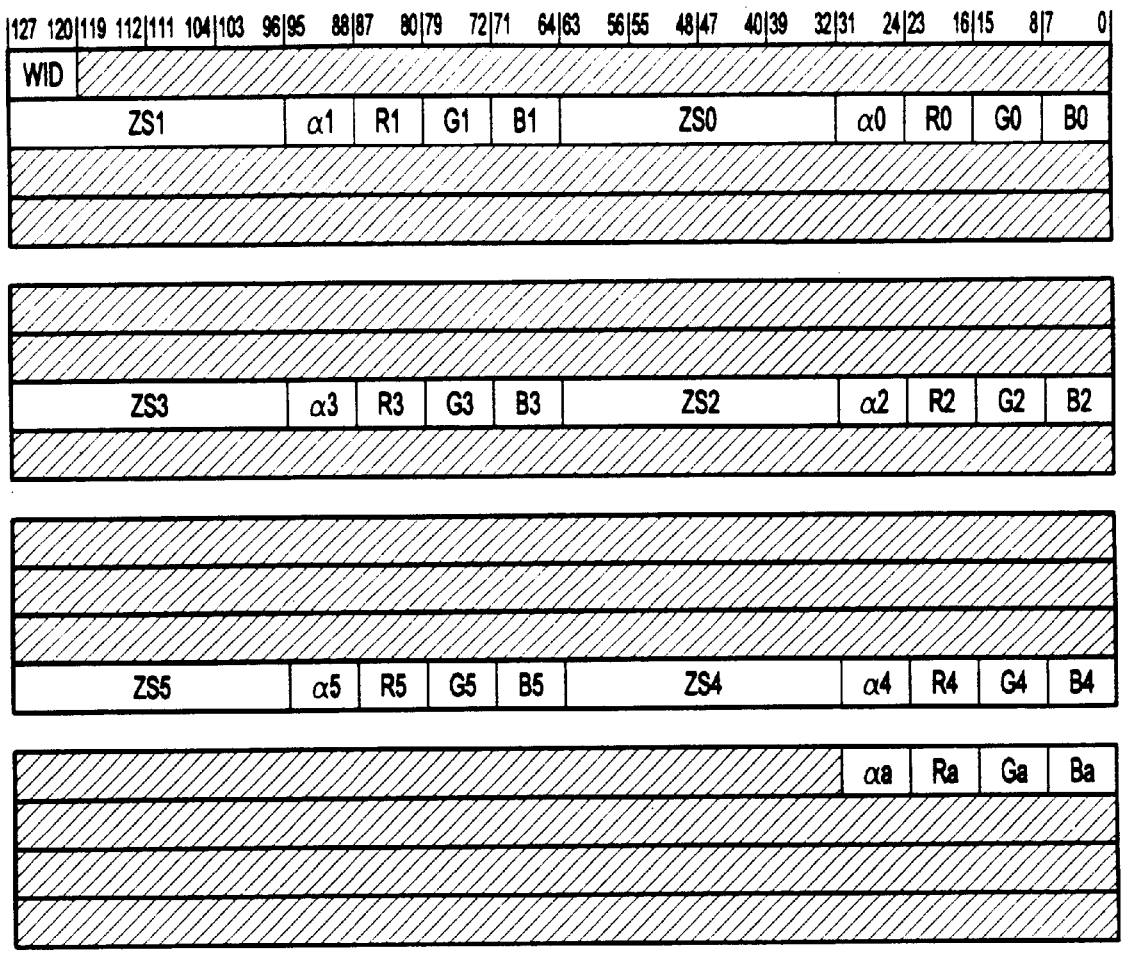

FIG. 171 illustrates an SRAM pixel buffer read/write format.

Figure 172:
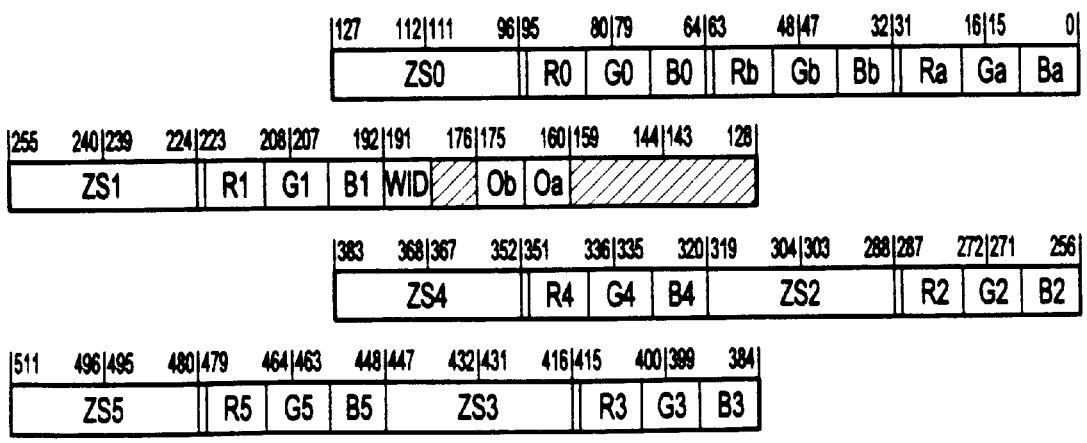

FIG. 172 illustrates a 512-bit per pixel format: 8:2*(8:10:10:10):6*(10:10:10:32).

FIG. 173 illustrates a 512-bit per pixel display refresh: 8:2*(8:2:10:10:10):6*(2:10:10:10:32).

FIG. 174 illustrates an SRAM pixel buffer read/write format.

Figure 175:
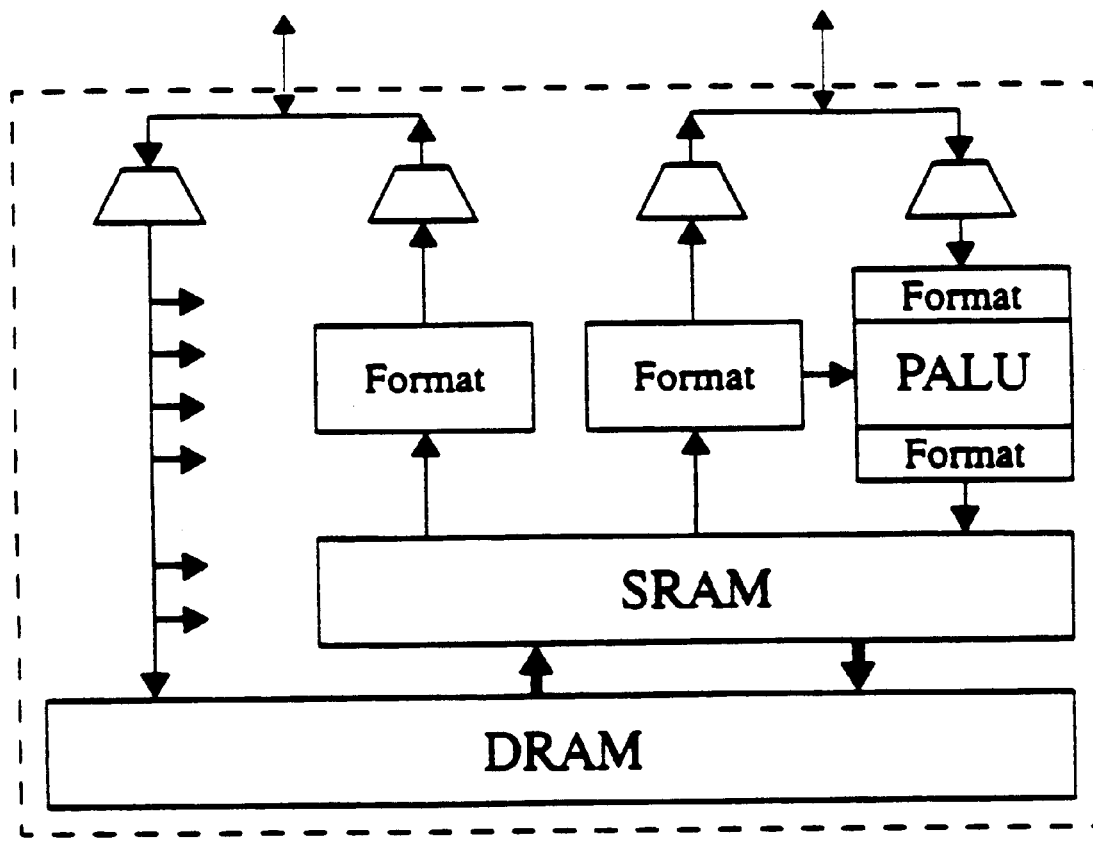

FIG. 175 illustrates, in block diagram format, an alternative architecture for the Dual Pixel 3DRAM chip which supports high-speed, simultaneous bidirectional signalling over the I/O bus.

Figure 176:
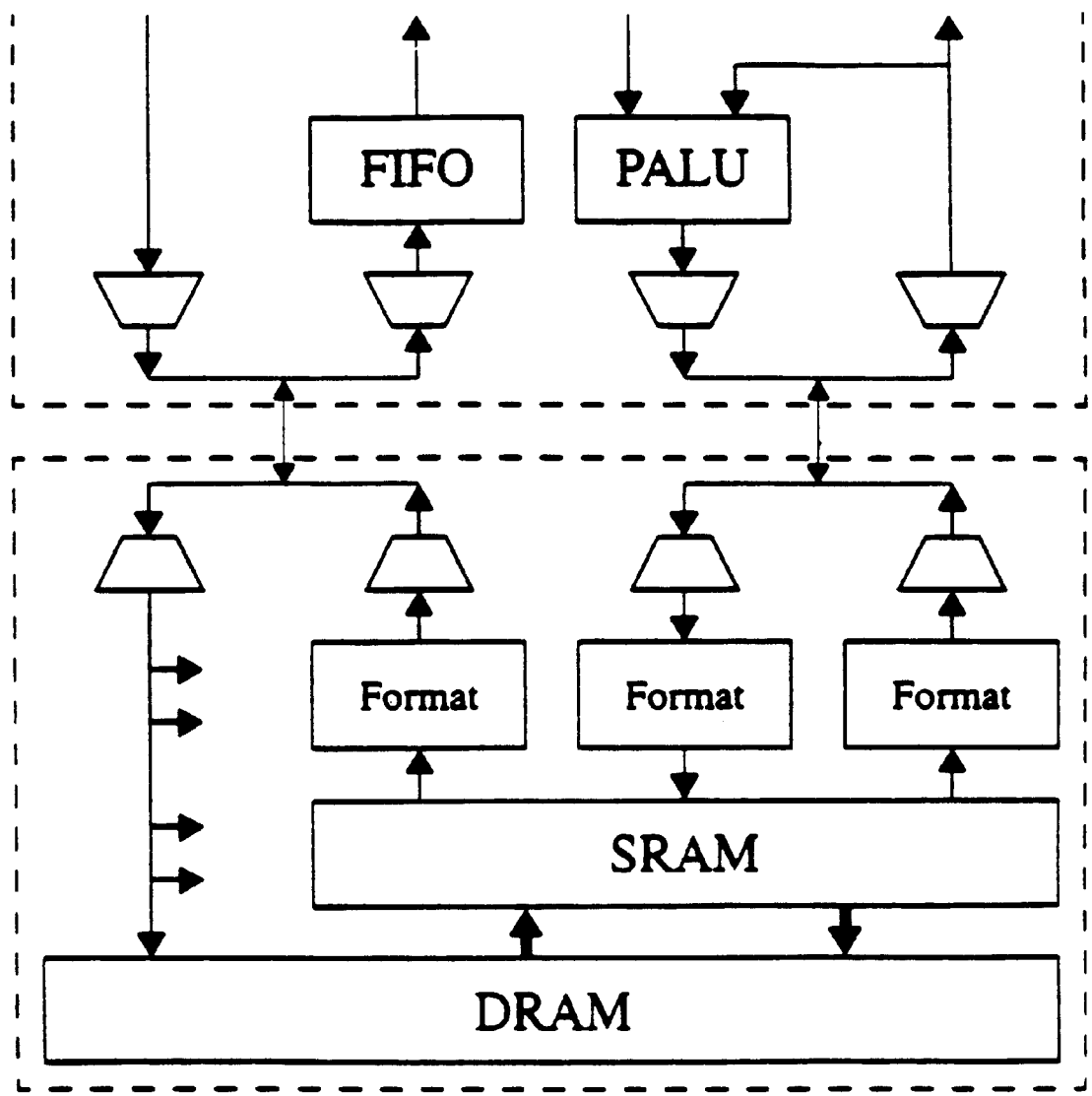

FIG. 176 illustrates, in block diagram format, a second alternative architecture for the Dual Pixel 3DRAM chip which supports high-speed, simultaneous bidirectional signalling over the I/O bus.

DETAILED DESCRIPTION

A detailed description of the present invention follows based on the best modes of carrying out the invention contemplated by the inventors at the present time. References are made herein to the accompanying figures described above, where numbered elements are used consistently throughout the figures. Included throughout this disclosure are descriptions of various functional aspects of the Dual Pixel 3DRAM chip which are expressed in the Verilog Hardware Description Language (VHDL) syntax, which is known by those skilled in the art.

TABLE OF CONTENTS
1.0 Architecture
  1.1 Pixel ALUs
    1.1.1 ROP/Blend Unit
    1.1.2 Depth Unit
    1.1.3 Stencil Unit
    1.1.4 Window ID Unit
  1.2 SRAM Pixel Buffer
  1.3 Memory Configuration
  1.4 Pin Configuration
  1.5 Protocol
    1.5.1 DRAM Bank Operations
    1.5.2 Global Bus Operations
    1.5.3 Pixel ALU Operations
  1.6 Operation Timing
  1.7 Registers
    1.7.1 Identification
    1.7.2 FeatureEnable
    1.7.3 PixelConfig
    1.7.4 StencilDepthConfig
    1.7.5 ColorOp[0]
    1.7.6 ColorOp[1]
    1.7.7 ConstantColor
    1.7.8 Byte Mask[1:0]

Figure 1:
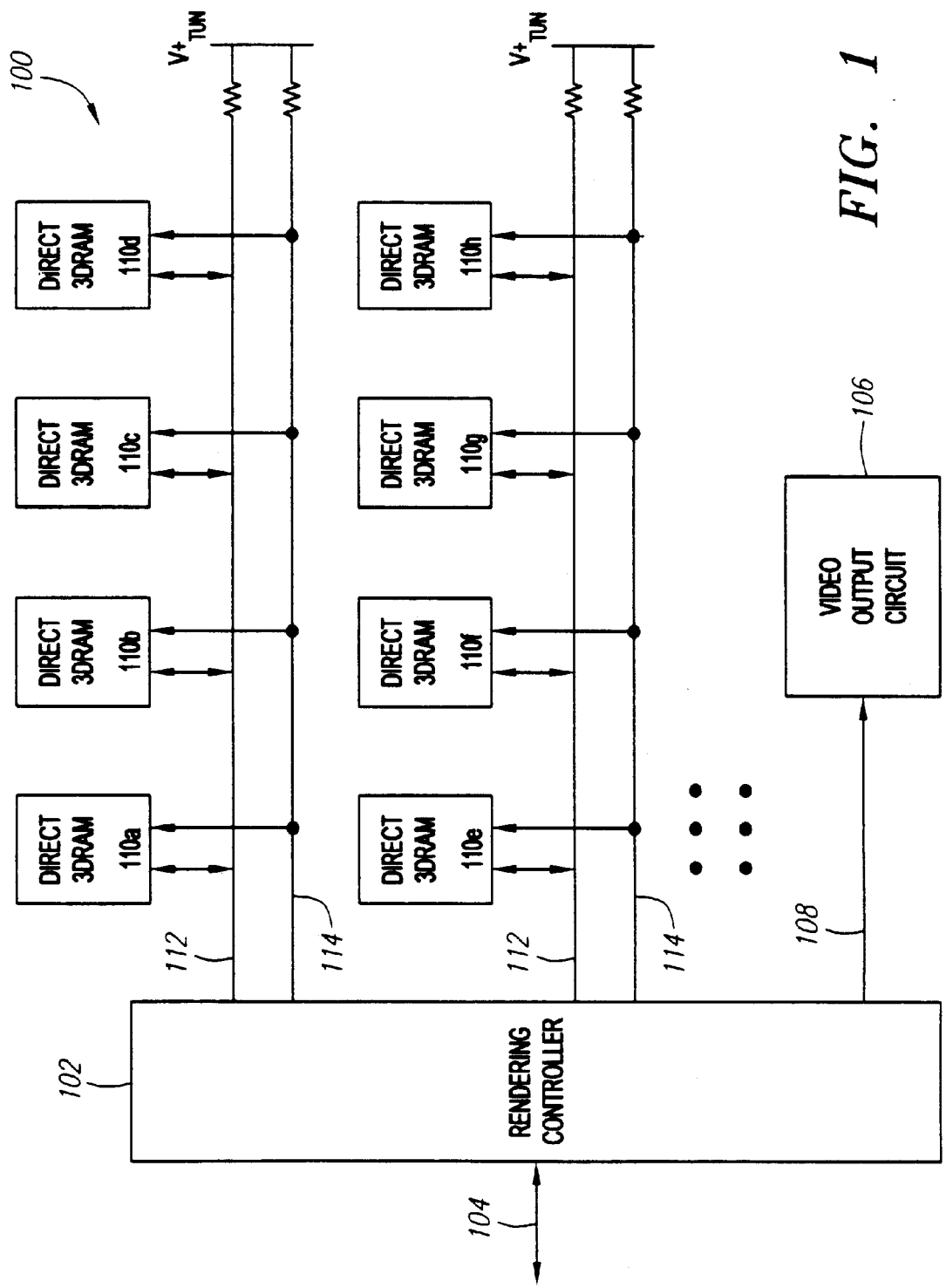
FIG. 1 illustrates in block diagram format a graphics subsystem, also referred to as a video display frame buffer, comprising a set of Dual Pixel 3DRAM chips, a rendering controller, pairs of rendering and address and control busses, and a video output circuit.

1.7.9 Plane Mask[7:0]
1.7.10 ColorWIDLUT[3:0]
1.7.11 OverlayWIDLUT[3:0]
1.7.12 DisplayConfig
1.8 Fast Region Clear
2.0 Data Routing
  2.1 Input Data Formatter
  2.1.1 Pixel Compression
  2.1.2 Input Data Formats
  2.1.3 Accumulators
  2.1.4 Final Formatting
  2.2 Output Data Formatter
  2.2.1 RDAT, RPIX (8-, 16-, 32-bit pixel) Operation
  2.2.2 RPIX (64-bit pixel) Operation
  2.2.3 RPIX (96-bit pixel) Operation
  2.2.4 RPIX (128-bit pixel) Operation
  2.3 SRAM-to-Pixel ALU Routing
  2.3.1 SRAM Organization of 8-, 16-, and 32-bit Pixels
  2.3.2 SRAM organization of 64-bit pixels
  2.3.3 SRAM organization of 96 bit pixels
  2.3.4 SRAM organization of 128 bit pixels
  2.3.5 UnpackColors
  2.3.6 UnpackDepths
  2.3.7 UnpackExtras
  2.3.8 UnpackAlpha, UnpackRed, UnpackGreen, UnpackBlue
  2.3.9 UnpackDepth
  2.3.10 UnpackStencil
  2.3.11 UnpackWid
  2.3.12 SramToPaluData
  2.4 Pixel ALU-to-SRAM Data Routing
  2.4.1 PackColor
  2.4.2 PackDepth
  2.4.3 PackExtra
  2.4.4 PaluToSramData
  2.5 Pixel ALU-to-SRAM Mask Generation
  2.5.1 WriteEnableMask
  2.5.2 Pixel Address Mask
  2.5.3 MaskDepth
  2.5.4 EnableMask
  2.5.5 SelectPlaneMask
  2.5.6 Pixel ALU-to-SPAM Mask
3.0 Pixel Formats
  3.1 8-Bit Pixel Formats
  3.2 16-Bit Pixel Formats
  3.3 32-Bit Pixel Formats
  3.4 64-Bit Pixel Formats
  3.5 96-Bit Pixel Formats
  3.6 128-Bit Pixel Formats
  3.7 Multi-Sample Polygon Anti-Aliasing
  3.7.1 Accumulation Buffer
  3.7.2 A buffer
  3.7.3 Multi-sample
    3.7.3.1 Only Color Per Sample
    3.7.3.2 Color and Depth Per Sample
  3.7.4 Accelerating Color and Depth Per Sample
  3.8 256-Bit Pixel Formats (4X Multisample)
  3.9 512-Bit Pixel formats (6X Multisample)
4.0 Bidirectional I/O
1.0 Architecture FIG. 1 illustrates a graphics subsystem 100 which operates in a computing system. The graphics subsystem 100 is also referred to as a video display frame buffer. The graphics subsystem 100 comprises a rendering controller 102, an interface 104 to the computing system in which the graphics subsystem 100 operates, a video output circuit 106, a video output channel 108 leading from the rendering controller 102 to the video output circuit 106, one or more of the Dual Pixel 3DRAM chip 110 disclosed herein, one or more rendering buses 112 and one or more address and control buses 114. As shown in FIG. 1, the video output circuit 106 is physically separated from the rendering controller 102; however, an alternate embodiment comprises both the rendering controller 102 and the video output circuit 106 within a single chip or device.

The graphics subsystem 100 depicted in FIG. 1 comprises two sets of four Dual Pixel 3DRAM chips 110a–d and 110e–h connected to two separate pairs of rendering buses 112 and address and control buses 114. As presently configured, the maximum number of Dual Pixel 3DRAM chips 110 which can be connected to a pair of rendering and address and control buses 112 and 114 is four. However, there is no limit to the number of rendering and control bus pairs between the rendering controller 102 and the Dual Pixel 3DRAM chips 110 used by the graphics subsystem, as represented by the ellipses in FIG. 1. The graphics subsystem 100 is either single or double-buffered, depending on the pixel data being processed, and includes color buffers A and B and a single Z buffer. The graphics subsystem 100 features the capability of supporting several different pixel formats ranging from 8 bits per pixel up to 512 bits per pixel, thereby accommodating numerous frame buffer 100 dimensions.

The rendering controller 102 transfers control information for the Dual Pixel 3DRAM chips 110a–h over the address and control bus 114. The rendering controller 102 performs pixel data accesses to and from the Dual Pixel 3DRAM chips 110 over the rendering bus 112. The rendering controller 102 transforms sequences of pixel accesses into sequences of rendering operations. The rendering bus 112 supports high-bandwidth communication architectures which have recently emerged within the graphics processing industry, such as RDRAM™ and SLDRAM.

The rendering controller 102 writes pixel data to the Dual Pixel 3DRAM chips 110a–h over the rendering bus 112, and the Dual Pixel 3DRAM chips 110a–h transfer updated pixel data back to the rendering controller 102 over the rendering bus 112. The rendering controller 102 transfers frame buffer control signals and commands to the Dual Pixel 3DRAM chips 110a–h over the separate address and control bus 114. The frame buffer command and control signals regulate internal operations of the Dual Pixel 3DRAM chips 110–h.

The Dual Pixel 3DRAM chip 110 supports high bandwidth input/output (I/O) technology to receive control information and to transmit and receive graphics data between the rendering controller 102 and the Dual Pixel 3DRAM chips 110a–h, while minimizing pin count. For one embodiment, the rendering bus 102 complies with the Rambus Direct RDRAM™ specification for data and control I/O, having an 18-bit bi-directional data bus which transfers pixel data at 1.8 Gigabits per second, and a unidirectional address and control bus which transfers information at 800 Megabits per second. For another embodiment, the rendering bus 102 complies with the open IEEE and JEDEC standard, SLDRAM, formerly known as SyncLink. The following publications provide detailed descriptions of such high-bandwidth I/O architectures, and are incorporated herein by reference as if set forth in their entirety: "SLDRAM Architectural and Functional Overview," by Peter Gillingham, MOSAID Technologies, Inc., dated Aug. 29, 1997; "Draft Standard For A High-Speed Memory Interface (Synclink)," Draft 0.99 IEEE P1596.7-199X, sponsored by the Microprocessor and Microcomputer Standards Subcommittee of the IEEE Computer Society, dated 1996; "400 Mb/s/pin SLDRAM" 4 M×18 SLDRAM pipelined, eight bank, 2.5 v operation," Draft/Advance SLD4M18DR400 4 MEG×18 SLDRAM, issued by the SLDRAM Consortium, dated Sep. 22, 1997. Of course, other embodiments of the Dual Pixel 3DRAM chip 110 are possible to support different I/O architectures.

Figure 2:
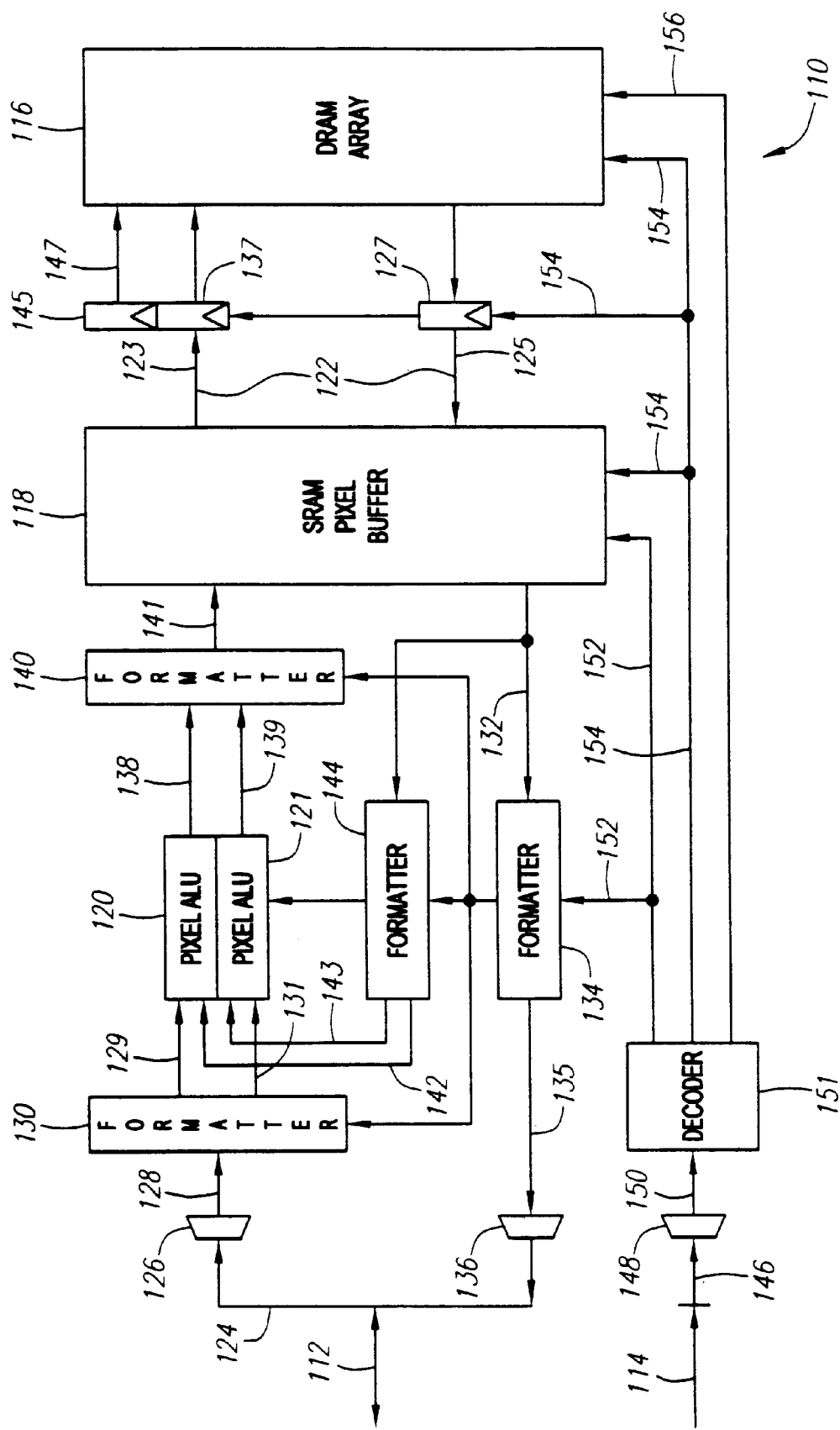
FIG. 2 illustrates, in functional block diagram format, one embodiment of the Dual Pixel 3DRAM chip comprising a DRAM array, an SRAM pixel buffer, two pixel arithmetic-logic units (ALUs), and a global bus.

FIG. 2 illustrates the Dual Pixel 3DRAM chip 110 for one embodiment. The Dual Pixel 3DRAM chip 110 is substantially similar to each of the Dual Pixel 3DRAM chips 110a–h in FIG. 1. The Dual Pixel 3DRAM chip 110 comprises a DRAM array 116, an SRAM pixel buffer 118, two pixel arithmetic-logic units (ALUs) 120 and 121, and a global bus 122, which in the depicted embodiment comprises separate global write and read buses 123 and 125, respectively. The Dual Pixel 3DRAM chip 110 also comprises a number of data buses and data formatters which route and format graphics data as that data is processed and stored within a Dual Pixel 3DRAM chip 110.

Graphics data both enters and exits the Dual Pixel 3DRAM chip 110 through the rendering bus 112. Graphics data transmitted to the Dual Pixel 3DRAM chip 110 is received by the input/output bus (I/O bus) 124. The input graphics data is demultiplexed by the input data demultiplexer 126, transferred over the input data bus 128 to the input data formatter 130 where the data is formatted, and then the formatted data is transmitted over input data buses 129 and 131 to the pixel ALUs 120 and 121 respectively for processing.

Graphics data transmitted from the Dual Pixel 3DRAM chip 110 to the rendering bus 112 is sent from the SRAM pixel buffer 118 over the SRAM output data bus 132. Prior to being received on the rendering bus 112, the graphics data is formatted by the output data formatter 134, transmitted over the output data bus 135, multiplexed by the output data multiplexer 136 and then transferred off the chip 110 over the I/O bus 124.

Data is routed between the pixel ALUs 120 and 121 and the SRAM pixel buffer 118 through two separate data busses 138 and 139. Graphics data transmitted from the pixel ALUs 120 and 121 to the SRAM pixel buffer 118 is formatted on the way by the pixel ALU-to-SRAM formatter 140 and then routed to the SRAM pixel buffer 118 over data bus 141.

Graphics data transmitted from the SRAM pixel buffer 118 to the pixel ALUs 120 and 121 is routed through the SRAM output data bus 132 to the SRAM-to-pixel ALU formatter 144, and then the formatted data is transmitted to the pixel ALUs 120 and 121 over the SRAM pixel buffer data buses 142 and 143.

Address and control information, which is used to direct operations performed on the chip 110, is transmitted to the Dual Pixel 3DRAM chip 110 over the address and control bus 114. The information is received at the address and control input bus 146, demultiplexed by the address and control demultiplexer 148 and transmitted along the address and control bus 150 to the decoder 151. The decoder 151 receives the demultiplexed address and control information, decodes it, and then transmits the decoded information to the pixel ALUs 120 and 121 and to the SRAM pixel buffer 118 over the pixel ALU operations channel 152, to the SRAM pixel buffer 118, the pipeline registers 127 and 137 and the DRAM array 116 over the global bus operations channel 154, and to the DRAM array 116 over the bank operations channel 156.

Figure 2A:
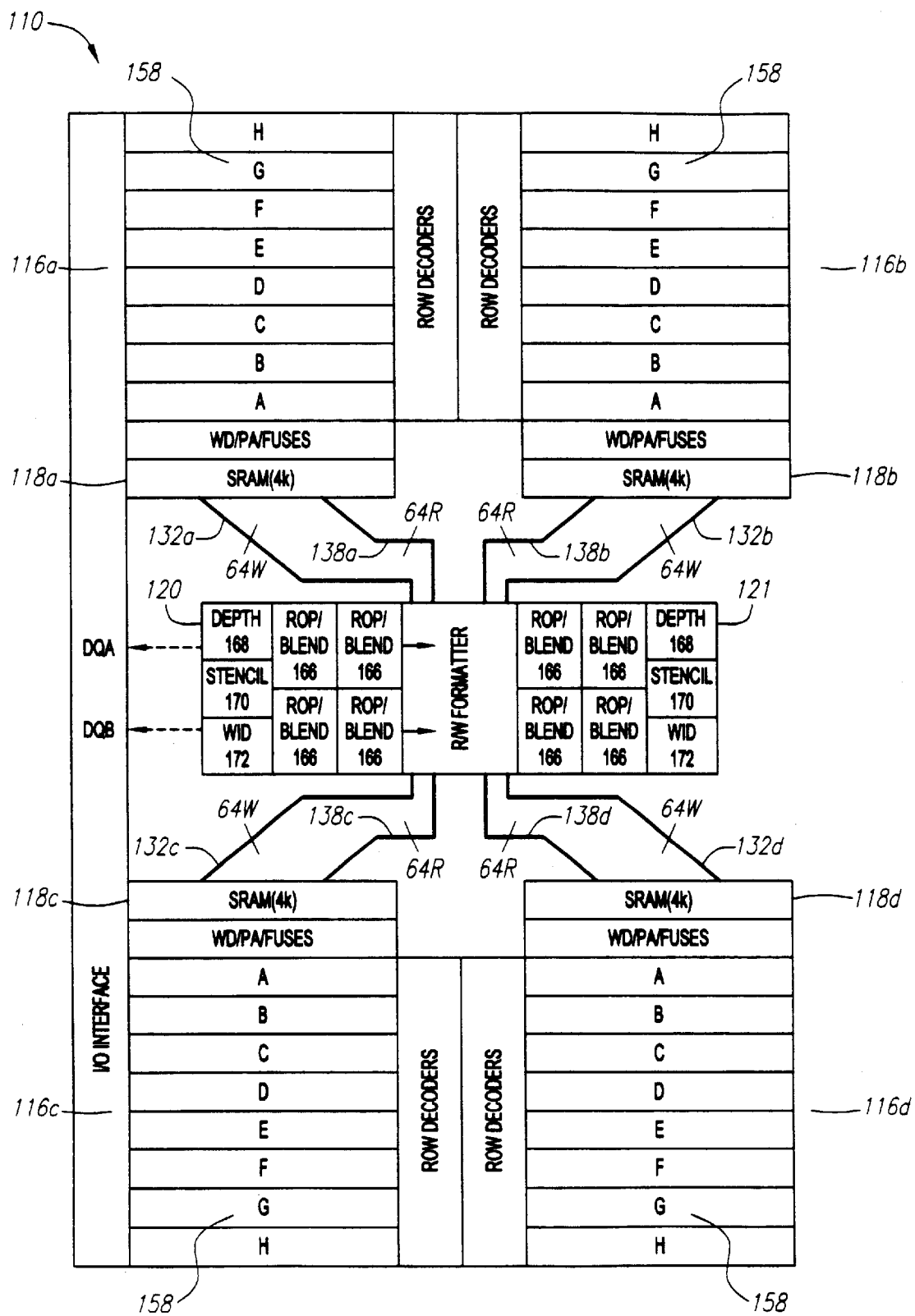
FIG. 2A illustrates a die size floor plan for one embodiment of the Dual Pixel 3DRAM chip comprising the elements depicted in FIG. 2. This embodiment is configured to operate with either the RAMBUS™ or SyncLink input/output interface specification.

FIG. 2A illustrates a die size floor plan for one embodiment of the Dual Pixel 3DRAM chip 110 which is configured to operate with either the RAMBUS™ or SLDRAM (formerly known as SyncLink) input/output interface specifications. Unlike the functional block diagram of FIG. 2, the layout of the Dual Pixel 3DRAM chip 110 in FIG. 2A shows how some of the functional elements shown in FIG. 2 may be physically implemented in a particular embodiment of the Dual Pixel 3DRAM chip 110.

For example, this physical embodiment of the Dual Pixel 3DRAM chip 110 features a DRAM array 116 that is physically separated into four sections 116a–d located at the four corners of the chip 110. Despite this physical separation, the DRAM array 116 operates as one functional unit as depicted in FIG. 2. The DRAM array 116 of FIG. 2A comprises eight physically interleaved modular DRAM banks 158 labeled A–H in each of the four sections 116a–d of FIG. 2A. As with the DRAM array 116, while the eight DRAM banks 158 A–H are physically distributed over the four corners of the chip 110, they operate as eight (rather than thirty-two) functional units.

The overall DRAM capacity of the Dual Pixel 3DRAM chip 110 varies depending on the number of modular DRAM banks 158 used within a specific chip 110 configuration. Each DRAM bank 158 comprises a set of line buffers comprised of sense amplifiers 160. See FIGS. 19 and 19A. (The terms "line buffers" and "sense amplifiers" or "sense amps" are used herein interchangeably, and all refer to element 160.) Each DRAM bank 158 comprises a plurality of DRAM pages 162 comprising several lines 164 of DRAM bits.

One embodiment of the Dual Pixel 3DRAM chip 110 has a DRAM array 116 totaling 40 Megabits, comprised of ten interleaved DRAM banks 158, wherein each bank 158 comprises five hundred and twelve pages 162, and wherein each page 162 comprises eight 1024-bit lines 164. In this embodiment, the structure of each DRAM bank 158 remains constant at 4 Megabits of DRAM (1024 bits/line*8 lines/page*512 pages/bank=4,194,304 bits/bank 4 Megabits/bank). By varying the number of interleaved DRAM banks 158 in a Dual Pixel 3DRAM chip 110, the overall storage capacity of the chip 110 can be adjusted without modifying the chip's internal architecture.

The line buffers 160 are comprised of sense amplifiers and serve as a second level of cache lines when accessing pixel data stored in the DRAM banks 158. (The first level of cache lines are the lines of memory in the SRAM pixel buffer 118.) The line buffers 160 are directly mapped to the DRAM banks 158. In one embodiment, each line buffer 160 maps to one of the pages of the corresponding DRAM bank 158. For one embodiment, a line buffer entry comprises 1 line of 1024 bits.

Referring back to FIG. 2, the pixel buffer 118 is a high speed, multi-ported static RAM (SRAM) component. Data is transferred between the SRAM pixel buffer 118 and the DRAM array 116 over the global bus 122. In the depicted embodiment, the global bus 122 comprises two unidirectional buses, the global write bus 123 and the global read bus 125.

The SRAM pixel buffer 118 reads data which has been formatted by the pixel ALU-to-SRAM formatter 140 over the pixel ALU data bus 138. The SRAM pixel buffer 118 writes data to both the output data formatter 134 and the SRAM-to-pixel ALU formatter 144 over the SRAM output data bus 132. The output data formatter 134 unpacks data fields from the SRAM pixel buffer 118 and re-packs some of the fields for display output transmitted over the rendering bus 112. The SRAM-to-pixel ALU formatter 144 also unpacks data fields for use by the pixel ALUs 120 and 121.

In one embodiment, the global write and read buses 123 and 125 each carry 1024 bits between the SRAM pixel buffer 118 and the DRAM array 116, while the pixel ALU data buses 138 and 139, and the SRAM output data bus 132 are each 256 bits wide.

In one embodiment, the SRAM pixel buffer 118 holds eight cache lines, wherein each cache line comprises 1024 bits (1 Kilo-bit) of memory. The 8-Kilobit SRAM pixel buffer 118 is organized into 8 1-Kilobit cache lines. In another embodiment, the SRAM pixel buffer 118 is organized into sixteen 1-Kilobit cache lines.

The global bus 122 enables communication between the SRAM pixel buffer 118 and the sense amps 160 of the DRAM array 116. In a preferred embodiment, the global bus 122 comprises dual, 1024-bit, 10-nanosecond buses 123 and 125. The global read bus 125 transfers data from the sense amps 160 to the SRAM pixel buffer 118 through a read pipeline register 127, and the global write bus 123 transfers pixel data and mask data from the SRAM pixel buffer 118 to the sense amps 160 through a write data pipe-line register 137. This embodiment also employs a write mask pipeline register 145 and a write mask bus 147 to control which bits in the DRAM array 116 are overwritten. In another embodiment, the global bus 122 comprises both a global read bus 125 and a global write bus 123, however no pipeline registers 127, 137 and 145 are employed. In yet another embodiment, the global bus 122 comprises a single, bi-directional bus which is used alternately for both reading to, and writing from the SRAM pixel buffer 118.

Data transfer between the pixel ALUs 120 and 121 and the SRAM pixel buffer 118 differs from that between the SRAM pixel buffer 118 and the DRAM array 116 over the global bus 122. In one embodiment, the pixel ALUs 120 and 121 write data over 256-bit, 5-nanosecond data buses 138 and 139, and the pixel ALUs 120 and 121 read data transmitted over 256-bit, 5-nanosecond buses 142 and 143.

1.1 Pixel ALUs

The pixel ALUs 120 and 121 enable pipelined read-modify-write operations into the SRAM pixel buffer 118. The pipelined read-modify-write operations include Z-buffer compare, RGB alpha raster operations, and blending operations. The multi-ported nature of the SRAM pixel buffer 118 of a preferred embodiment enables parallel transfer of an entire cache line between the line buffers 160 of the DRAM array 116 and the SRAM pixel buffer 118 over the global bus 122.

As depicted in FIGS. 2 and 2A, the Dual Pixel 3DRAM chip 110 features two on-chip Pixel ALUs 120 and 121 to minimize off-chip bandwidth requirements. Updating a 96- or 128-bit pixel requires the transmission of 40 bits of color plus 32 bits of depth information.

The Dual Pixel 3DRAM graphics subsystem 100 employs high bandwidth I/O technology, such as Direct RDRAM™ BY RAMBUS or SLDRAM (formerly known as SyncLink), to transmit data and control information between the rendering controller 102 and the Dual Pixel 3DRAM chip 110, while minimizing pin count on the chip 110. In one embodiment, the Dual Pixel 3DRAM graphics subsystem 100 uses an 18-bit, half-duplex, bi-directional data bus 112 transitioning at 1.8 Gigabits per second (i.e., data transitions on both the rising and falling edges of a 400 MHz clock), and a unidirectional 8-bit control bus 114 from the rendering controller 102 to the Dual Pixel 3DRAM chips 110a–h, which transitions at 800 Megabits per second. In this embodiment, the Pixel ALUs 120 and 121 operate at either 200 MHz or 133 MHz, depending on the format of the pixels being processed, so the narrow, high frequency data streams received at the pins of the Dual Pixel 3DRAM chip 110 need to be demultiplexed into data streams which are four or six times wider internally. Similarly, data which is processed on the Dual Pixel 3DRAM chip 110 must be multiplexed before being sent over the rendering bus 112 to the rendering controller 102.

Referring to FIG. 2A, the pixel ALUs 120 and 121 are centrally located on the Dual Pixel 3DRAM chip 110. The pixel ALUs 120 and 121 each comprise two complete sets of processing elements, thereby enabling the pixel ALUs 120 and 121 to process two pixels per operation under many circumstances. The format of the pixels being processed determines whether the pixel ALUs 120 and 121 can process two pixels independently, or whether their resources must be combined to process a single pixel at a time. A complete set of processing elements comprises the following: four raster operation (ROP)/blend units 166, a depth unit 168, a stencil unit 170 and a window identification (WID) unit 172.

Figure 3:
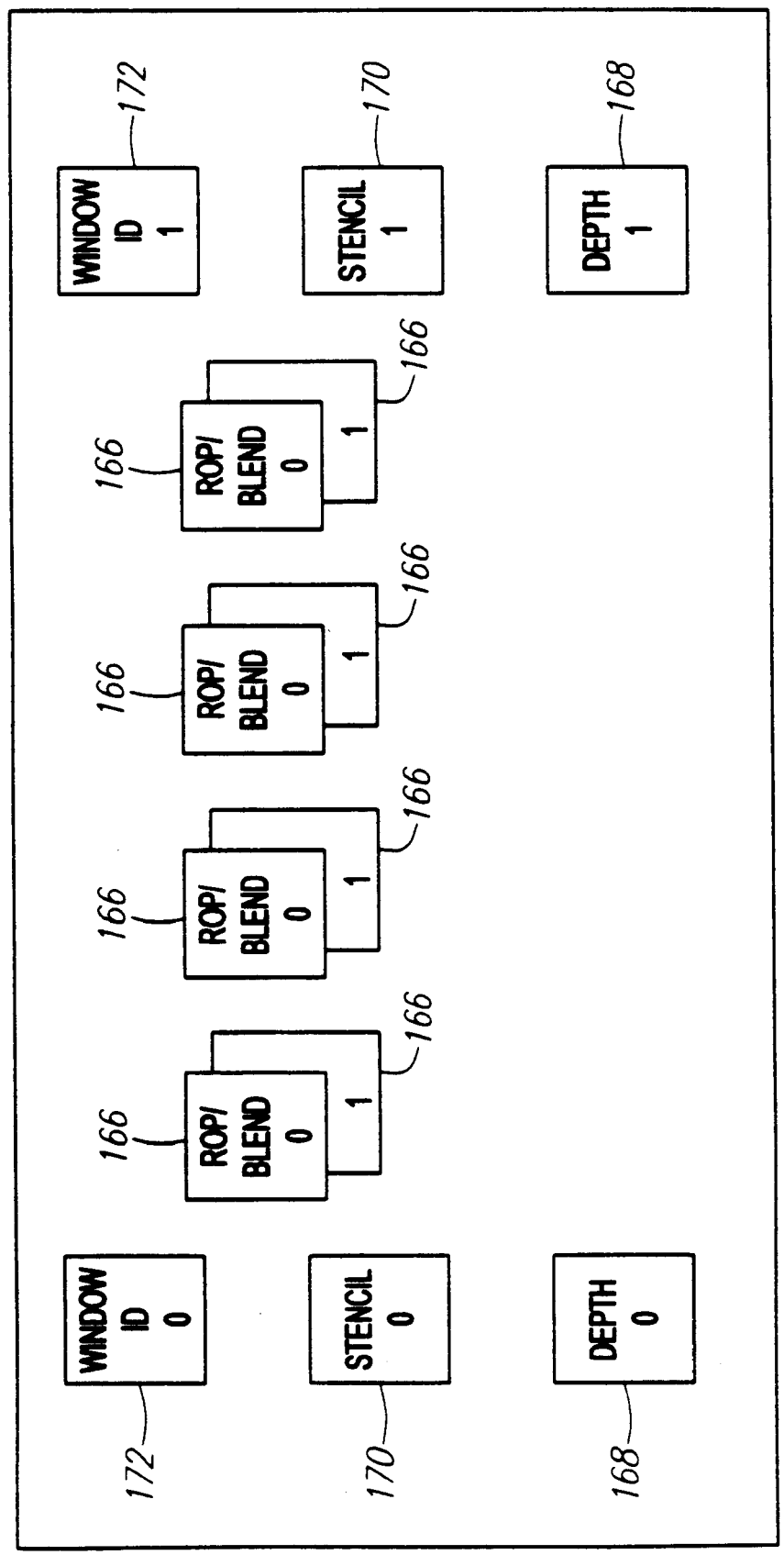
FIG. 3 illustrates, in block diagram format, an embodiment of the pixel ALU comprising two sets of processing elements wherein some of the circuitry of some of the processing elements is shared.

FIG. 3 shows one embodiment of the pixel ALUs 120 and 121 comprising two sets of processing elements. The first set of processing elements correspond to the first pixel ALU 120, and are labeled with a "0". The second set of processing elements correspond to the second pixel ALU 121, and are labeled with a "1". The ROP/blend units 166 are depicted as overlapping to indicate that some of the circuitry used to implement the units 166 is shared.

Figure 3A:
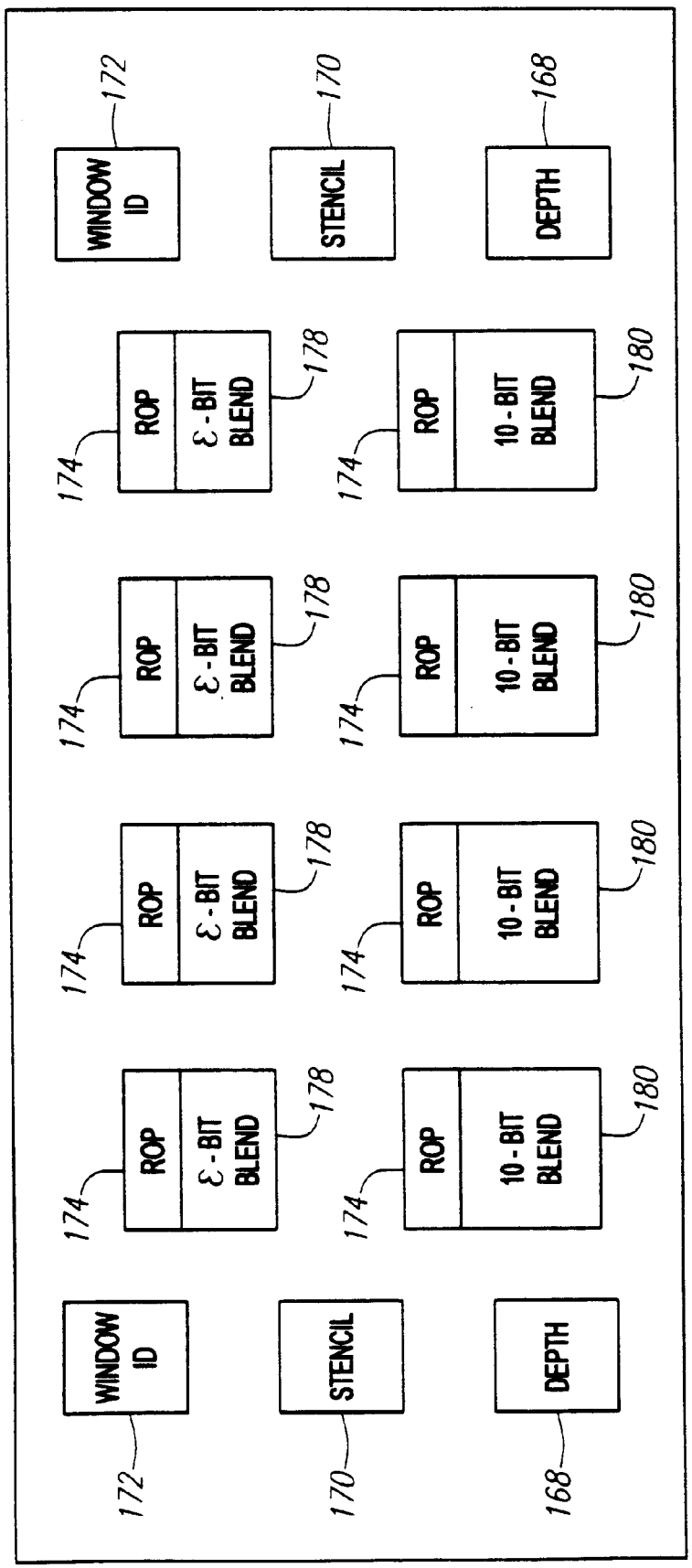
FIG. 3A illustrates, in block diagram format, an embodiment of the pixel ALU comprising two separate sets of processing elements.

FIG. 3A shows another embodiment of the pixel ALUs 120 and 121 which also comprise two complete sets of processing elements. The ROP/blend units 166 are broken down into separate ROP units 174 and blend units 176. In this embodiment, there is no shared circuitry between the ROP/blend units 166. This embodiment features four 8-bit blend units 178 and four 10-bit blend units 180. The different capacity blend units are provided to accommodate larger pixel formats. In a preferred embodiment, each of the ROP/blend units is a 10-bit unit.

Figure 4:
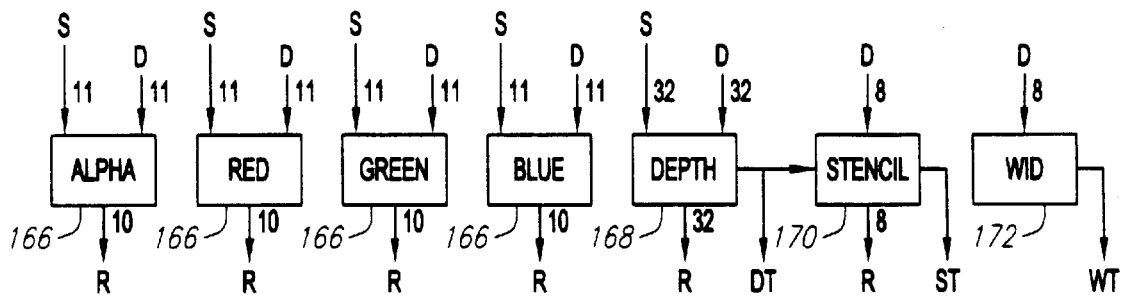
FIG. 4 illustrates a complete set of processing elements for one embodiment of the pixel ALU and the type of information that is input to, and output from those processing elements. The set of processing elements includes four raster operations (ROP)/blend units (one for processing each of the alpha, red, green and blue components of a pixel), a depth unit, a stencil unit and a window identification (ID) unit.

FIG. 4 depicts a complete set of processing units within either one of the pixel ALUs 120 and 121. Combined on the chip 110, the pixel ALUs 120 and 121 have two complete sets of these units, thereby enabling the Dual Pixel 3DRAM chip 110 to process two pixels per operation under many circumstances. The letter "S" indicates source data transmitted to the pixel ALUs 120 or 121 over the rendering bus 112. The letter "D" indicates destination data transmitted to the Pixel ALUs 120 or 121 from the SRAM pixel buffer 118 over the global bus 122. The letter "R" indicates result data which is transmitted back to the SRAM pixel buffer 118 over the global bus 122. The letters "DT", "ST" and "WT" are the results of tests performed by the depth unit 168, stencil unit 170, and window ID unit 172 respectively. A complete set of processing units includes four ROP/blend units 166 to provide for processing of the alpha, red, green and blue components of each pixel. In this embodiment of the Dual Pixel 3DRAM chip 110, the source and destination data input streams to the ROP/blend units 166 are each 11 bits wide. The result data stream output from the ROP/blend units 166 is 10 bits wide. For the depth unit 168, the source, destination and result data streams are 32 bits wide. The stencil unit 170 receives a destination stream and outputs a result stream, both of which are 8 bits wide. And the window ID unit 172 receives an 8-bit destination stream of data.

1.1.1 ROP/Blend Unit

Figure 5:
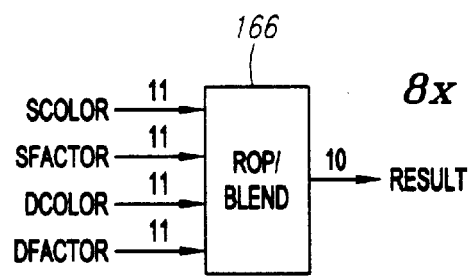
FIG. 5 illustrates one embodiment of a single ROP/blend unit in block diagram format.

FIG. 5 illustrates a single ROP/blend unit 166 in block diagram form for one embodiment. In this embodiment, eight 10-bit ROP/blend units 166 are located within the two pixel ALUs 120 and 121. Each of the eight ROP/blend units 166 is functionally identical, and has four 11-bit data inputs (for source color (Sc), source factor (Sf), destination color (Dc), and destination factor (Df)) and a 10-bit data output for the result. Each ROP/blend unit 166 performs one of the following six operations: (1) ROP(Sc, Pc, Dc); (2) min(Sc, Dc); (3) max(Sc, Dc); (4) Sc*Sf+Dc*Df; (5) Sc*Sf−Dc*Df; or (6) Dc*Df−Sc*Sf.

When performing ROP, min, max or 8-bit blend operations, all eight ROP/blend units 166 can work in parallel. When performing 10-bit blend operations, pairs of blend units 176 need to be combined together to perform the required processing. Thus when 10-bit blend operations are performed by the Dual Pixel 3DRAM Chip 110, only one pixel can be processed at a time. Another embodiment has eight 10-bit ROP/blend units 166 and can process two pixels at a time in all cases.

Figure 7:
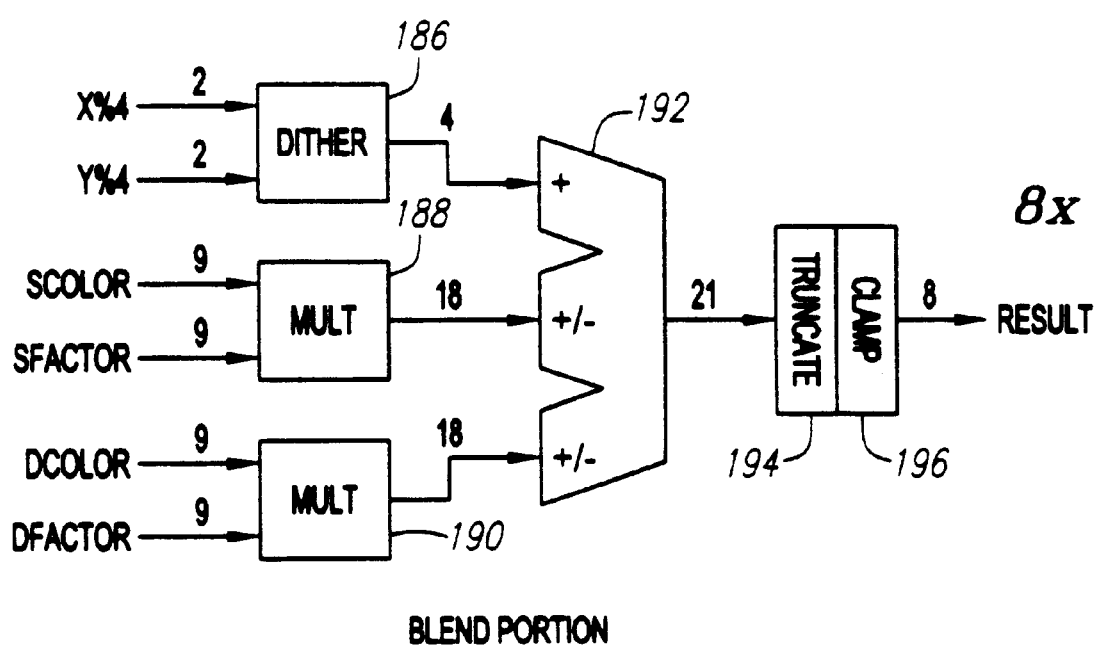
FIG. 7 illustrates one embodiment of a single 8-bit blend unit in block diagram format.

The source and destination blending factors, "Sf" and "Df," are derived from the source, destination, and pattern colors as illustrated in Table 1, below:

multipliers 188 and 190, an adder 192, one truncate device 194, and one clamp device 196. An 8-bit blend unit 178 is shown in FIG. 7. Eight of these units are required in order to be able to blend two pixels (or samples when performing anti-aliasing) per operation.

The source and destination color values S color and D color represent values within the range [0.0, 1.0], regardless of how many bits are used to represent them. Each bit encoding represents a range of values. For example, an 8-bit input of 14 represents the range [14/256, 15/256). When performing calculations, a single value is chosen to represent the entire range. If the value 14/256 were chosen to represent the range [14/256, 15/256), then the calculation error would be biased toward the lower end of the range. If the mid-point of the range were chosen, 14.5/256, then the calculation error would be evenly biased with respect to the range, and the final result would be more accurate. This can be accomplished by concatenating a 1 to the least significant bit of the inputs to the multipliers. Hence the 8-bit blend units 178 require 9-bit-by-9-bit multipliers 188 and 190.

FIG. 8 shows the format of intermediate values during the blending operation calculations. A dither-offset value is calculated based on the two least significant bits of the pixel's X and Y addresses. The two products and dither

TABLE 1

Blend Factors

| Parameter | Factor | | | | Sf | Df |
|---|---|---|---|---|---|---|
| | Alpha | Red | Green | Blue | | |
| GL_ZERO | | | 0 | | x | x |
| GL_ONE | | | 1 | | x | x |
| GL_SRC_COLOR | Sα | SR | SG | SB | | x |
| GL_ONE_MINUS_SRC_COLOR | 1-Sα | 1-Sr | 1-Sg | 1-Sb | | x |
| GL_DST_COLOR | Dα | Dr | Dg | Db | x | |
| GL_ONE_MINUS_DST_COLOR | 1-Dα | 1-Dr | 1-Dg | 1-Db | x | |
| GL_SRC_ALPHA | | | Sα | | x | x |
| GL_ONE_MINUS_SRC_ALPHA | | | 1-Sα | | x | x |
| GL_DST_ALPHA | | | Dα | | x | x |
| GL_ONE_MINUS_DST_ALPHA | | | 1-Dα | | x | x |
| GL_SRC_ALPHA_SATURATE | 1 | | min (Sα, 1-Dα) | | x | |
| CL_CONSTANT_COLOR_EXT | Pα | Pr | Pg | Pb | x | x |
| CL_ONE_MINUS_CONSTANT_COLOR_EXT | 1-Pα | 1-Pr | 1-Pg | 1-Pb | x | x |
| CL_CONSTANT_ALPHA_EXT | | | Pα | | x | x |
| CL_ONE_MINUS_CONSTANT_ALPHA_EXT | | | 1-Pα | | x | x |

Figure 6:
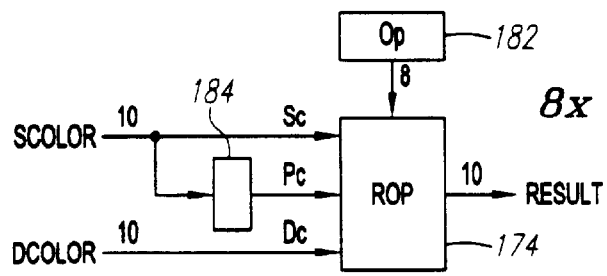
FIG. 6 illustrates one embodiment of a single raster operation (ROP) unit in block diagram format.

Referring now to FIG. 6, the raster operation (ROP) portion 174 of the ROP/Blend unit 166 performs 1 of 256 Boolean operations on source Sc, destination Dc, and pattern Pc inputs. A ROP register 182, which is set by information transmitted over the address and control bus 114, determines which of the 256 boolean operations is performed. In the case where three inputs are needed, one input is written to a pattern register 184 before the raster operation takes place. A one-bit slice of the ROP portion 174 can be implemented with the following Boolean equation:

Result=(Op[0]&~Dc&~Sc&~Pc)|(Op[1]&Dc&~Sc&~Pc)|

(Op[2]&~Dc&~Sc&~Pc)|(Op[3]&Dc&~Sc&~Pc)|

(Op[4]&~Dc&~Sc&~Pc)|(Op[5]&Dc&~Sc&~Pc)|

(Op[6]&~Dc&~Sc&~Pc)|(Op[7]&Dc&~Sc&~Pc);

Referring to FIGS. 7–11B, the blend portion 176 of the ROP/blend unit 166 comprises the following processing circuitry or elements: one dither calculation device 186, two offset are added together. At most, one of the product values may be negated. The sum is then truncated and clamped to produce the result.

In one embodiment, a dispersed-dot ordered dither algorithm with a 4-by-4 Bayer dither matrix is employed, as reflected in FIG. 9 and in "Computer Graphics Principles and Practice," Foley, vanDam, Feiner, and Hughes, second edition pp. 570–1, which text is incorporated herein by reference as if set forth in its entirety. The dither value, in the range (−0.5, 0.5), offsets the result value prior to truncation. Of course, other dither algorithms well known in the art may also be used.

Figure 10:
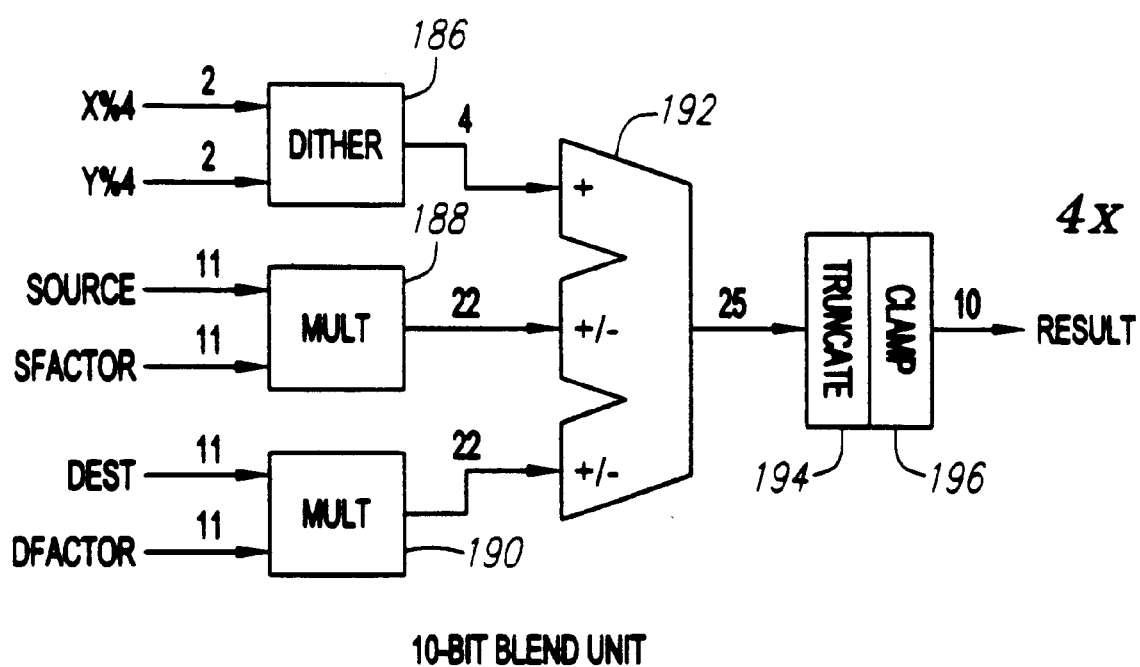
FIG. 10 illustrates one embodiment of a 10-bit blend unit in block diagram format.

FIG. 10 depicts a 10-bit blend unit 180. Four of these units are required to be able to blend one pixel per operation. In one embodiment, the 10-bit blend unit 180 is implemented in such a manner so as to reuse as much logic as possible between each 10-bit blend unit 180 and each pair of 8-bit blend units 178. The 10-bit blend unit 180 requires two 11-bit-by-11-bit multipliers 188 and 190 for the same reason as discussed above concerning the 8-bit blend unit 178.

Figure 11A:
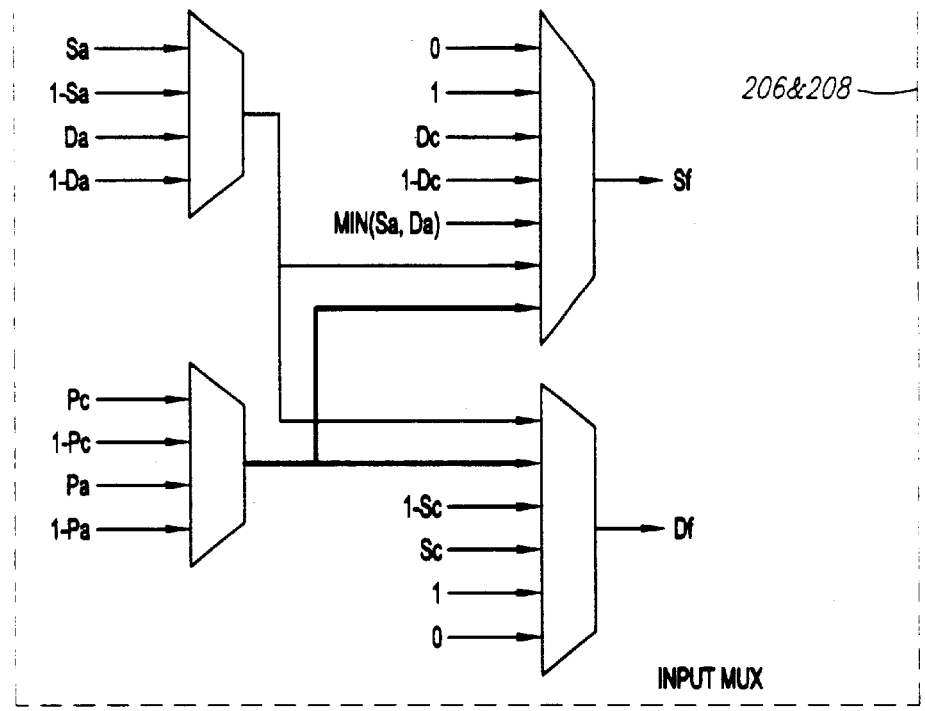
FIG. 11A illustrates the details of the input multiplexers to the ROP/blend units for one embodiment.

This embodiment also features two input multiplexers 206 and 208 through which source factor, Sf, and destination factor, Df, data is input into the ROP/blend unit 166. FIG. 11A provides a diagram of the details of input multiplexers 206 and 208.

1.1.2 Depth Unit

Figure 12:
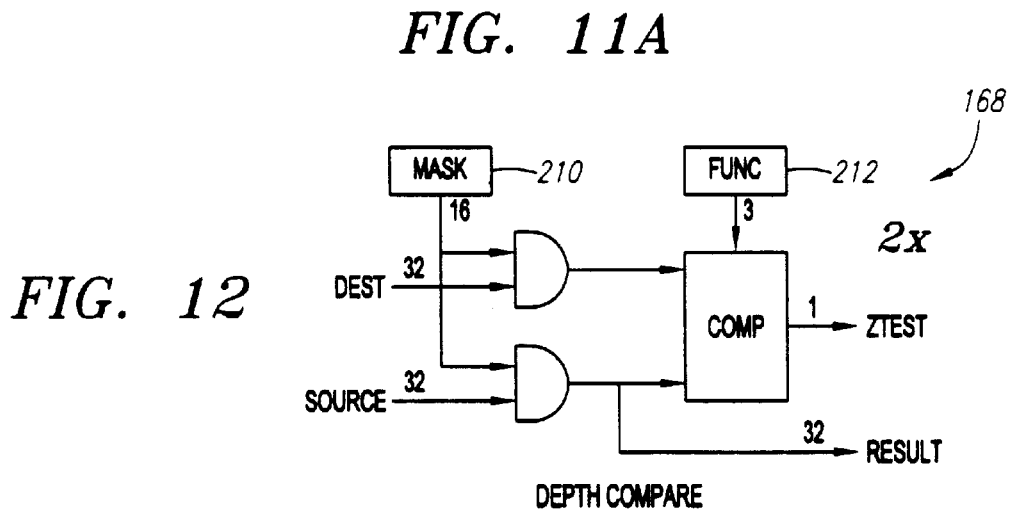
FIG. 12 illustrates one embodiment of a depth compare unit in block diagram format.

FIG. 12 presents a block diagram of the depth unit 168. There are two depth units 168 in the pixel ALUs 120 and 121. The two depth units 168 compare 32 bits of source data with 32 bits of destination data. Control information is provided to a 16-bit mask register 210 which is then bitwise anded with source and destination data prior to the compare operation. The unsigned integer compare operation is specified by a 3-bit register field in a function/operation register 212 which specifies one of the following eight tests: (1) fail, (2) src<dest, (3) src==dest, (4) src<=dest, (5) src>dest, (6) src!=dest, (7) src>=dest, (8) pass. Positive IEEE single precision floating point numbers will compare correctly if the sign bit is masked to zero.

1.1.3 Stencil Unit

Figure 13:
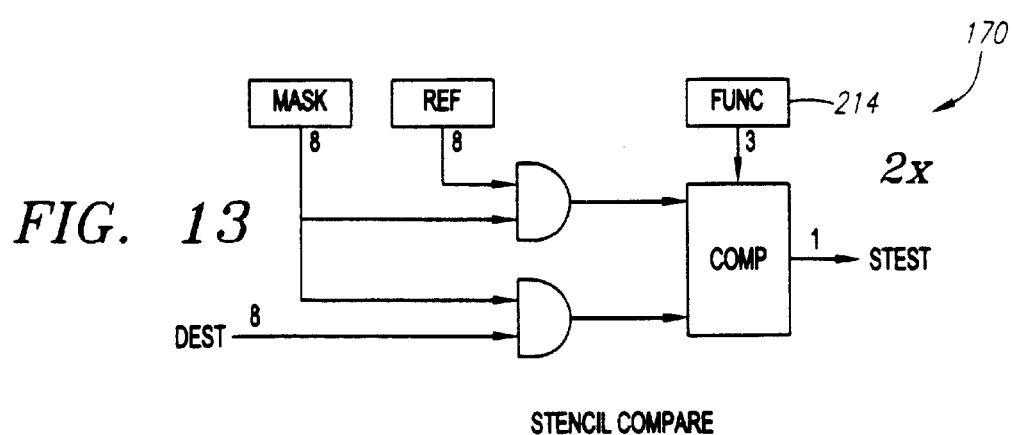
FIG. 13 illustrates one embodiment of a stencil compare unit in block diagram format.
Figure 14:
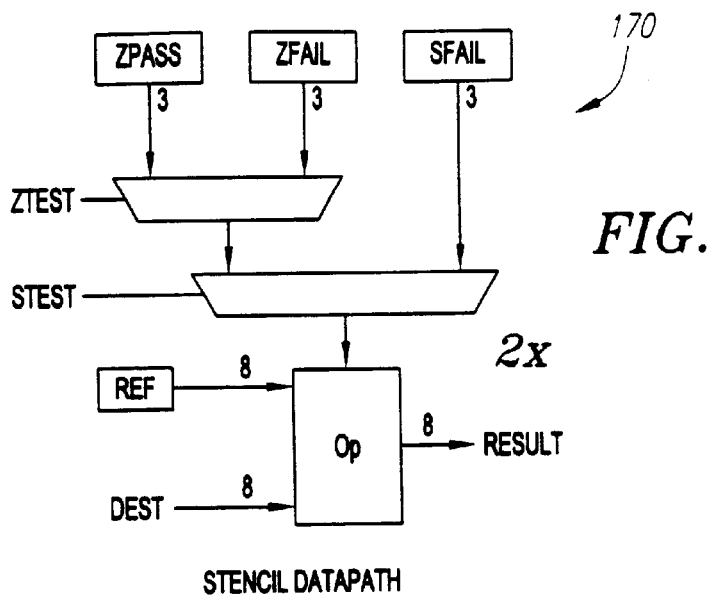
FIG. 14 illustrates one embodiment of the stencil data path in block diagram format.

FIGS. 13 and 14 present block diagrams of the stencil unit 170. There are two stencil units 170 within the pixel ALUs 120 and 121. Each of the two 8-bit stencil units 170 has an 8-bit data input for destination stencil, a 1-bit depth test input, an 8-bit data output and a 1-bit compare output. The unsigned integer compare operation is specified by a 3-bit register field in a function/operation register 214 and specifies one of the following eight tests: (1) fail, (2) ref<dest, (3) ref==dest, (4) ref<=dest, (5) ref>dest, (6) ref!=dest, (7) ref>=dest, (8) pass.

Referring to FIG. 14, one of three stencil operation codes is selected, depending upon the statuses of the depth and stencil tests. The operation code determines which stencil operation is performed. The possible stencil operations are: dest, 0, ref, wrap(dest+1), wrap(dest-1), saturate(dest+1), saturate(dest-1), $\overline{\text{dest}}$.

1.1.4 Window ID Unit

Figure 15:
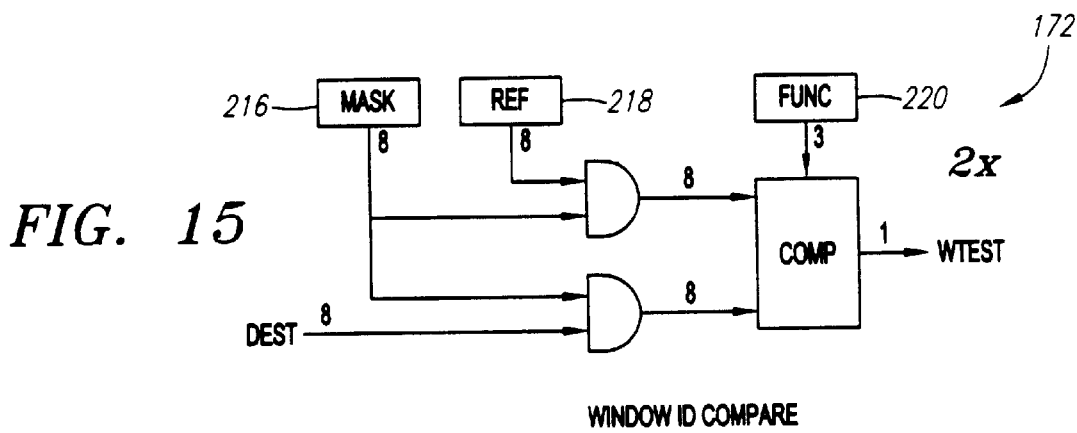
FIG. 15 illustrates one embodiment of a window ID compare unit in block diagram format.

FIG. 15 provides a block diagram of the window identification (ID) unit 172. There are two window ID units 172 within the pixel ALUs 120 and 121. Each of the two 8-bit window ID compare units 172 has an 8-bit data input for destination WID and a 1-bit compare result output. The window ID unit's 172 behavior is controlled by an 8-bit field in a mask register 216, an 8-bit field in a reference register 218, and a 3-bit field in a function register 220. The 2-bit function register field specifies one of the following eight tests: (1) fail, (2) ref<dest, (3) ref==dest, (4) ref<=dest, (5) ref>dest, (6) ref!=dest, (7) ref>=dest, (8) pass. The Window ID units 172 and the stencil test units 170 are functionally identical.

The test results from the window ID unit 172, the stencil unit 170 and the depth unit 168 are used to control operations in the Dual Pixel 3DRAM chip 110. Table 2 lists the actions which are taken or not taken based on the results of the three units.

TABLE 2

Pixel Texts

| WID Test | Stencil Test | Depth Test | Action |
|---|---|---|---|
| Fail | — | — | Don't write pixel |
| Pass | Fail | — | Write only stencil bits |
| Pass | Pass | Fail | Write only stencil bits |
| Pass | Pass | Pass | Write stencil, depth, and color bits |

1.2 SRAM Pixel Buffer

Figure 16:
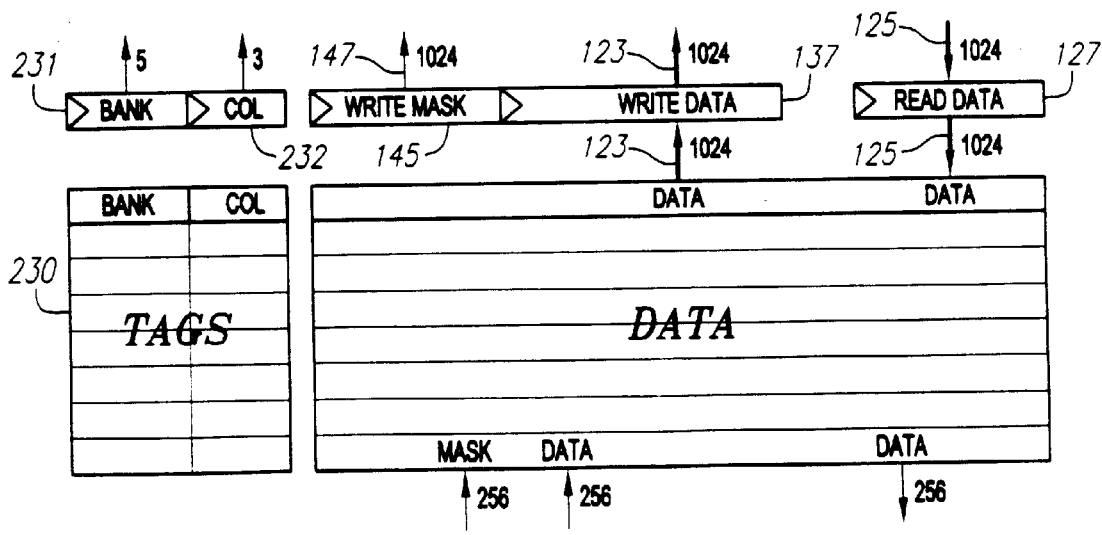
FIG. 16 illustrates one embodiment of the SRAM pixel buffer in block diagram format.

FIGS. 16 and 17depict the SRAM pixel buffer 118. For one embodiment, the SRAM pixel buffer 118 is implemented with an 8-word×1024-bit, multi-ported SRAM. The global bus 122 comprises a 1024-bit, 10-nanosecond read bus 125 which transfers data from the sense amps 160 of the DRAM array 116 to the SRAM pixel buffer 118 through a 1024-bit pipeline register 127. The global bus 122 also comprises a 1024-bit, 10-nanosecond write bus 123 which transfers data from the SRAM pixel buffer 118 to the sense amps 160 through a 1024-bit pipeline register 137. In this embodiment, the global bus 122 also transfers 1024 bits of mask data from the SRAM pixel buffer 118 to the sense amps 160 through a write mask pipeline register 145 and a write mask bus 147.

Each cache line in the SRAM pixel buffer 118 has associated with it a tag 230 comprising 5 bits of bank address and 3 bits of column address. The tags 230 are used to keep track of the location from where the data which is presently stored in the SRAM pixel buffer 118 came.

A global bus read operation is initiated by either the Read Cache Line (RL) or Change Cache Line (CL) operation. In the first 10 nanosecond cycle, 1024 bits of data are copied from the specified DRAM bank 158 and column to the read data pipeline register 127. In the second 10 nanosecond cycle, the 1024 bits of data are copied from the read data pipeline register 127 to the specified line in the SRAM pixel buffer 118, and the bank and column addresses from which that data was originally retrieved are written to the cache line's tag 230.

A global bus write operation is initiated by the Write Cache Line (WL), Masked Write Cache Line (ML) or Change Cache Line (CL) operation. In the first 10 nanosecond cycle, 1024 bits of data are copied from the specified line in the SRAM pixel buffer 118 to the write data pipeline register 137, and 1024 bits of mask data are generated from plane mask and byte mask registers and copied to the write mask pipeline register 147. If the operation is a WL or ML, the operation's bank and column addresses are copied to the bank and column pipeline registers 231 and 232. If the operation is a CL, the bank and column pipeline registers 231 and 232 copied from the specified cache line's bank and column tags 230. In the second 10 nanosecond cycle, the contents of the write data pipeline register 137 are copied to the DRAM bank and column specified by the bank and column pipeline registers 231 and 232 under control of the write mask pipeline register 145.

A sample function for the above-described procedure is provided below:

function Mask[1023:0]
input [511:0] PlaneMask;
input [127:0] Bytemask;
input IsMasked;
integer I;
begin
   for (i=0; i<1024; i=i=1) begin
      Mask[I]=(!IsMasked)|(PlaneMask[i%512]&ByteMask[i/8]);
   end;
end;
endfunction The pixel ALU read operation is initiated by the Read Data (RDAT), Read Pixel (RPIX), Single Pixel (SPIX) and Dual Pixel (DPIX) operations. The Pixel ALU data bus 141 is 256-bits wide and operates at a rate of 5-nanoseconds, and the SRAM pixel buffer data bus 142 is also 256-bits wide and operates at a rate of 5-nanoseconds. The SRAM pixel buffer 118 has an additional line containing a 512-bit plane mask 222. During a ML operation, the 512-bit plane mask and 128-bit byte mask registers are combined to generate the contents of a 1024-bit write mask 145 which is latched at the same time as the write data.

Read and write ports are addressed on 128-bit boundaries. The 256-bit data channels 138 and 142 operate at 200 MHz, while the 1024-bit global bus channels 122 operate at 100 MHz. In a preferred embodiment, the SRAM pixel buffer 118 holds 8 cache lines 224. The 256-bit data channels 138 and 142 must be able to access 256 consecutive bits of a cache line 224, starting at any 128-bit boundary. As depicted in FIG. 2A, this requirement is met in one embodiment by partitioning the SRAM pixel buffer 118 into four physical arrays 118*a–d* with 64-bit read and write data channels 138*a–d* and 132*a–d*. In this embodiment, separate read and write addresses are applied to each of the four separate arrays. In another embodiment, the global bus 122 allows for concurrent read and write operations between the SRAM pixel buffer 118 and the sense amps 160, thereby eliminating the need for dirty tags.

Figure 17:
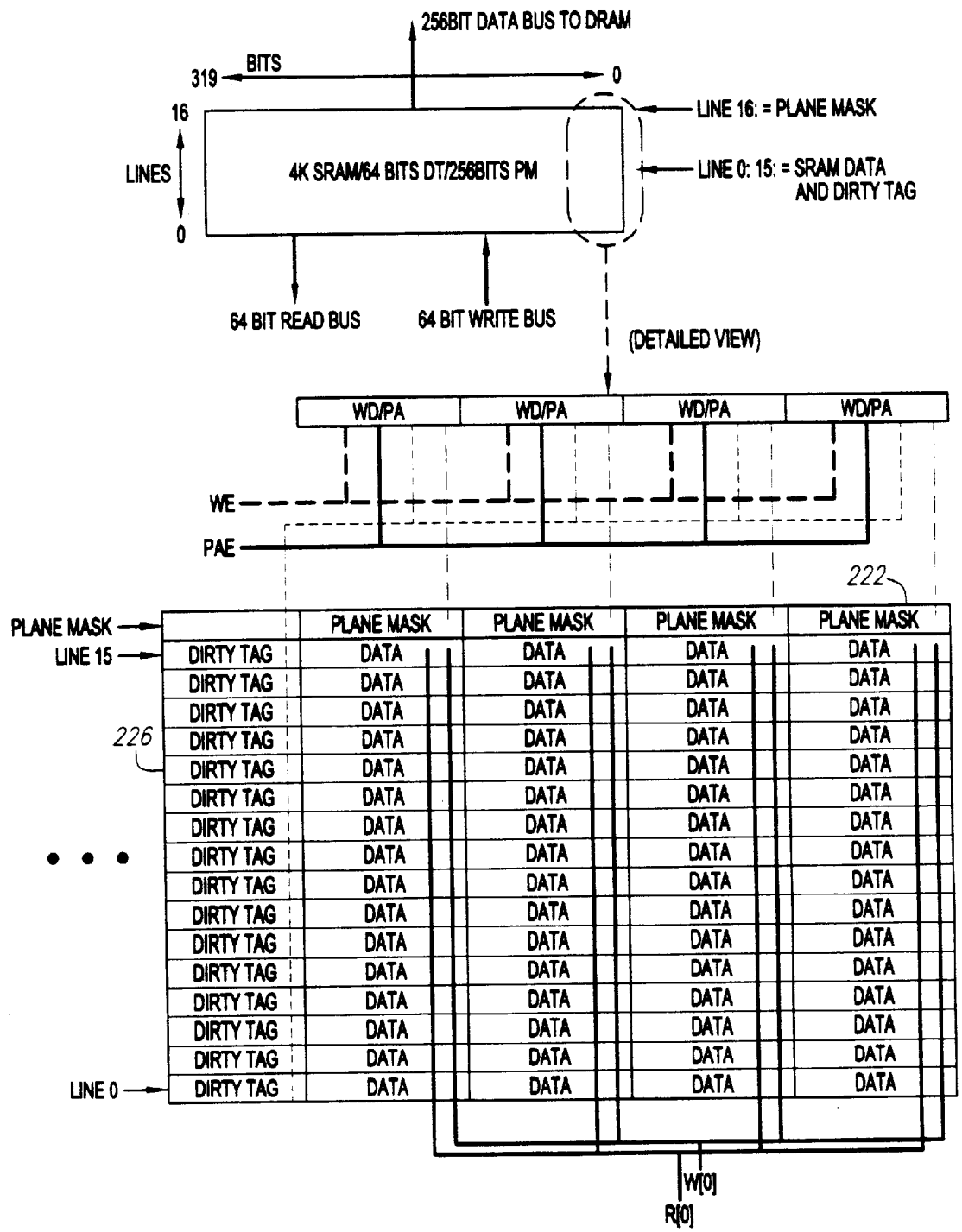
FIG. 17 illustrates a second embodiment of the SRAM pixel buffer in block diagram format.

In another embodiment, dirty tags 226 are used within the SRAM pixel buffer to indicate which bits of the SRAM pixel buffer cache lines 224 have been updated by the pixel ALUs 120 and 121 since the data was transferred from the DRAM array 116. Referring to FIG. 17, the dirty tag SRAM 226 is implemented with a 16-word×256-bit dual-ported SRAM. The global bus 122 connects to 256-bit, 10-nanosecond read/write ports. The pixel ALUs 120 and 121 write mask data to a 256-bit, 5-nanosecond write port, with 256 per bit write enables (WE).

During a Read Cache Line (RL) operation, a line of data is written into a data portion of the SRAM pixel buffer 118, and the corresponding line in the tag SRAM 226 is cleared.

1.3 Memory Configuration

Figure 18:
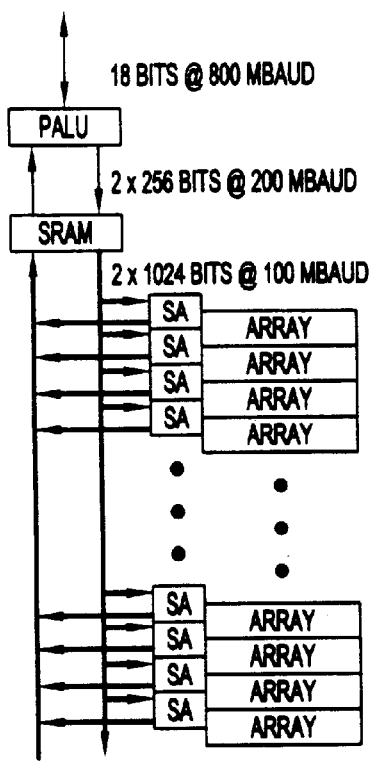
FIG. 18 illustrates the Dual Pixel 3DRAM chip memory configuration at a high level.
Figure 19:
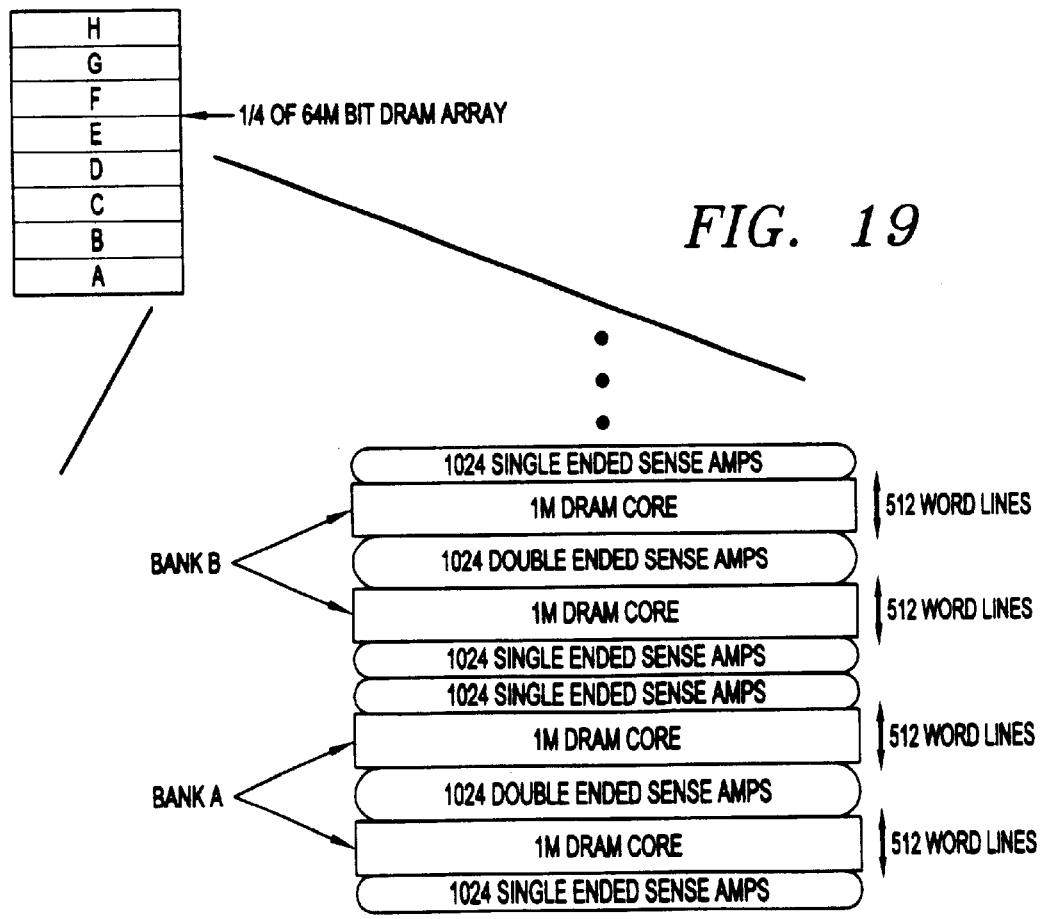
FIG. 19 illustrates a more detailed block diagram of the Dual Pixel 3DRAM chip's memory configuration.
Figure 19A:
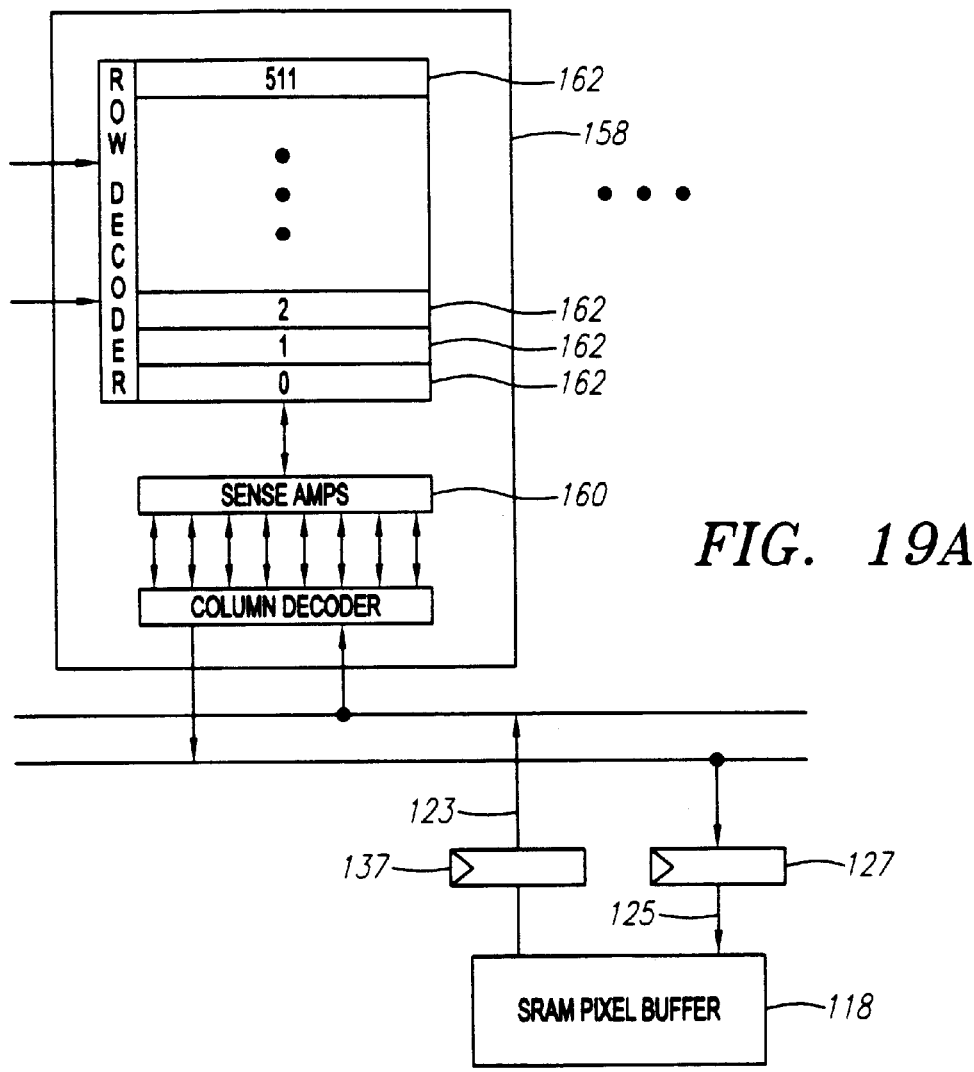
FIG. 19A illustrates one embodiment of the DRAM bank memory configuration in relation to the SRAM pixel buffer, in block diagram format.

FIGS. 18, 19 and 19A depict the structure of the DRAM array 116 for one embodiment. The DRAM array 116 is comprised of modular DRAM banks 158. The basic unit of memory is a line 164 which holds 1024 bits. A page 162 comprises 8 lines 164, or 8 Kilobits. In one embodiment, a DRAM bank 158 comprises 512 pages 162, or 4 Megabits of memory. In another embodiment, a DRAM bank 158 comprises 1024 pages 162, or 8 Megabits of memory. In the embodiment wherein the DRAM bank 158 holds 8 Megabits of memory, 5, 6, 8, 10, 12, 16 and 20 independent DRAM banks 158 are required to support 40-Megabit, 48-Megabit, 64-Megabit, 80-Megabit, 96-Megabit, 128-Megabit and 160-Megabit DRAM arrays 116, respectively.

The following table is based on the DRAM array 116 configurations for both the 64/72-Megabit Direct RDRAM™ and 4-Megabit×18 SLDRAM data sheets. Direct RDRAM™ has a 128/144-bit interface between the DRAM core and I/O section. SLDRAM has a 64/72-bit interface. Dual Pixel 3DRAM 110 has a 1024-bit interface.

TABLE 3

DRAM Configurations (Per Device)

|  | 32 Mbit | 40 Mbit | 64 Mbit | 80 Mbit | 128 Mbit | 160 Mbit |
|---|---|---|---|---|---|---|
| Banks per DRAM | 8 | 10 | 16 | 20 | 32 | 40 |
| Pages per Bank | 512 | 512 | 512 | 512 | 512 | 512 |
| Lines per Page | 8 | 8 | 8 | 8 | 8 | 8 |
| Bits per Line | 1024 | 1024 | 1024 | 1024 | 1024 | 1024 |

TABLE 4

Possible DRAM Bank and Page Organizations

| Bits/ Device | Banks/ Device | Pages/ Device | Bits/ Page | Sense Amps | Level 2Cache |
|---|---|---|---|---|---|
| 40 Mbit | 10 doubled | 512 | 8K | 44K | 40K |
|  | 5 | 1025 | 8K | 60K | 40K |
|  | 10 | 512 | 8K | 80K | 80K |
|  | 5 | 512 | 16K | 80K | 80K |
| 80 Mbit | 20 doubled | 512 | 8K | 84K | 80K |
|  | 5 | 1024 | 16K | 100K | 80K |
|  | 10 | 1024 | 8K | 120K | 80K |
|  | 20 | 512 | 8K | 160K | 160K |
|  | 10 | 512 | 16K | 160K | 160K |
|  | 5 | 512 | 32K | 160K | 160K |
|  | 4 | 512 | 40K | 160K | 160K |
| 160 Mbit | 40 doubled | 512 | 8K | 164K | 160K |
|  | 5 | 1024 | 32K | 180K | 160K |
|  | 10 | 1024 | 16K | 200K | 160K |
|  | 20 | 1024 | 8K | 240K | 160K |
|  | 40 | 512 | 8K | 320K | 320K |
|  | 20 | 512 | 16K | 320K | 320K |
|  | 10 | 512 | 32K | 320K | 320K |
|  | 8 | 512 | 40K | 320K | 320K |
|  | 5 | 512 | 64K | 320K | 320K |
|  | 4 | 512 | 80K | 320K | 320K |

1.4 Pin Configuration

The Dual Pixel 3DRAM chip 110 is pin compatible with either Direct RDRAM™ or SLDRAM. The following table shows a Direct RDRAM™ compatible pin configuration.

TABLE 5

Dual Pixel 3DRAM pins

| Signal | I/O Type | Description |
|---|---|---|
| RQ[7:0] | I RSL | Control and address info |
| DQA[8:0] | I/O RSL | Data byte A |
| DQB[8:0] | I/O RSL | Data byte B |
| CFM | I RSL | Clock from master + |
| CFMN | I RSL | Clock from master − |
| CTM | I RSL | Clock to master + |
| CTMN | I RSL | Clock to master − |
| $V_{REF}$ |  | Logic threshold reference voltage for RSL signals |
| $V_{TERM}$ |  | Termination voltage for RSL load resistors |
| SIO[1:0] | I/O CMOS | Serial input/output |
| CMD | I CMOS | Serial command input |
| SCK | I CMOS | Serial clock input |
| $V_{DD}$ |  | Supply voltage for RDRAM core and interface |
| GND |  | Ground reference for RDRAM core and interface |

1.5 Protocol

Direct RDRAM™ provides 8 pins and SLDRAM provides 10 pins for transmitting control and address information. The Dual Pixel 3DRAM protocol requires 8 pins so it can be used with either interface technology. Each port controls one to four Dual Pixel 3DRAM chips 110.

Figure 20:
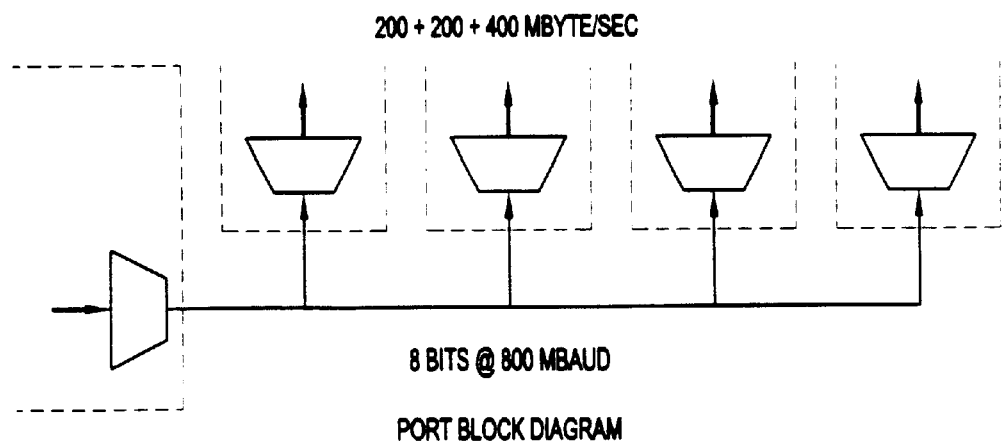
FIG. 20 illustrates the address and control ports in block diagram format.
Figure 21:
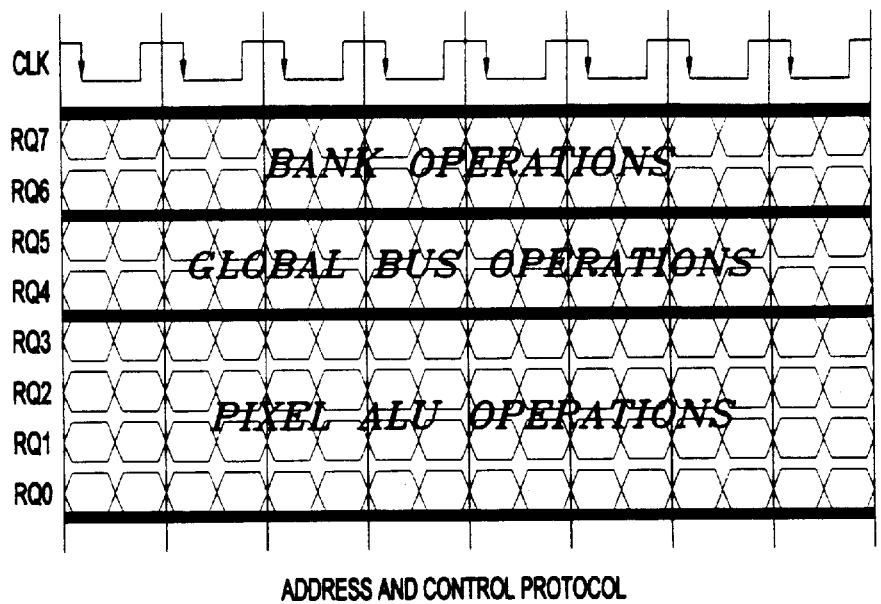
FIG. 21 illustrates the Dual Pixel 3DRAM protocol structure over the address and control (RQ) pins.

Referring now to FIGS. 20 and 21, 800 Megabytes per second of control and address information are divided into three channels. The pixel ALU operations channel 152 handles 400 Megabytes per second and controls the pixel ALUs 120 and 121, the SRAM pixel buffer 118 and interface with the rendering bus 112. The bank operations channel 156 handles 200 Megabytes per second and controls the accessing and precharging of DRAM banks 158 and pages 162. The global bus operations channel 154 handles 200 Megabytes per second and controls the reading and writing of SRAM pixel buffer 118 cache lines 224 over the global bus 122. Each channel 152, 154 and 156 performs its own framing of operations and includes its own device identification information, so the three channels can operate on different Dual Pixel 3DRAM chips 110 at the same time.

1.5.1 DRAM Bank Operations

DRAM bank operations are transmitted over a dedicated, 2-pin control channel 156 with 200 Megabytes per second of bandwidth. DRAM bank operations can commence transmission at the falling edge of any clock. The bank operations listed in Table 6 below are defined in one embodiment:

TABLE 6

Bank Operations

| 0[1:0] | Mnemonic | Operation | Cycles |
|---|---|---|---|
| 00 | IDLE | Idle | 1 |
| 01 | PP | Precharge page | 3 |
| 10 | AP | Access Page | 5 |
| 11 | CP | Change Page | 5 |

Figure 22:
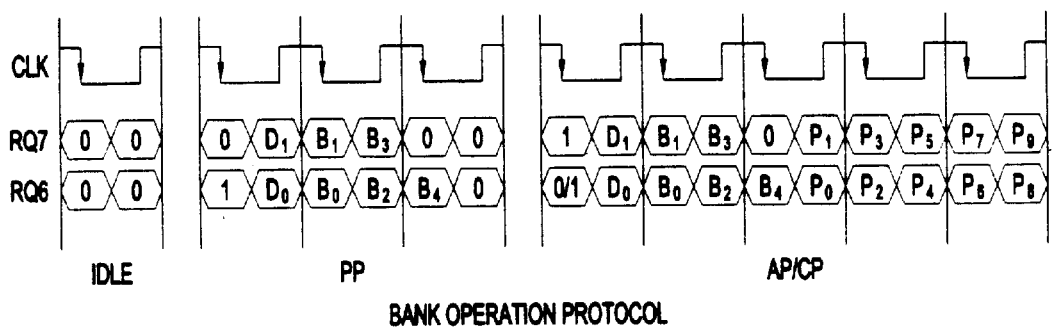
FIG. 22 illustrates the bank operation protocol over the address and control pins.

Referring to FIG. 22, Bits $D_{1:0}$ select one of the four possible Dual Pixel 3DRAM devices 110 connected over a common bus 114. Bits $B_{4:0}$ select one of 32 possible DRAM banks 158 within a single Dual Pixel 3DRAM device 110. Bits $P_{9:0}$ select one of 1024 possible pages 162 within a DRAM bank 158.

The IDLE operation does nothing for one cycle.

Figure 23:
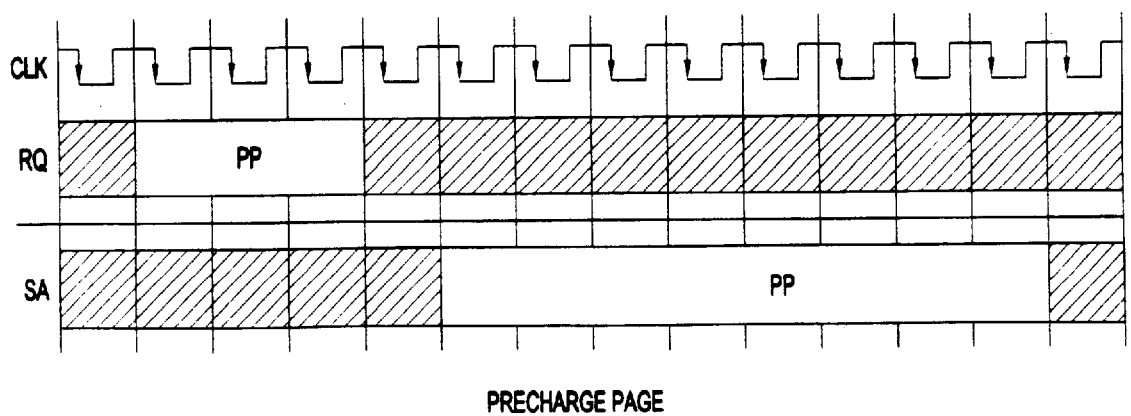
FIG. 23 illustrates the precharge page operation in timing diagram format.

Referring to FIGS. 22 and 23, the Precharge Page (PP) operation precharges bank $B_{4:0}$ of device $D_{1:0}$ and takes three cycles to transmit and eight cycles to execute.

Figure 24:
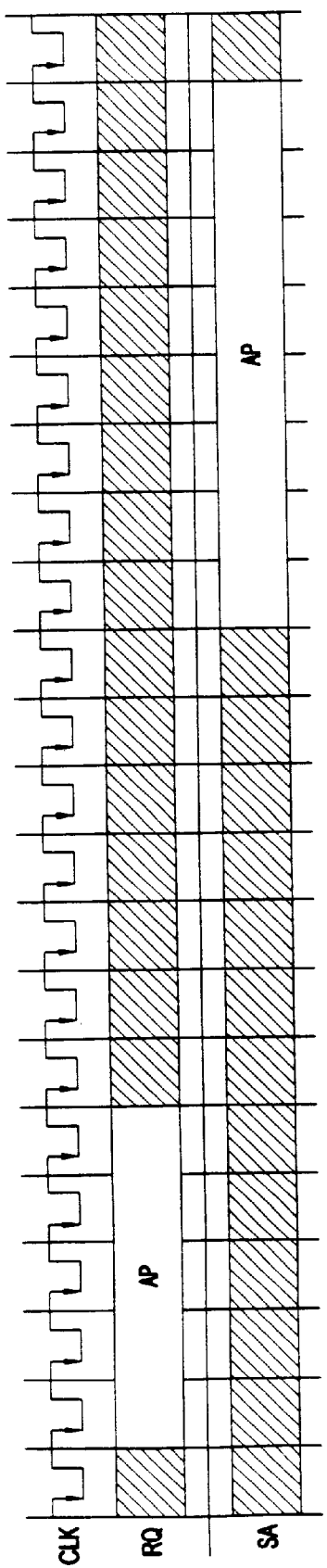
FIG. 24 illustrates the access page operation in timing diagram format.

Referring to FIGS. 22 and 24, the Access Page (AP) operation accesses page $P_{9:0}$ of Bank $B_{4:0}$ of device $D_{1:0}$ and takes 5 cycles to transmit and 8 cycles to execute. The DRAM bank 158 must have been previously precharged.

Figure 25:
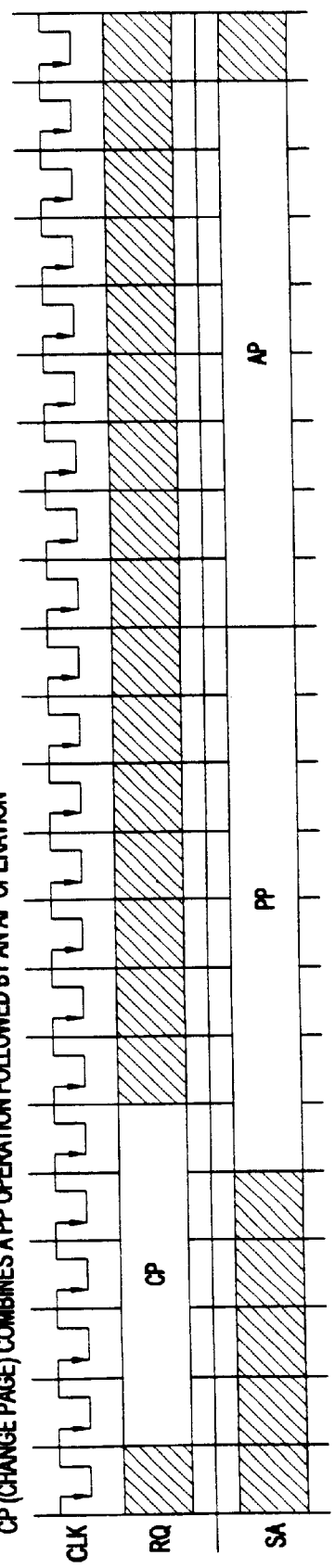
FIG. 25 illustrates change page operation in timing diagram format.

Referring to FIGS. 22 and 25, the Change Page (CP) operation combines a Precharge Page operation followed by an Access Page operation to the same bank of the same device.

1.5.2 Global Bus Operations

Global Bus operation transfers are managed by a dedicated 2-pin control channel 154 with 200 Megabytes per second of bandwidth. Global Bus operations can commence transmission at the falling edge of any clock. Since global bus transfers require 4 clocks, a command transmission can also take 4 clocks.

Referring now to FIGS. 26–30, bits $D_{1:0}$ select one of four possible Dual Pixel 3DRAM devices 110 hanging off a common bus 114. Bits $B_{4:0}$ select one of 32 possible DRAM banks 158 within a device 110. Bits $C_{2:0}$ select one of 8 possible cache line buffers 160 within the selected DRAM bank 158. Bits $L_{3:0}$ select one of 160 possible cache lines 224 in the SRAM pixel buffer 118.

Table 7 below lists the Global Bus operations which are defined in one embodiment:

TABLE 7

| 0[2:0] | Mneinonic | Global Bus Operations Operation | Cycles |
|---|---|---|---|
| 000 | IDLE | Idle | 1 |
| 001 | — | Reserved | — |
| 010 | RL | Read Cache Line | 4 |
| 011 | — | Reserved | — |
| 100 | WL | Write Cache Line | 4 |
| 101 | ML | Masked Write Cache Line | 4 |

TABLE 7-continued

| 0[2:0] | Mneinonic | Global Bus Operations Operation | Cycles |
|---|---|---|---|
| 110 | FL | Flash Masked Write Cache Line | 4 |
| 111 | CL | Change Cache Line | 4 |

Figure 26:
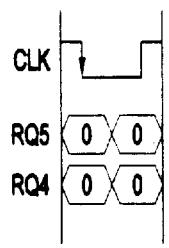
FIG. 26 illustrates the idle command over the address and control (RQ) pins.

Referring to FIG. 26, the IDLE operation does nothing for one cycle.

Figure 27:
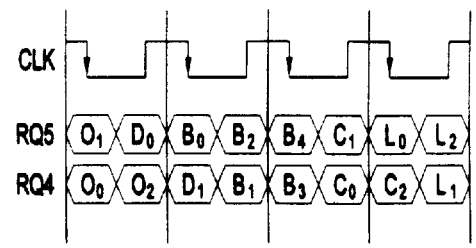
FIG. 27 illustrates the Read Cache Line (RL), Write Cache Line (WL), Masked Write Cache Line (ML) and Change Cache Line (CL) commands over the address and control (RQ) pins.
Figure 28:
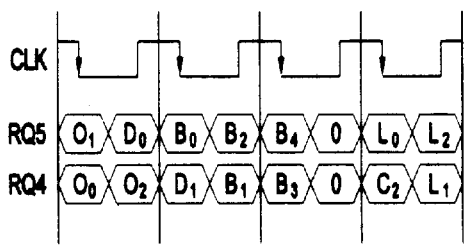
FIG. 28 illustrates the Flash Masked Write Cache Line command over the address and control (RQ) pins.

The Read Cache Line (RL), Write Cache Line (WL), Mask Cache Line (ML) and Change Cache Line (CL) commands all have the same format on the control (RQ) pins as depicted in FIG. 27. The Fast Fill Cache Line (FL) command is depicted in FIG. 28.

Figure 29:
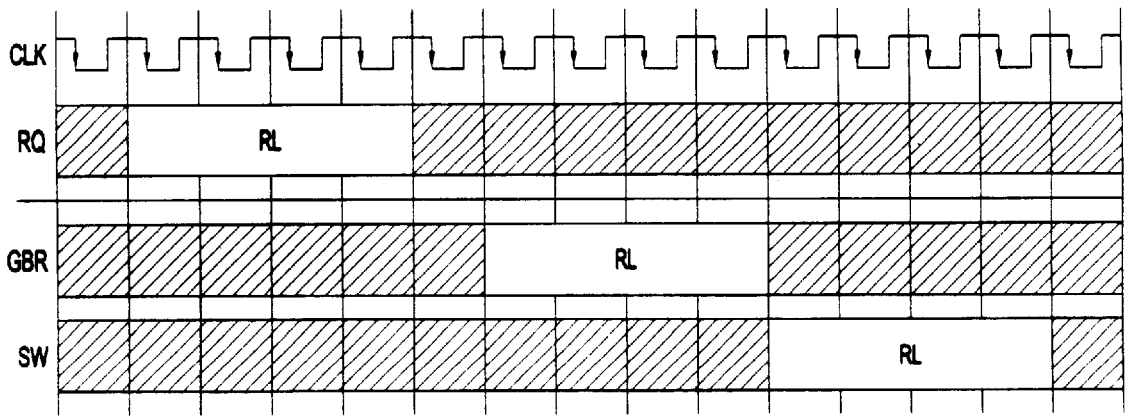
FIG. 29 illustrates the Read Cache Line (RL) operation in timing diagram format.

Referring to FIG. 29, the Read Cache Line (RL) operation applies only to device $D_{1:0}$ and copies cache line buffer 160 $C_{2:0}$ from DRAM bank 158 $B_{4:0}$ into the pipeline register 127. It then writes the pipeline register value into line $L_{3:0}$ of the SRAM pixel buffer 118. This operation takes 4 cycles to transmit and 4 cycles to perform each data transfer. Each line in the SRAM pixel buffer 118 has a bank and column tag 230 indicating where the line came from. The bank and column tags 230 are set by the RL operation during the write transfer to the SRAM pixel buffer 118.

Figure 30:
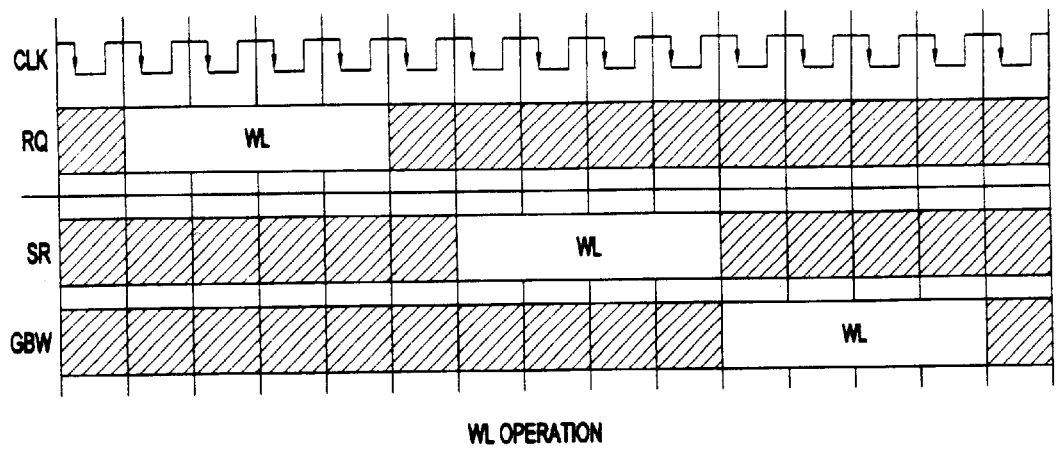
FIG. 30 illustrates the Write Cache Line (WL) operation in timing diagram format.

Referring to FIG. 30, the Write Cache Line (WL) operation applies only to device $D_{1:0}$ and copies cache line 224 $L_{3:0}$ from the SPAM pixel buffer 118 to the pipeline register 137. The pipeline register data is then copied to column $C_{2:0}$ of DRAM bank 158 $B_{3:0}$. The bank and column tags 230 are ignored. This operation takes 4 cycles to transmit and 4 cycles to perform each data transfer.

Figure 31:
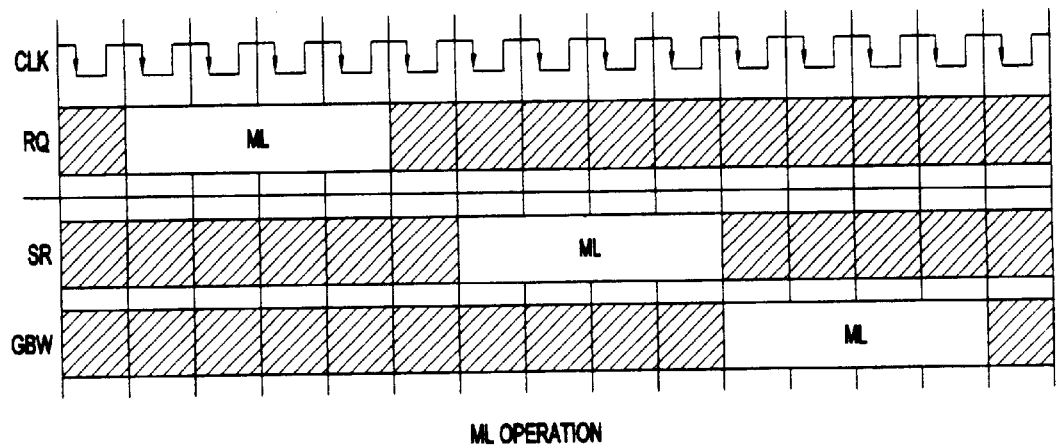
FIG. 31 illustrates the Masked Write Cache Line (ML) operation in timing diagram format.

Referring to FIG. 31, the Masked Write Cache Line (ML) operation applies only to device $D_{1:0}$ and copies cache line $L_{2:0}$ from the SRAM pixel buffer 118 to the pipeline register. The pipeline register data is then copied to column $C_{2:0}$ of bank $B_{3:0}$. The bank and column tags are ignored. This operation takes four cycles to transmit and four cycles to perform each data transfer. The PlaneMask and ByteMask registers are both expanded to 1024 bits and then used as per bit write enables when the cache line is written to the Sense Amps.

Figure 32:
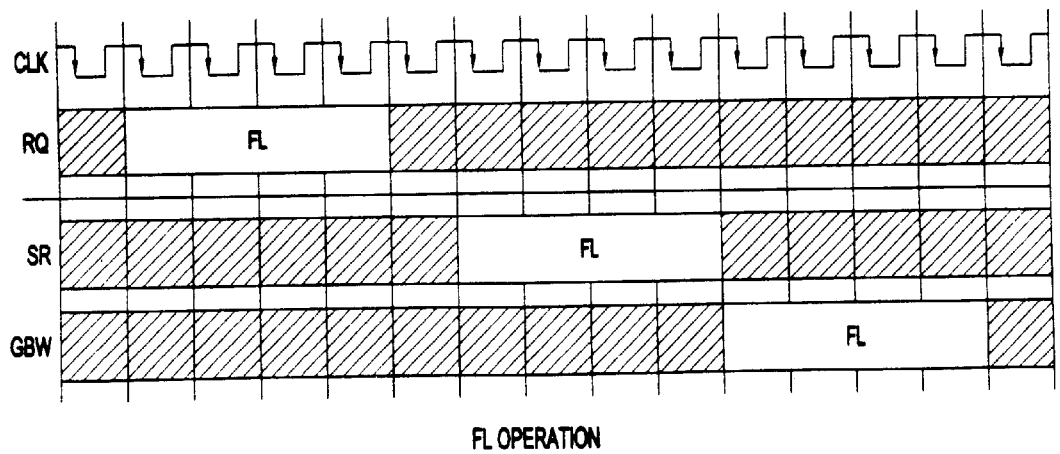
FIG. 32 illustrates the Flash Masked Write Cache Line (FL) operation in timing diagram format.

Referring to FIG. 32, the Flash Masked Write Cache Line (FL) operation is similar to ML except that the pipeline data and mask are written to four columns instead of just one. It applies only to device $D_{1:0}$ and copies cache line $L_{2:0}$ from the SRAM to the pipeline register. The pipeline register data is then copied to either columns 0–3 or 4–7 of bank $B_{3:0}$. The bank and column tags are ignored. This operation takes four cycles to transmit and four cycles to perform each data transfer. The PlaneMask and ByteMask registers are both expanded to 1024 bits and then used as per bit write enables when the cache line is written to the Sense Amps.

Figure 33:
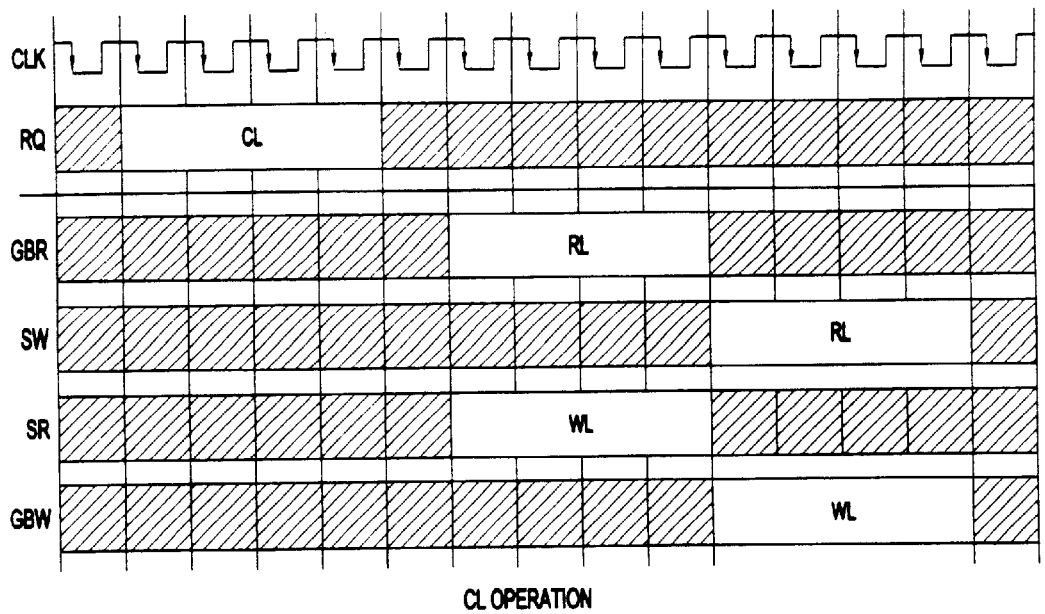
FIG. 33 illustrates the Change Cache Line (CL) operation in timing diagram format.

Referring to FIG. 33, the Change Cache Line (CL) operation applies only to device $D_{1:0}$ and performs Read Cache Line and Write Cache Line operations simultaneously. The bank and column fields from the operation control the RL command. The bank and column tags 230 from the cache line 224 control the WL command. This operation takes 4 cycles to transmit and 4 cycles to perform each data transfer.

1.5.3 Pixel ALU Operations

The Pixel ALU operations are transmitted over a dedicated 4-pin control channel 152 with 400 Megabytes per second of bandwidth. Pixel ALU operations can commence transmission at the falling edge of any clock. Operations other than IDLE require 2 cycles to transmit over the control pins. Each Pixel ALU operation controls the transfer of either 72 bits of data in 2 cycles or 108 bits of data in 3 cycles over the data pins (DQA$_{[8:0]}$ and DQB$_{[8:0]}$). The 2/3 bit of every operation indicates how many cycles are needed. Pixel ALU operations that require 3 cycles for data transfer should be followed by an IDLE cycle. The operations listed below in Table 8 are defined Pixel ALU operations for one embodiment:

TABLE 8

Pixel ALU Operation

| O [3:0] | Mnemonic | Operation | Cycles |
|---|---|---|---|
| 0000 | IDLE | Idle | 1 |
| 0001 | — | Reserved | |
| 0010 | — | Reserved | 2 |
| 0011 | — | Reserved | |
| 0100 | RREG | Read Register | 2 |
| 0101 | — | Reserved | |
| 0110 | WREG | Write Register | 2 |
| 0111 | BREG | Broadcast Register | 2 |
| 1000 | RDAT | Read Data | 2 |
| 1001 | — | Reserved | |
| 1010 | WDAT | Write Data | 2 |
| 1011 | BDAT | Broadcast Data | 2 |
| 1100 | RPIX | Read Pixel | 2 or 3 |
| 1101 | — | Reserved | |
| 1110 | SPIX | Single Pixel | 2 |
| 1111 | DPIX | Dual Pixel | 2 or 3 |

Bits $O_{3:0}$ specify the operation type. Bits $D_{1:0}$ select one of four Dual Pixel 3DRAM devices 110 hanging off a common bus 114. In broadcast operations, $D_{1:0}$ are ignored. Bits $L_{2:0}$ select one of 8 cache lines 224 in the SRAM pixel buffer 118. Bits $P_{3:0}$ select one of 160 pixels in a cache line 224. The interpretation of $P_{3:0}$ varies depending upon the operation type and current pixel depth. Bits $R_{7:0}$ are used by register operations to specify the register address.

Figures 34, 35:
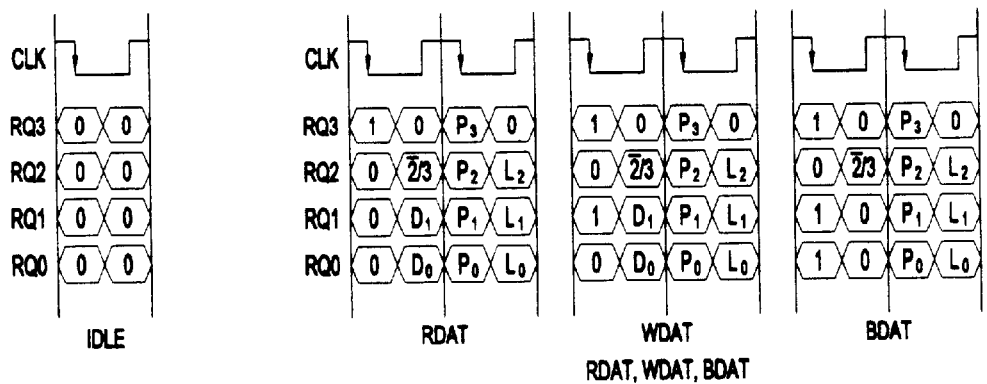
FIG. 34 illustrates the idle command over the address and control (RQ) pins.
FIG. 35 illustrates the Read Data (RDAT), Write Data (WDAT) and Broadcast Data (BOAT) commands over the address and control (RQ) pins.

Referring to FIG. 34, IDLE does nothing for one cycle.

Referring to FIG. 35, the Read Data (RDAT) operation reads 64 bits of raw data from the specified pixel of the specified line 224 of the specified device's 110 SRAM pixel buffer 118. This operation is not affected by any register settings.

The Write Data (WDAT) operation writes 64 bits of raw data to the specified pixel of the specified line 224 of the specified device's 110 SRAM pixel buffer 118. Per byte write enables are transmitted over pins DQA8 and DQB8. This operation is not affected by any register settings.

The Broadcast Data (BDAT) operation broadcasts 64 bits of raw data to the specified pixel of the specified line 224 of all Dual Pixel 3DRAM devices' 110 SRAM pixel buffers 118. Per byte write enables are transmitted over pins DQA$_8$ and DQB$_8$. This operation is not affected by any register settings.

Figure 36:
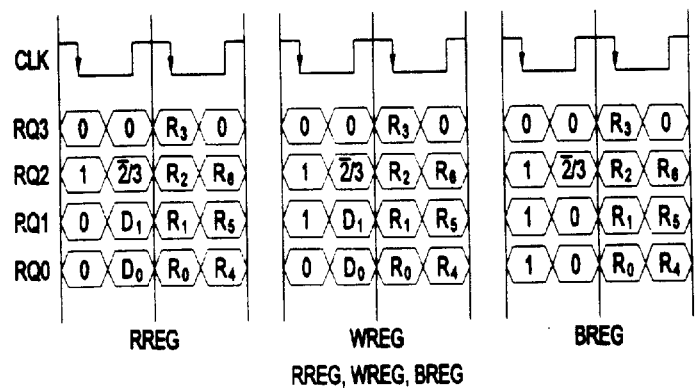
FIG. 36 illustrates the Read Registers (RREG), Write Register (WREG) and Broadcast Register (BREG) commands over the address and control pins.

Referring to FIG. 36, the Read Register (RREG) operation reads a register value from the specified device 110.

The Write Register (WREG) operation writes a register value to the specified device 110. Per byte write enables are transmitted over pins DQA$_8$ and DQB$_8$.

The Broadcast Register (BREG) operation broadcasts a register value to all devices 110. Per byte write enables are transmitted over pins DQA$_8$ and DQB$_8$.

Figure 37:
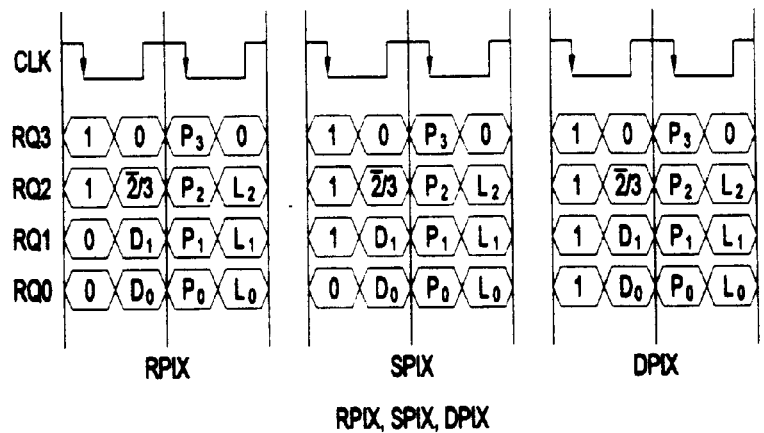
FIG. 37 illustrates the Read Pixel (RPIX), Single Pixel (SPIX) and Dual Pixel (DPIX) commands over the address and control pins.

Referring to FIG. 37, the Read Pixel (RPIX) operation reads packed pixels for display refresh.

The Single Pixel (SPIX) operation merges a single source pixel with pixel data already in the SRAM pixel buffer 118.

The Dual Pixel (DPIX) operation merges two, side-by-side source pixels with pixel data already in the SRAM pixel buffer 118.

One embodiment of the Dual Pixel 3DRAM chip 110 uses dirty tags. In this embodiment, the Write Tag (WTAG) operation expands 64 bits of byte mask data to a 128-bit mask that is written to the lower or upper half of the specified line 224 of the specified device's dirty tags 226. The dirty tags 226 for a line can be written in two cycles matching the amount of time it takes to write the line over the global bus to the DRAM array.

Figure 38:
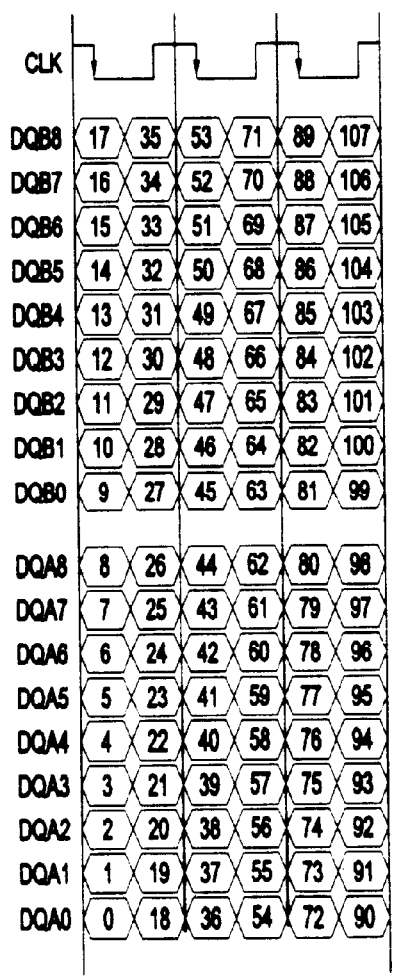
FIG. 38 illustrates graphics data transfer across the data (DQ) pins.

FIG. 38 depicts one embodiment in which the Dual Pixel 3DRAM device 110 can transfer 36 bits of data every cycle. Two or three clocks of data are associated with each Pixel ALU Operation.

Figure 39:
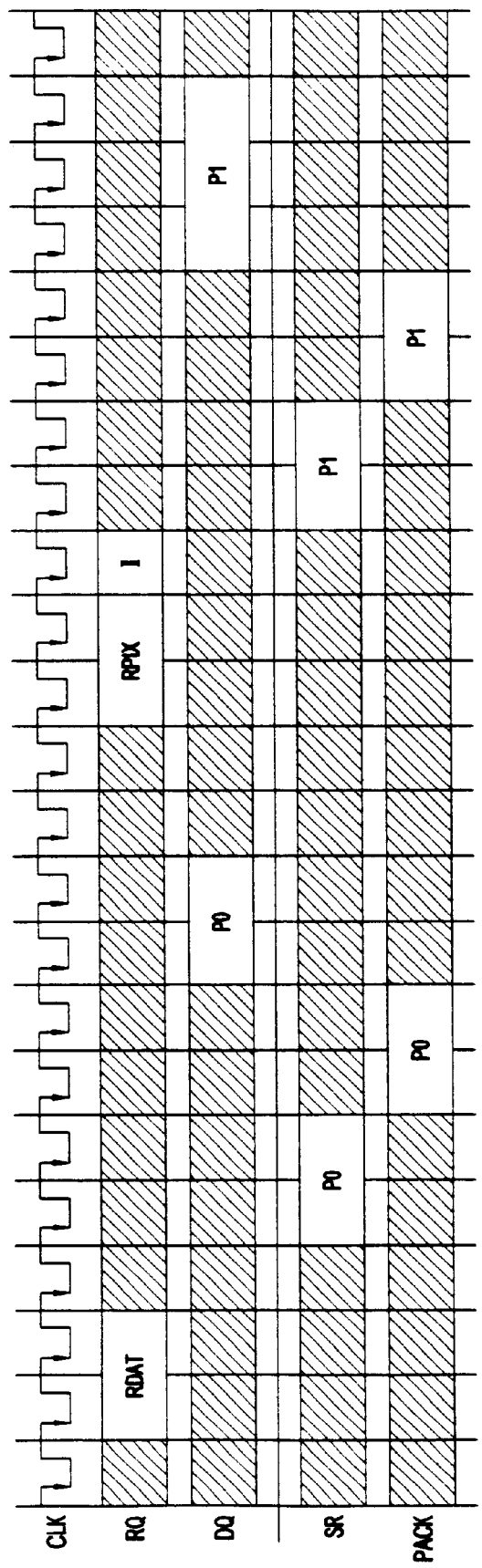
FIG. 39 illustrates a 2-cycle RDAT operation followed by 3-cycle RPIX operation in timing diagram format.

Referring to FIG. 39, the Read Data (RDAT) and Read Pixel (RPIX) operations employ some of the SRAM pixel buffer 118 and Pixel ALUs 120 and 121. The Pixel ALUs 120 and 121 are unused, and nothing is written to the SRAM pixel buffer 118. FIG. 39 illustrates a 2-cycle RDAT followed by a 3-cycle RPIX.

Figure 40:
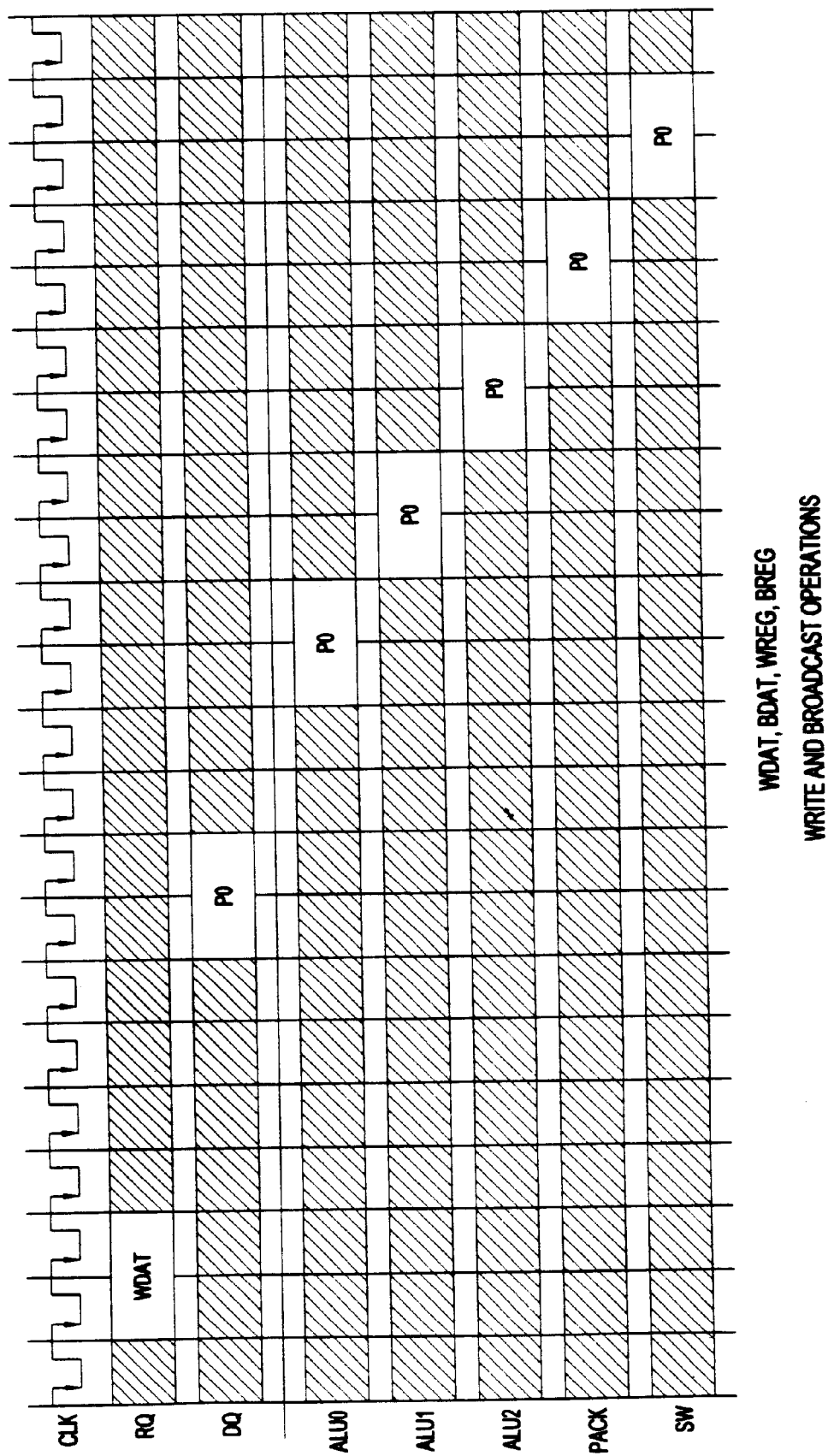
FIG. 40 illustrates the timing diagram format for the WDAT, BDAT, WREG, and BREG operations.

As illustrated in FIG. 40, the Write Data (WDAT), Broadcast Data (BDAT), Write Register (WREG) and Broadcast Register (BREG) operations receive data on the DQ pins, send the data through the Pixel ALUs 120 and 121, and latch the data at the appropriate stage. None of the above operations benefit from 3-cycle transfers.

Figure 41:
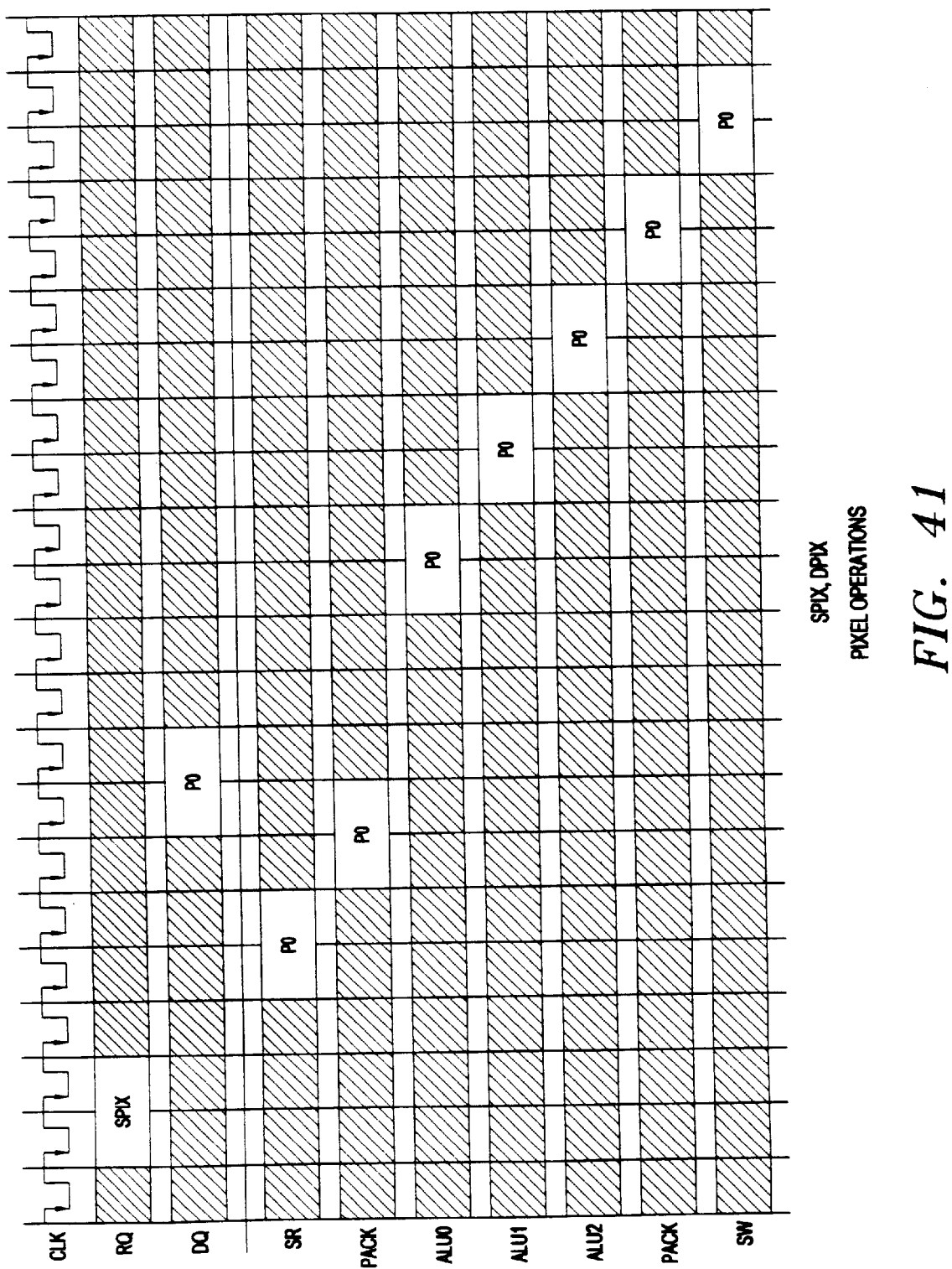
FIG. 41 illustrates the timing diagram format for the SPIX and DPIX operations.
Figure 42:
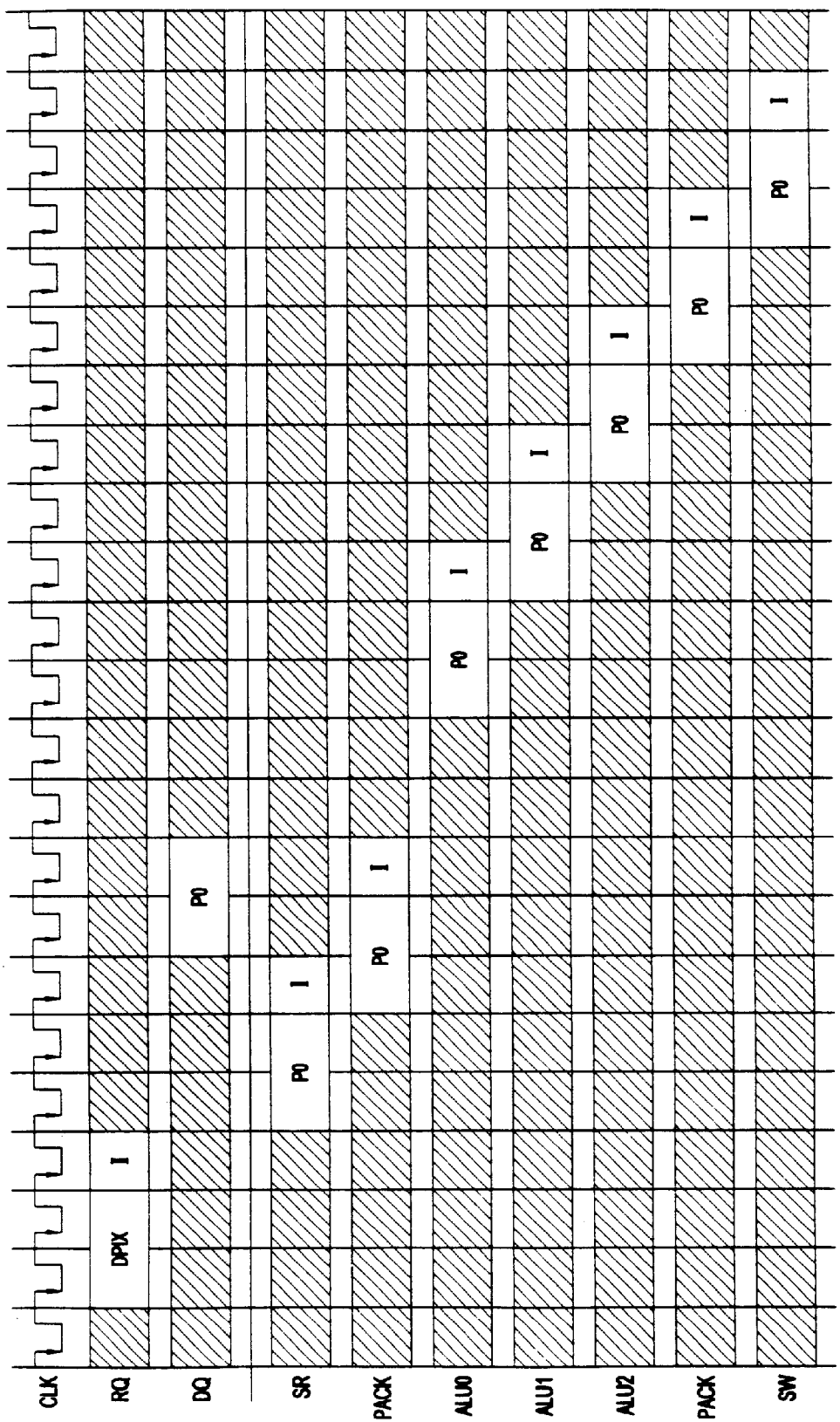
FIG. 42 illustrates a 3-cycle DPIX transfer operation in timing diagram format.

The Single Pixel (SPIX) and Dual Pixel (DPIX) operations fully utilize the SRAM pixel buffer 118 and the Pixel ALUs 120 and 121. These two operations read and unpack data from the SRAM pixel buffer 118, receive data from the DQ pins, combine both sets of data in the Pixel ALUs 120 and 121, and write the results back to the SRAM pixel buffer 118. FIG. 41 shows a 2-cycle SPIX transfer, and FIG. 42 shows a 3-cycle DPIX transfer.

1.6 Operation Timing

Figure 43:
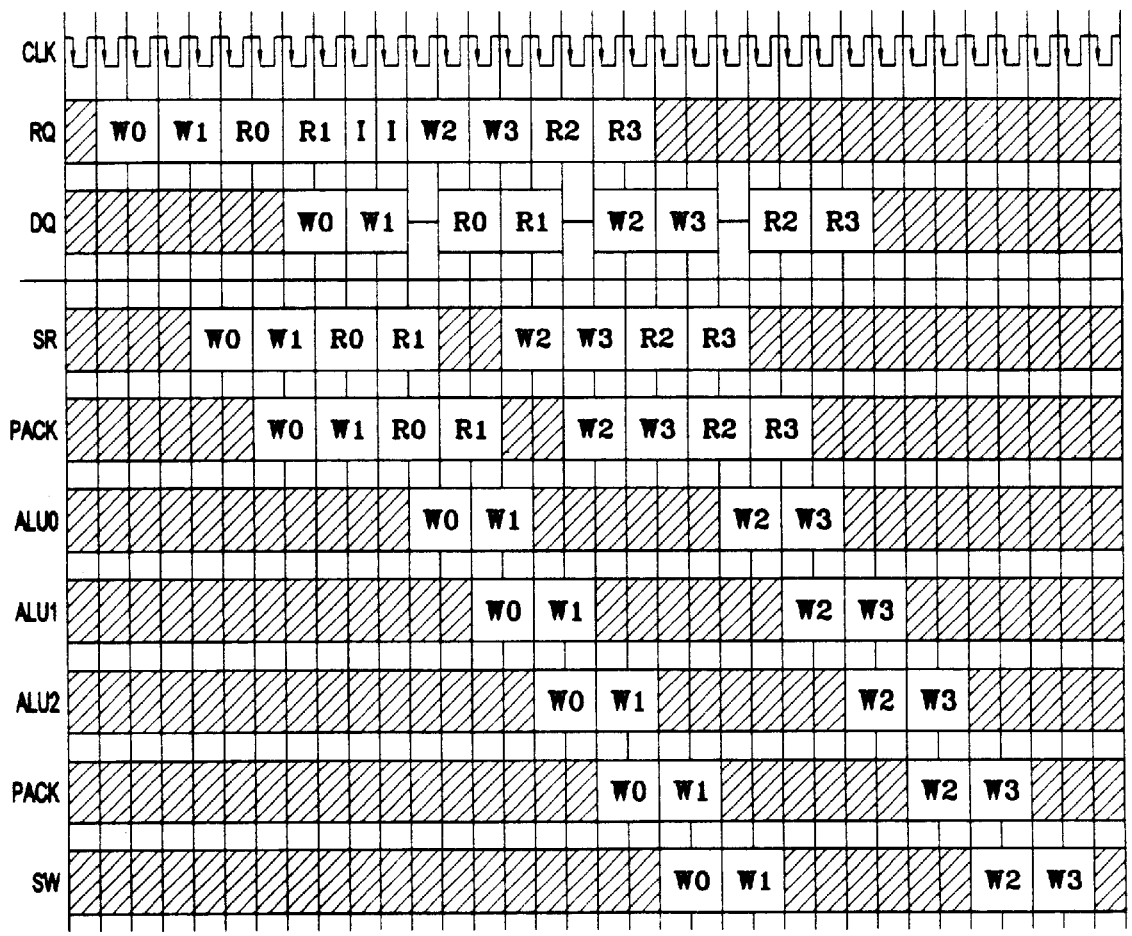
FIG. 43 illustrates mixed 2-cycle read and 2-cycle write operations in timing diagram format.

Examples of timing for many of the operations described above are illustrated in FIGS. 43–49:

FIG. 43 shows the intermixing of 2-cycle read and 2-cycle write operations.

Figure 44:
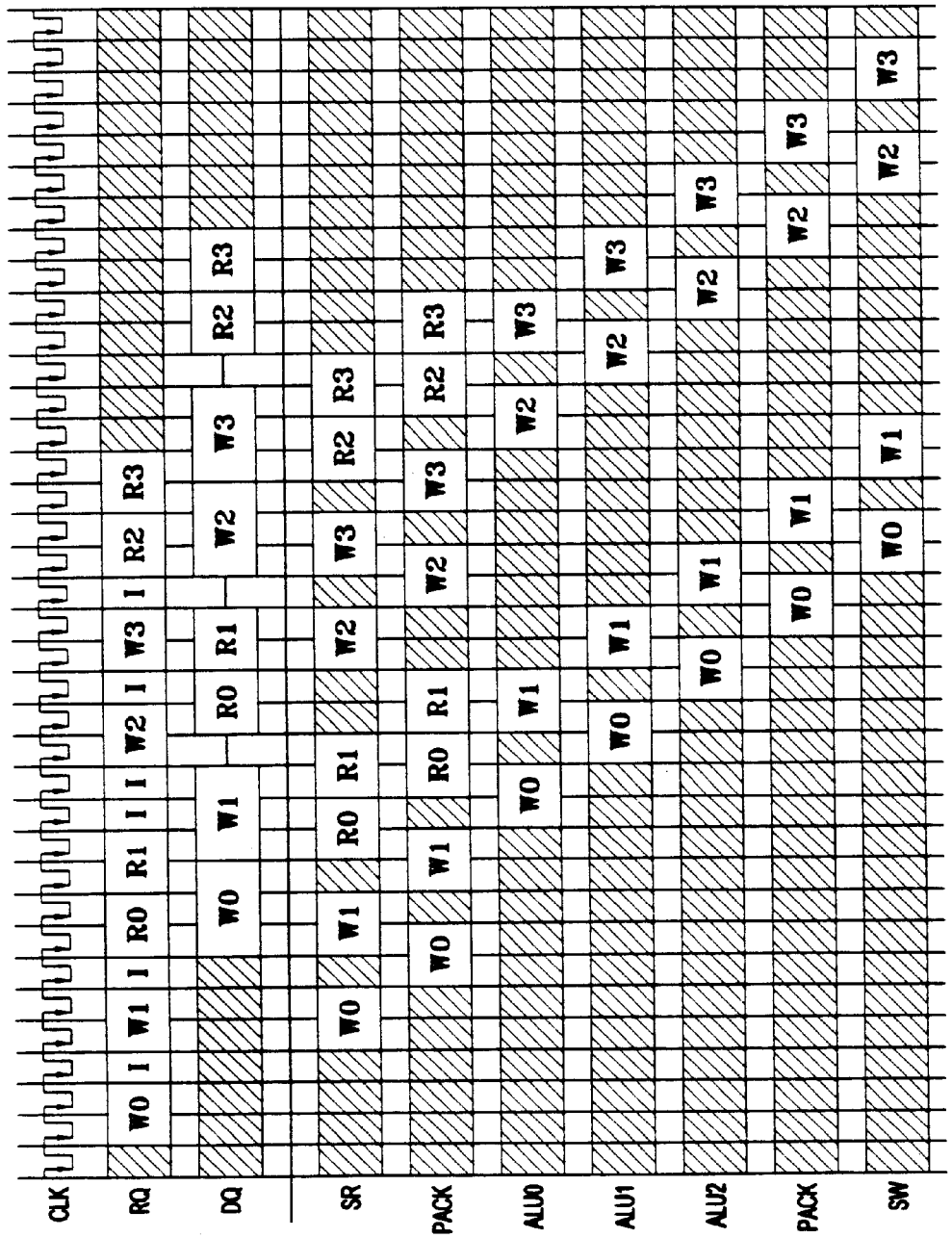
FIG. 44 illustrates mixed 2-cycle read and 3-cycle write operations in timing diagram format.

FIG. 44 shows the intermixing of 2-cycle read and 3-cycle write operations.

Figure 45:
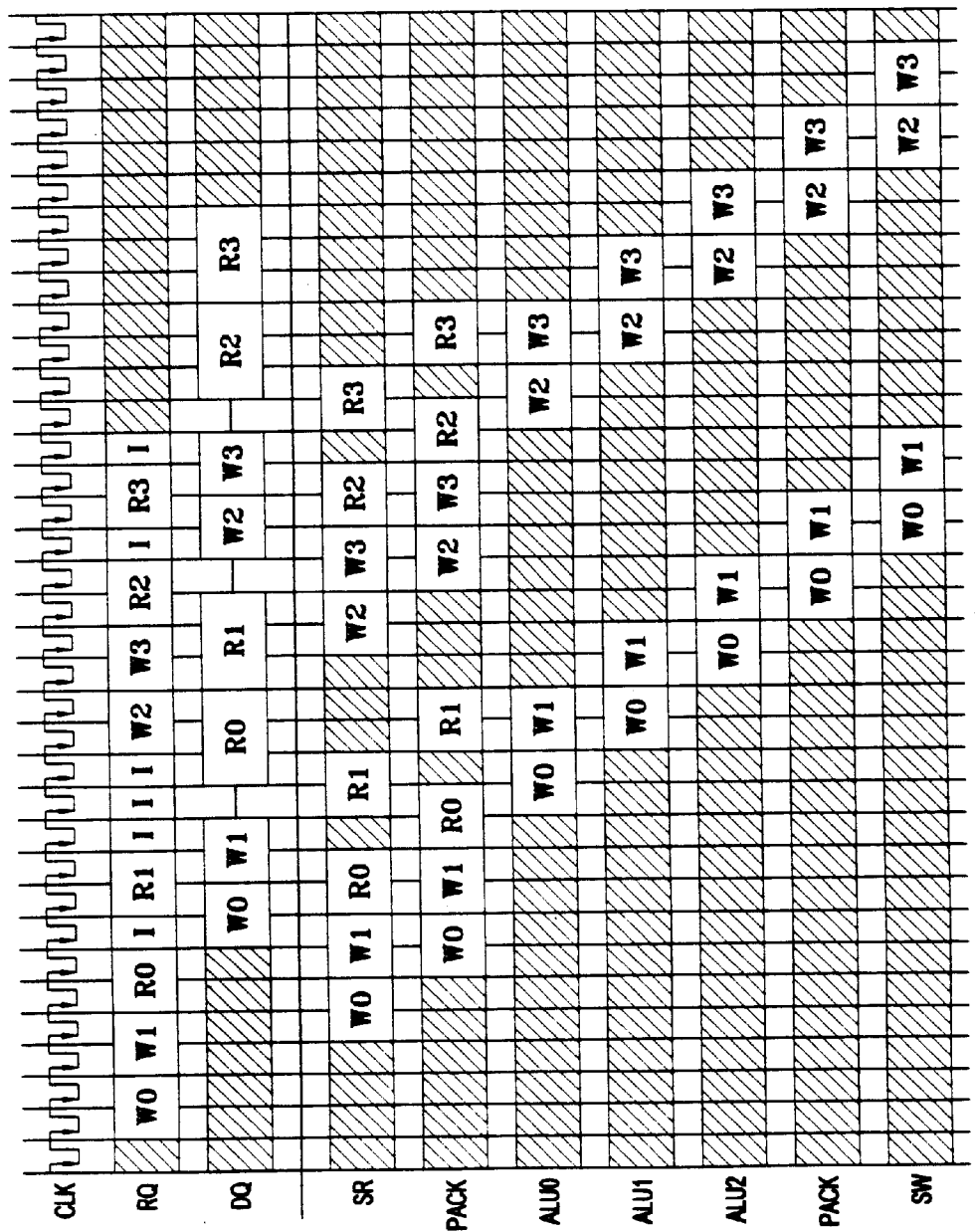
FIG. 45 illustrates mixed 3-cycle read and 2-cycle write operations in timing diagram format.

FIG. 45 shows the intermixing of 3-cycle read and 2-cycle write operations.

Figure 46:
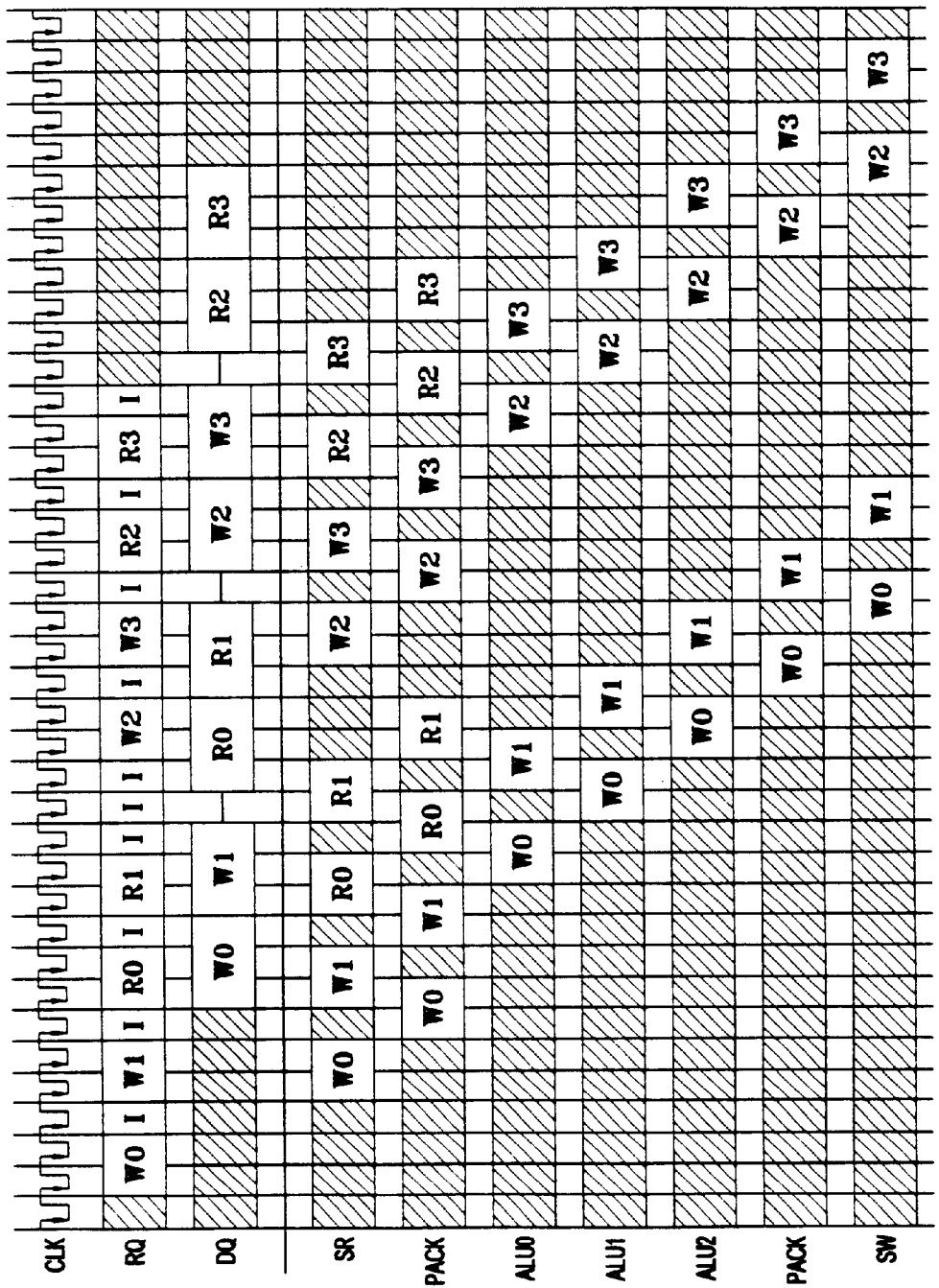
FIG. 46 illustrates mixed 3-cycle read and 3-cycle write operations in timing diagram format.

FIG. 46 shows the intermixing of 3-cycle read and 3-cycle write operations.

Figure 47:
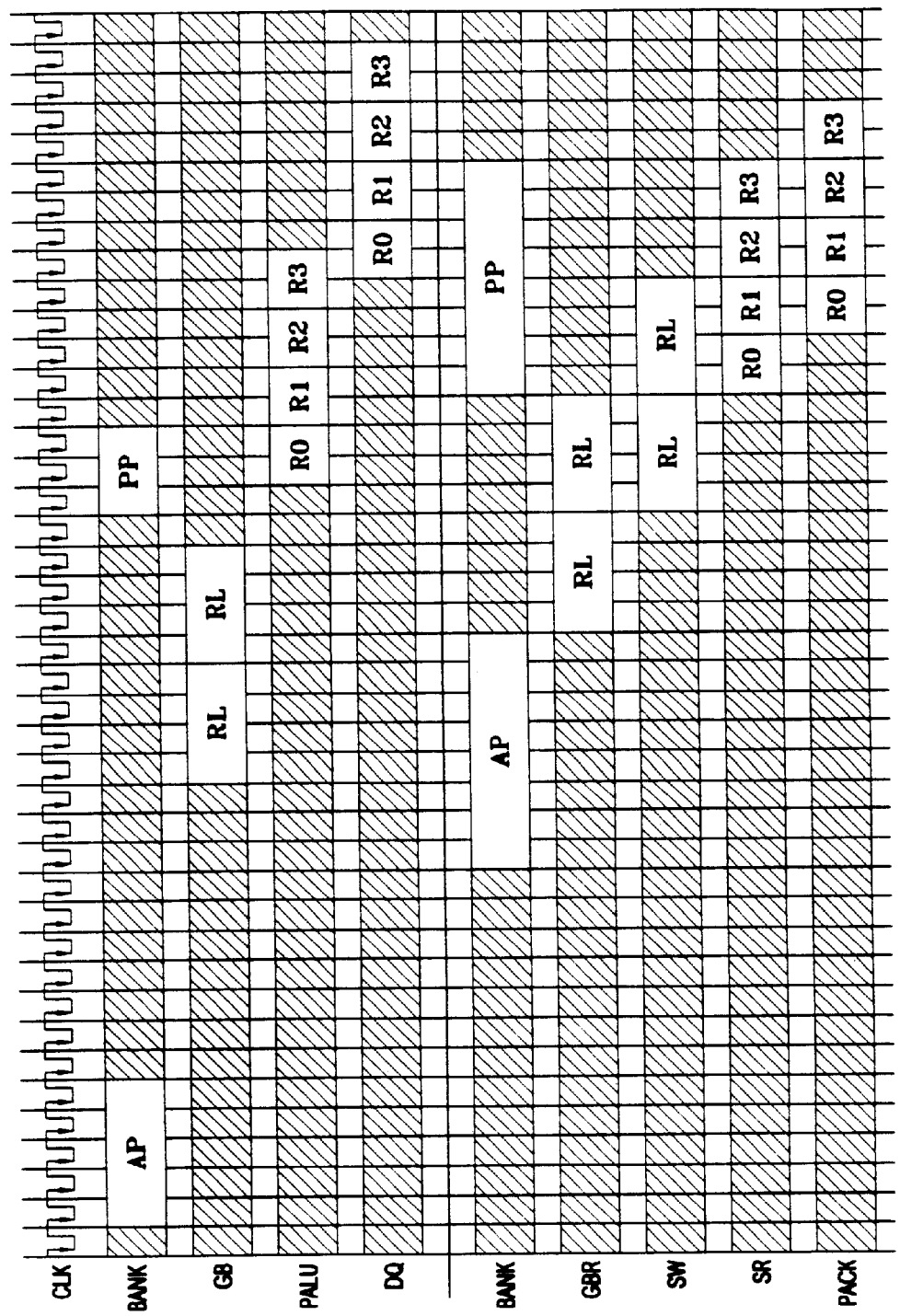
FIG. 47 illustrates four 2-cycle read operations in timing diagram format.

FIG. 47 shows all of the operations needed to perform four 2-cycle read operations.

Figure 48:
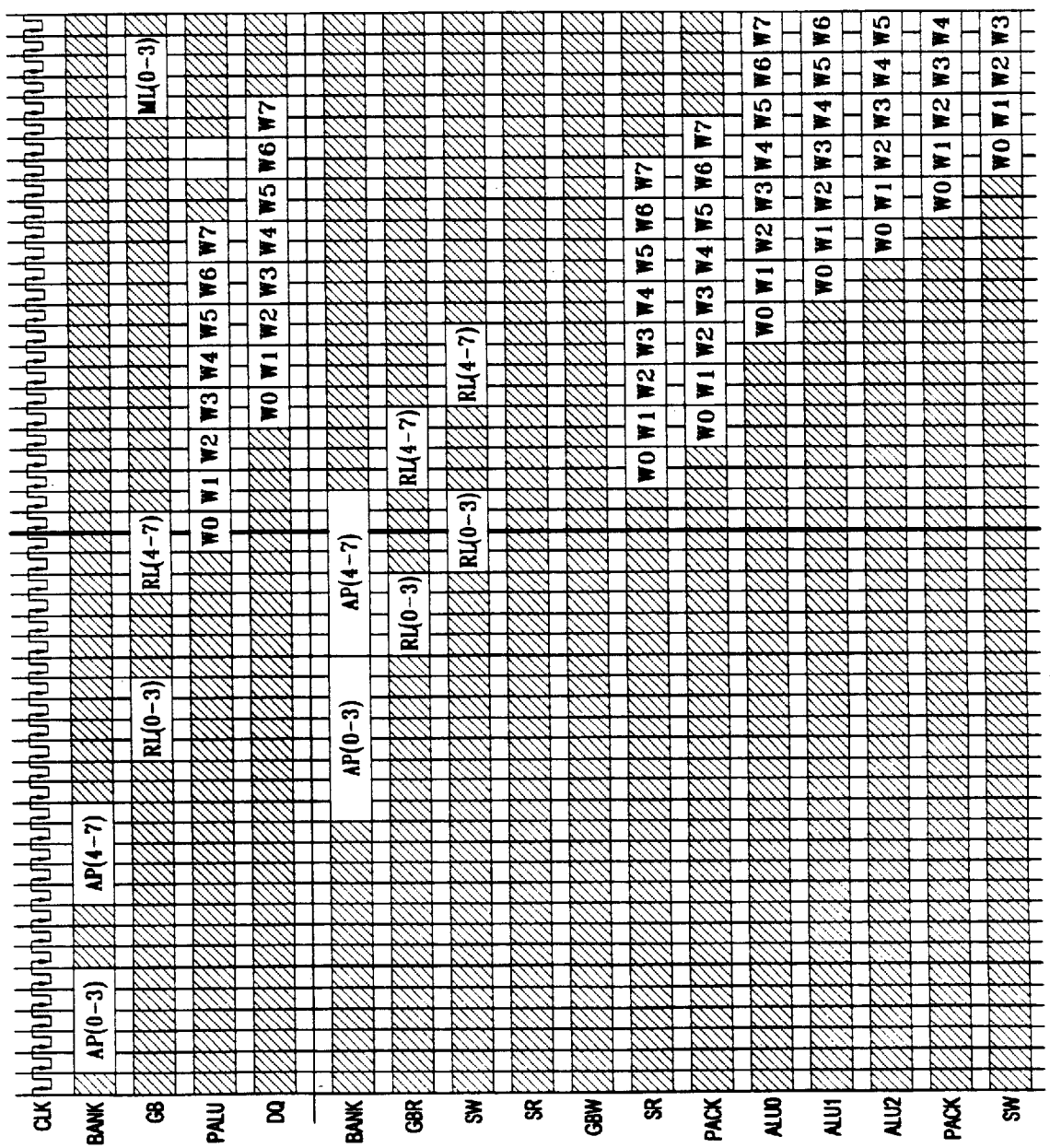
FIG. 48 illustrates eight 2-cycle DPIX operations in timing diagram format.
Figure 49:
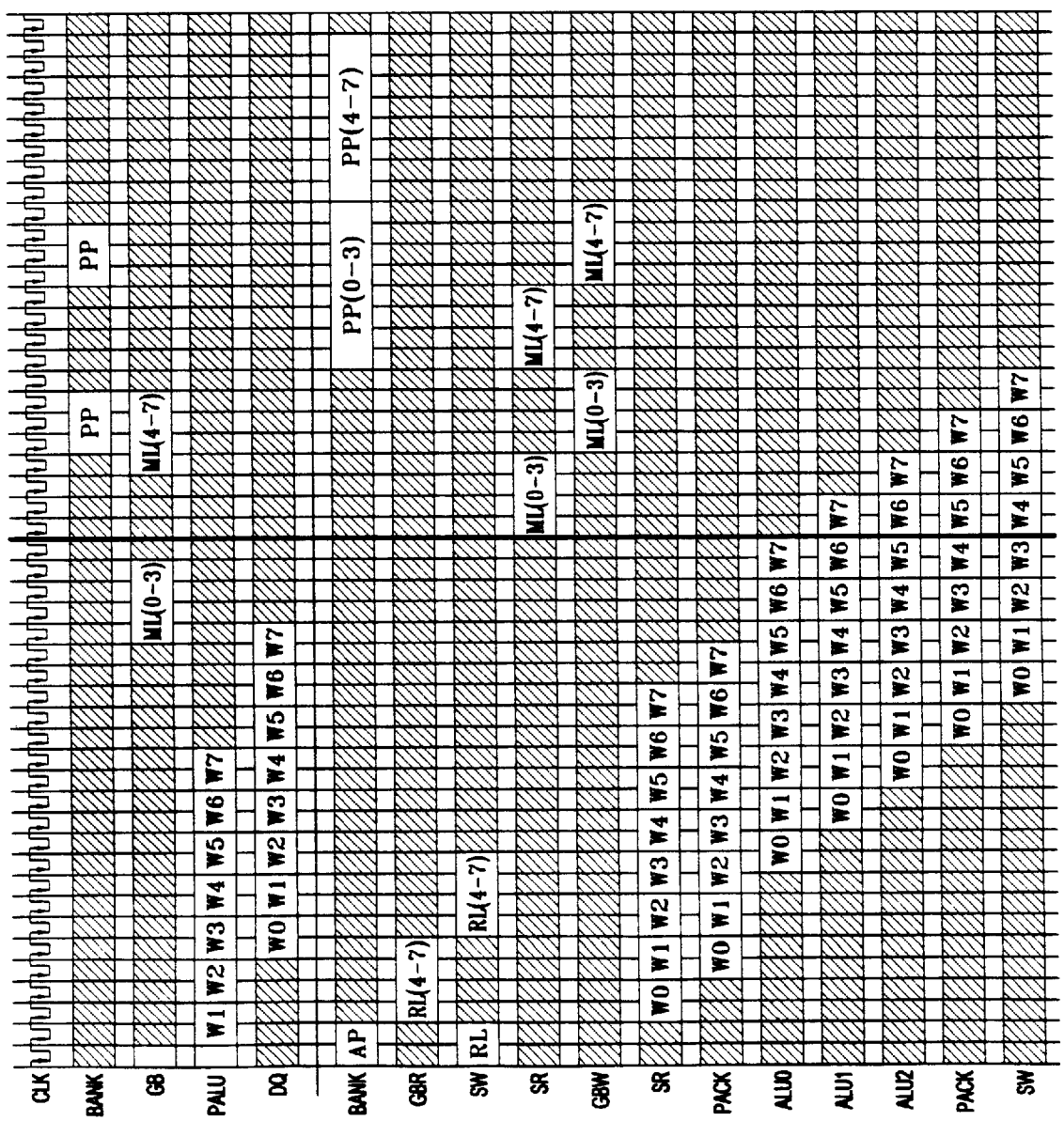
FIG. 49 continues depicting the eight 2-cycle DPIX operations of FIG. 48.

FIGS. 48 and 49 show all of the operations needed to perform eight 2-cycle Dual Pixel (DPIX) operations. The DPIX operations 4–7 are to a different bank 158 than that of DPIX operations 0–3.

1.7 Registers

Figure 50:
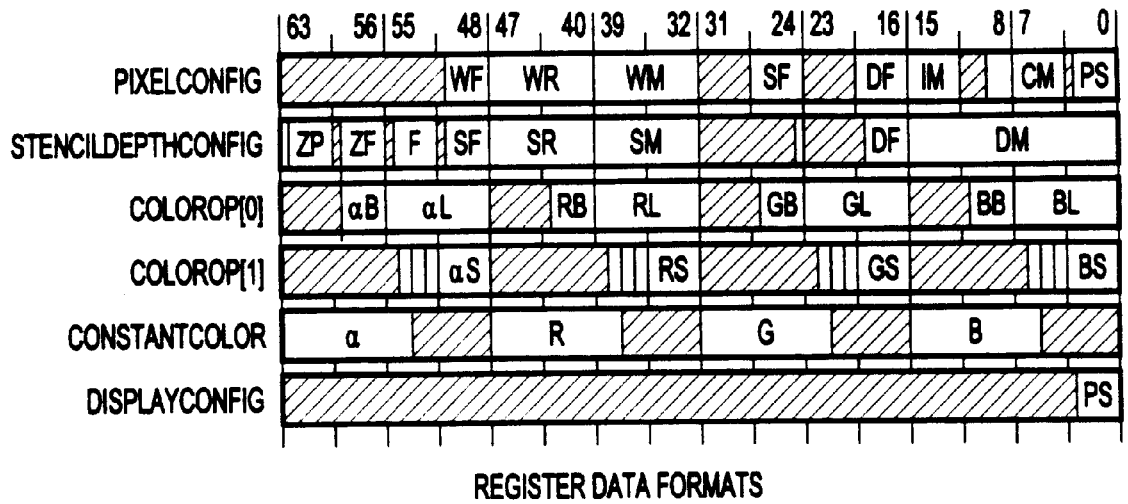
FIG. 50 illustrates data formats for some of the registers.

The RREG, WREG, and BREG operations allow for a 128-word by 64-bit register address space. Efficiency dictates taking advantage of the register width to minimize the number of cycles needed to reprogram the Pixel ALUs 120 and 121. Table 9 below identifies the registers employed in the Dual Pixel 3DRAM chip 110. FIG. 50 illustrates the data formats for some of the registers listed in Table 9. Grey portions represent reserved for these registers.

TABLE 9

Register Map

| $R_{7:0}$ | Name | Mnemonic | Reset Value | Act |
|---|---|---|---|---|
| 0 | Identification | ID | N/A | R |
| 1 | Feature Enable | FE | 0x0000_0000_0000_0000 | R/W |
| 2 | Pixel Config | PC | 0x0000_0000_0000_0000 | R/W |
| 3 | Stencil Depth Config | SDC | 0x0000_0000_0000_0000 | R/W |
| 5–4 | ColorOp[1:0] | CO | 0x0000_0000_0000_0000 | R/W |
| 6 | Constant Color | CC | 0x0000_0000_0000_0000 | R/W |
| 13–7 | Reserved | — | — | — |
| 15–14 | Byte Mask [1:0] | BM | 0xFFFF_FFFF_FFFF_FFFF | R/W |
| 23–16 | Plane Mask [7:0] | PM | 0xFFF_FFFF_FFFF_FFFF | R/W |
| 63–23 | Reserved | — | — | — |
| 67–64 | ColorWIDLUT [3:0] | CWL | 0x0000_0000_0000_0000 | R/W |
| 71–68 | OverlayWIDLUT [3:0] | OWL | 0x0000_0000_0000_0000 | R/W |
| 72 | Display Config | DC | 0x0000_0000_0000_0000 | R/W |
| 127–73 | Reserved | — | — | — |

1.7.1 Identification

This read-only register identifies the manufacturer, part number, version, and mask stepping for the chip.

1.7.2 FeatureEnable

This register enables or disables new functionality in future versions of Dual Pixel 3DRAM. In the initial version of Dual Pixel 3DRAM, it resets to 0x0000_0000_0000_0000 and should not be set to any other value.

1.7.3 PixelConfig

Figure 51:
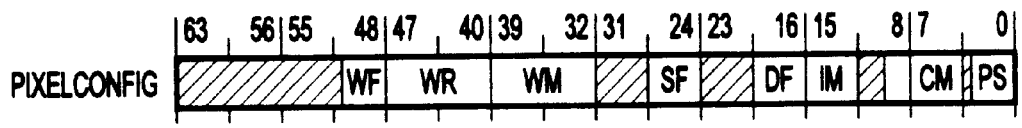
FIG. 51 illustrates the data format for the Pixel Config register.

FIG. 51 illustrates the data field format for the PixelConfig register. This register determines the pixel depth and detailed format of the pixel. Reserved fields, shown in gray, must be set to 0 to ensure future compatibility. Table 10 describes the register's data fields.

TABLE 10

PixelConfig Register Fields

| Field | Width | Description |
|---|---|---|
| PixelSize | 3 bit | Pixel size for SRAM->PALU and PALU->SRAM |
| ColorMode | 4 bit | Determines how color data is stored |
| BufferSelect | 2 bit | Selects A/B color data |
| InputMode | 4 bit | Controls DQ->PALU routing |
| DestinationFactor | 4 bit | Destination blend factor |
| SourceFactor | 4 bit | Source blend factor |
| WIDMask | 8 bit | WID mask value |
| WIDRef | 8 bit | WID reference value |
| WIDFunc | 3 bit | WID compare operation |

The PixelSize field is used by the Pixel ALU-to-SRAM formatter 140 and the SRAM-to-Pixel ALU formatter 144 to select the pixel size during SPIX and DPIX operations.

TABLE 11

Pixel Size

| PS[2:0] | Pixel Size |
|---|---|
| 0 | 8 bit, 16 bit, 32 bit |
| 1 | 64 bit |
| 2 | 128 bit |

TABLE 11-continued

Pixel Size

| PS[2:0] | Pixel Size |
|---|---|
| 3 | 256 bit |
| 4 | 512 bit |

The ColorMode field specifies the color data format for formatter 140 and 144. Table 12 describes the colormode formats.

TABLE 12

ColorMode Field

| | Color Format | | | |
|---|---|---|---|---|
| Encoding | Alpha | Red | Green | Blue |
| 0 | 8 | 8 | 8 | 8 |
| 1 | 8 | 0 | 0 | 0 |
| 2 | 2 | 10 | 10 | 10 |
| 3 | 10 | 10 | 10 | 10 |
| 4 | 4 | 4 | 4 | 4 |
| 5 | 8 | 8 | 0 | 0 |
| 6 | 0 | 5 | 6 | 5 |
| 7 | 1 | 5 | 5 | 5 |

The BufferSelect field selects a color buffer for formatters 140 and 144 which format data between the Pixel ALUs 120 and 121 and the SRAM Pixel Buffer 118. BufferSelect[0] chooses between the lower and upper 16 bits of color in a 32-bit word. If the color is 32 or 40 bits, BufferSelect[0] has no effect. BufferSelect[1] chooses between the lower and upper 32 or 40 bits of color data when 64 or 80 bits of color are in a pixel. BufferSelect[1] has no effect if the PixelSize is 64 bits.

InputMode controls the input data formatter 130. The source and destination factor fields are encoded as described in Table 13.

TABLE 13

Blend operation field

| Encoding | Factor | | | | OpenGL |
|---|---|---|---|---|---|
| | Alpha | Red | Green | Blue | |
| 0 | | | 0 | | GL_ZERO |
| 1 | | | 1 | | GL_ONE |
| 2 | 1 | | min (Sα, 1-Dα) | | GL_SRC_ALPHA_SATURATE |
| 4 | Sa | Sr | Sg | Sb | GL_SRC_COLOR |
| 5 | 1-Sα | 1-Sr | 1-Sg | 1-Sb | GL_ONE_MINUS_SRC_COLOR |
| 6 | | | Sα | | GL_SRC_ALPHA |
| 7 | | | 1-Sα | | GL_ONE_MINUS_SRC_ALPHA |
| 8 | Dα | Dr | Dg | Db | GL_DST_COLOR |
| 9 | 1-Dα | 1-Dr | 1-Dg | 1-Db | GL_ONE_MINUS_DST_COLOR |
| 10 | | | Dα | | GL_DST_ALPHA |
| 11 | | | 1-Dα | | GL_ONE_MINUS_DST_ALPHA |
| 12 | Cα | Cr | Cg | Cb | GL_CONSTANT_COLOR |
| 13 | 1-Cα | 1-Cr | 1-Cg | 1-Cb | GL_ONE_MINUS_CONSTANT_COLOR |
| 14 | | | Cα | | GL_CONSTANT_ALPHA |
| 15 | | | 1-Cα | | GL_ONE_MINUS_CONSTANT_ALPHA |

WIDFunc, DepthFunc, and StencilFunc fields are encoded as described in table 14.

TABLE 14

WIDFunc, DepthFunc, and StencilFunc Field

| DepthFunc | Condition | OpenGL |
|---|---|---|
| 0 | Pass | GL_ALWAYS |
| 1 | Source > Destination | GL_GREATER |
| 2 | Source == Destination | GL_EQUAL |
| 3 | Source >= Destination | GL_GEQUAL |
| 4 | Fail | GL_NEVER |
| 5 | Source <= Destination | GL_LEQUAL |
| 6 | Source != Destination | GL_NOTEQUAL |
| 7 | Source < Destination | GL_LESS |

1.7.4 StencilDepthConfig

Figure 52:
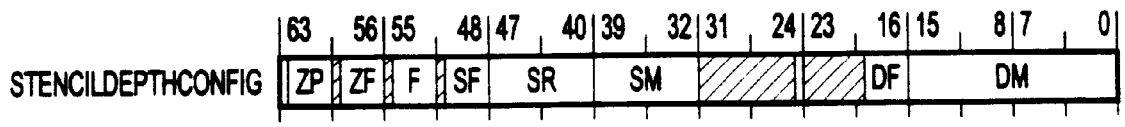
FIG. 52 illustrates the data format for the StencilDepthConfig register.

FIG. 52 illustrates the data field format for the StencilDepthConfig register. This register controls the stencil and depth units 170 and 168. The 16-bit depth mask field, a 3-bit depth compare function field, and a 1-bit DepthLoad field control the depth unit 170. The StencilMask field determines which bits take part in the stencil compare operation. Destination data is compared to the StencilRef value. StencilFunc specifies how the destination and reference values are compared. The StencilOp* fields determine how to calculate new stencil data. Reserved fields, shown in gray, must be set to 0 to ensure future compatibility.

TABLE 15

StencilDepthConfig Register

| Field | Width | Description |
|---|---|---|
| DepthMask | 16 bit | Controls which bits of depth are compared |
| DepthFunc | 3 bit | Selects compare operation |
| DepthLoad | 1 bit | Load input accumulators during DPIX |
| StencilMask | 8 bit | Stencil mask value |
| SencilRef | 8 bit | Stencil reference value |
| StencilFunc | 3 bit | Stencil compare operation |

TABLE 15-continued

StencilDepthConfig Register

| Field | Width | Description |
|---|---|---|
| StencilOpFail | 3 bit | Stencil operation if stencil test fails |
| StencilOpZfail | 3 bit | Stencil operation if stencil test passes and depth fails |
| StencilOpZpass | 3 bit | Stencil operation if stencil test passes and depth passes |

The DepthFunc and StencilFunc fields are encoded according to Table 14, above.

The StencilOp* fields are encoded as described in Table 16.

TABLE 16

StencilOp* Field

| StencilOp | Operation | OpenGL |
|---|---|---|
| 0 | Destination | GL_KEEP |
| 1 | 0 | GL_ZERO |
| 2 | Reference | GL_REPLACE |
| 3 | Destination | GL_INVERT |
| 4 | Saturate (Destination + 1) | GL_INCR |
| 5 | Saturate (Destination - 1) | GL_DECR |
| 6 | Destination + 1 | GL_INCRWRAP |
| 7 | Destination - 1 | GL_DECWRAP |

1.7.5 ColorOp[0]

Figure 53:
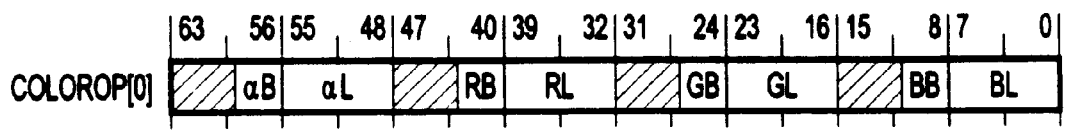
FIG. 53 illustrates the data format for the ColorOp[0] register.

FIG. 53 illustrates the ColorOp[0] register fields. The ColorOP[0] register has control fields for individual alpha, red, green, and blue ROP and blend units 174 and 176. Reserved fields, shown in gray, must be set to 0 to ensure future compatibility.

TABLE 17

ColorOp[0] Register

| Field | Width | Description |
|---|---|---|
| AlphaLogicOp | 8 bit | Alpha logic operation |
| AlphaBlendOp | 3 bit | Alpha blend operation |

TABLE 17-continued

ColorOp[0] Register

| Field | Width | Description |
|---|---|---|
| RedLogicOp | 8 bit | Red logic operation |
| RedBlendOp | 3 bit | Red blend operation |
| GreenLogicOp | 8 bit | Green logic operation |
| GreenBlendOp | 3 bit | Green blend operation |
| BlueLogicOp | 8 bit | Blue logic operation |
| BlueBlendOp | 3 bit | Blue blend operation |

The logic operation fields are encoded according to Microsoft Windows™ conventions for selecting 1 of 256 bitwise Boolean operations of source, destination, and pattern colors. The pattern data comes from the ConstantColor register.

The blend operation fields are encoded as described in Table 18.

TABLE 18

Blend Operation Field

| BlendOp | Operation | OpenGL |
|---|---|---|
| 0 | LogicOp(Sc, Dc, Pattern) | GL_COLOR_LOGIC_OP |
| 1 | Sc*Sf + Dc*Df | GL_FUNC_ADD |
| 2 | Sc*Sf − Dc*Df | GL_FUNC_SUBTRACT |
| 3 | Dc*Df − Sc*Sf | GL_FUNC_REVERSE_SUBTRACT |
| 4 | min(Sc, Dc) | GL_MIN |
| 5 | max(Sc, Dc) | GL_MAX |

1.7.6 ColorOp[1]

Figure 54:
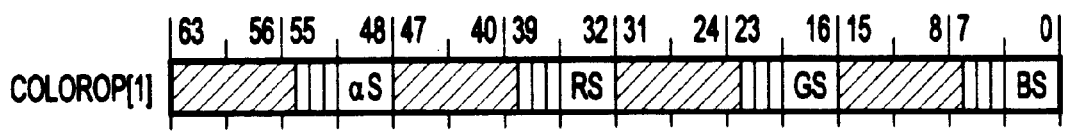
FIG. 54 illustrates the data format for the ColorOp[1] register.

FIG. 54 illustrates the data field format for the ColorOp[1] register. The ColorOp[1] register has control fields for individual alpha, red, green and blue ROP and blend units 176. Reserved fields, shown in gray, must be set to 0 to ensure future compatibility. Table 19 describes the fields of the ColorOp[1] register.

TABLE 19

ColorOp[1] Register

| Field | Width | Description |
|---|---|---|
| AlphaSize | 4 bit | Size of alpha data |
| AlphaLoad | 1 bit | Load alpha accumulator during DPIX |
| AlphaBlendEnable | 1 bit | Format alpha input for blending |
| AlphaDitherEnable | 1 bit | Enable alpha dithering |
| RedSize | 4 bit | Size of red data |
| RedLoad | 1 bit | Load red accumulator during DPIX |
| RedBlendEnable | 1 bit | Format red input for blending |
| RedDitherEnable | 1 bit | Enable red dithering |
| GreenSize | 4 bit | Size of green data |
| GreenLoad | 1 bit | Load green accumulator during DPIX |
| GreenBlendEnable | 1 bit | Format green input for blending |
| GreenDitherEnable | 1 bit | Enable green dithering |
| BlueSize | 4 bit | Size of blue data |
| BlueLoad | 1 bit | Load blue accumulator during DPIX |
| BlueBlendEnable | 1 bit | Format blue input for blending |
| BlueDitherEnable | 1 bit | Enable blue dithering |

The component size files are encoded as descried in Table 20.

TABLE 20

Size Field Encoding

| Encoding | Size |
|---|---|
| 1 | 1 bit |
| 2 | 2 bit |
| 3 | 3 bit |
| 4 | 4 bit |
| 5 | 5 bit |
| 6 | 6 bit |
| 7 | 7 bit |
| 8 | 8 bit |
| 9 | 9 bit |
| 10 | 10 bit |

1.7.7 ConstantColor

Figure 55:
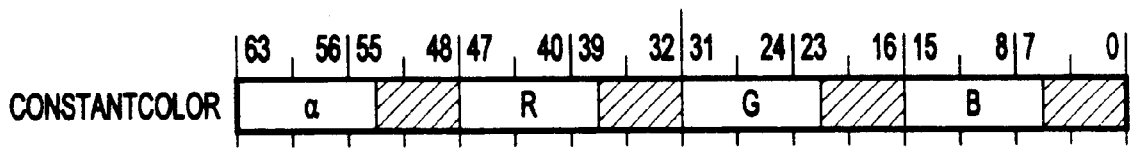
FIG. 55 illustrates the data format for the ConstantColor register.

FIG. 55 illustrates the data field format for the ConstantColor register. The constantcolor register is either used as a pattern data for logic operations or as constant data for blend operations. Reserved fields, shown in gray, must be set to ensure future compatibility. Table 21 describes the fields of the ConstantColor register.

TABLE 21

Constant Color Register

| Field | Width | Description |
|---|---|---|
| AlphaConstant | 10 bit | Alpha constant data |
| RedConstant | 10 bit | Red constant data |
| GreenConstant | 10 bit | Green constant data |
| BlueConstant | 10 bit | Blue constant data |

1.7.8 Byte Mask[1:0]

These two registers allow read/write access to the 128-bit Byte Mask. The Byte Mask affects the ML and FL operations.

1.7.9 Plane Mask[7:0]

These 8 registers allow read/write access to the 512-bit Plane Mask. The Plane Mask affects the ML, FL, SPIX and DPIX operations.

1.7.10 ColorWIDLUT[3:0]

These four registers load a Window ID lookup table to select between A buffer (0) or B buffer (1) αRGB color data. During display refresh, the eight-bit WID indexes into the 256-entry Look Up Table (LUT) to produce the select bit.

1.7.11 OverlayWIDLUT[3:0]

These four registers load a Window ID lookup table to select between A buffer (0) or B buffer (1) overlay data. During display refresh, the 8-bit WID indexes into the 256-entry LUT to produce the select bit.

1.7.12 DisplayConfig

Figure 56:
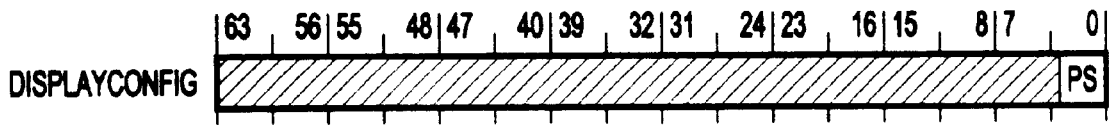
FIG. 56 illustrates the data format for the DisplayConfig register.

FIG. 56 illustrates the data field format of the DisplayConfig register. This register has a 3-bit pixel size field to control the processing of pixel data during RPIX instructions. Reserved fields, shown in gray, must be set to 0 to ensure future compatibility. The PixelSize field is encoded according to Table 11 above.

1.8 Fast Region Clear

The ML, FL, AP, PP, WREG and BREG operations can be used together to clear regions very quickly. The ByteMask[1:0] registers can be used to enable or disable individual pixels within a cache line for writing. The PlaneMask[7:0] registers can be used to enable or disable pixel components for writing.

If individual pixels need to be masked using the ByteMask[1:0] registers, the AP, PP, WREG and ML operations need to be used. Before any pixels are filled, all of the pixels in a 1024-bit cache line are set to the desired clear value and the 512 bit PlaneMask register is set to enable writing only to those bits of the pixel that are to be cleared. Next, the 128-bit ByteMask register is written using two WREG or BREG operations. A ML operation then writes the cache line to the sense amps using the ByteMask and PlaneMask registers. Subsequent WREG and ML operation sequences can be overlapped to support a peak fill rate of 128 bytes every 10 nanoseconds or 12.8 Gigabytes per second. An 80 Megabit device can be filled in 819 microseconds.

Figure 57:
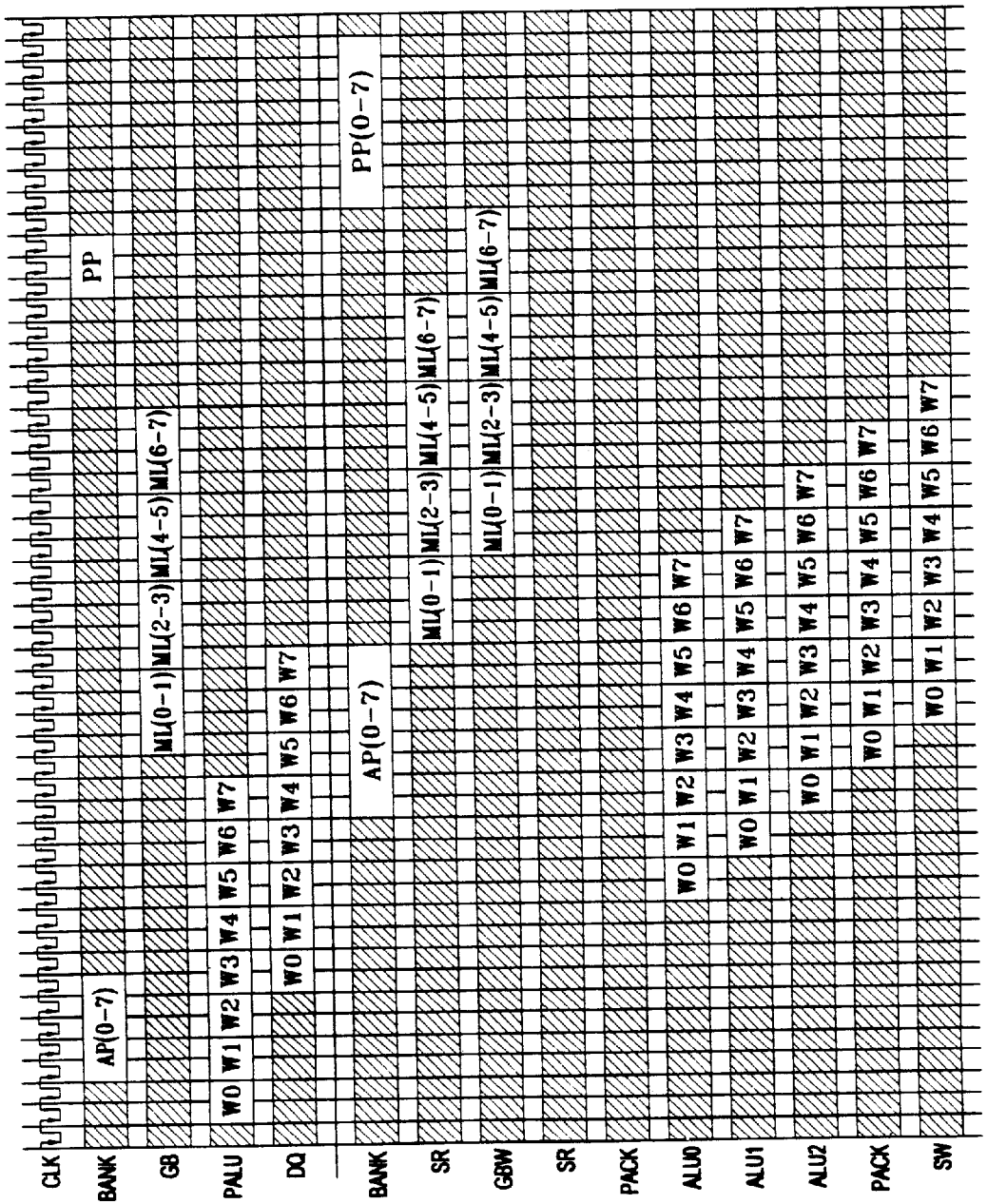
FIG. 57 illustrates how WREG to ByteMask and ML operations perform fast fill, in timing diagram format.
Figure 58:
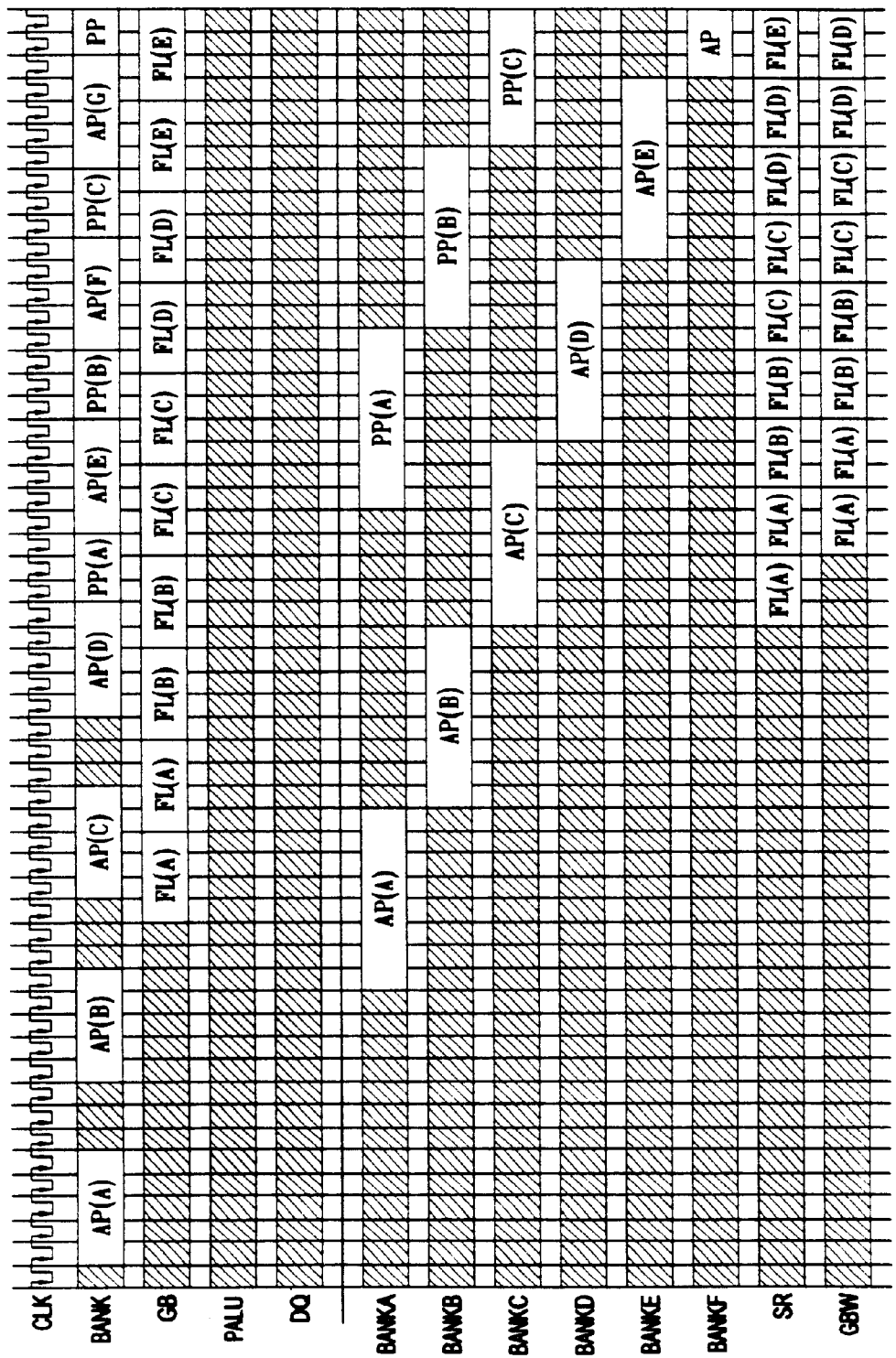
FIG. 58 illustrates how FL operations perform a really fast fill, in timing diagram format.

If all of the pixels in a page are to be cleared, the 128-bit ByteMask register can be set to all ones, and a sequence of FL operations can be used in place of the WREG, ML operation sequences. The 1024-bit cache line and 512-bit PlaneMask register are set as before. Each FL operation clears one-half of a page, so an entire page can be cleared in 20 nanoseconds. The peak fill rate is 8*128 bytes every 20 nanoseconds or 51.2 Gigabytes per second. An 80 Megabit device can be filled in 205 microseconds. Table 22 shows the peak fill rates for all pixel sizes. FIGS. 57 and 58 illustrate the above described Fast Fills and Really Fast Fill sequence of operations.

TABLE 22

Peak Fast Region Clear Rates

| Pixel Size | ML Fill Rate | FL Fill Rate |
|---|---|---|
| 8 bit | 12.8 GP/s | 51.2 GP/s |
| 16 bit | 6.4 GP/s | 25.6 GP/s |
| 32 bit | 3.2 GP/s | 12.8 GP/s |
| 64 bit | 1.6 GP/s | 6.4 GP/s |
| 128 bit | 800 MP/s | 3.2 GP/s |
| 256 bit | 400 MP/s | 1.6 GP/s |
| 512 bit | 200 MP/s | 800 MP/s |

2.0 Data Routing

Many of the novel features of the Dual Pixel 3DRAM chip 110, and the graphics system based upon the chip, are implemented by the chip's 110 four data formatters 130, 134, 140 and 144.

Throughout this section of the disclosure, the SRAM pixel buffer 118 is depicted as two separate functional blocks because many of the processing and routing modes disclosed herein relate to modes of operation where two pixels are being processed simultaneously. It shall therefore be understood that the SRAM pixel buffer 118 may be viewed functionally as being divided into two portions.

2.1 Input Data Formatter

Figure 59:
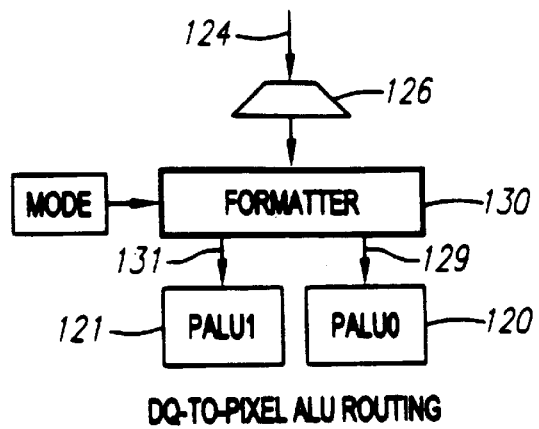
FIG. 59 illustrates the input data formatter in block diagram format.

Referring to FIG. 59, this section describes the routing and processing of incoming data over the I/O bus 124 to the pixel ALUs 120 and 121. Pixel ALU write operations transfer either 72 bits of data in two clocks, or 108 bits of data in three clocks, depending on the format and size of the pixels being processed. Incoming data passes through the input data demultiplexer 126 as close to the pins as possible and is presented to the Pixel ALUs in parallel as either 72 bits or 108 bits. The Pixel ALUs 120 and 121 have the following inputs for source data: Alpha0[10:0], Red0[10:0], Green0[10:0], Blue0[10:0], Depth0[31:0], Alpha1[10:0], Red1[10:0], Green1[10:0], Blue1[10:0], and Depth1[31:0]. The routing is controlled by a 4-bit register field.

2.1.1 Pixel Compression

When performing a 3-dimensional pixel merge, the rendering controller needs to transmit only color and depth information; stencil and window ID information can be stored in registers. When rendering a triangle or surface patch, the generated pixels usually exhibit a great deal of coherency. This section describes a novel, lossless compression scheme to transmit pixel pairs across the data pins in the minimal number of clock cycles.

This scheme evaluates the differences between pixel pairs and between the most recently processed (old) pixel pair and the incoming (new) pixel pair. Because there is frequently a high degree of coherency between the pixels in a pair, as well as between two sequentially processed pixel pairs, the incoming pixel data may sometimes be expressed in significantly fewer bits. Under such circumstances, all that need be transmitted is the differences between the old pixel pair and the new one, expressed in the least significant bits of the new pixel pair. In the best cases, where a high degree of coherency between pixel pairs is observed, a 2-to-1 compression rate may be achieved, effectively doubling the input bandwidth from the rendering controller 102 to the Dual Pixel 3DRAM chip 110. Where a moderate degree of coherency is observed, a 4-to-3 compression rate may be achieved. And where little coherency is observed, no compression is permitted.

Dual Pixel 3DRAM 110 stores the most recently transmitted pixel pair in a set of registers with 32 bits for each depth value and 10 bits for each of the four color components. Thus, 72 bits of data per pixel are transmitted over the rendering bus 112. Since pixels are frequently processed in pairs on the Dual Pixel 3DRAM chip 110, complete data for a pair of pixels is expressed in 144 bits. Because texture mapping tends to reduce the coherency of color values, we are less likely to save bandwidth by compressing color values. Depth values, however, will very often exhibit a great deal of coherency. Thus, the disclosed compression scheme takes advantage of the high rate of coherency between depth values. Described below is the algorithm for compressing and uncompressing pixel data.

Both the rendering controller 102 and the Dual Pixel 3DRAM chip 110 store the pixel pair that was most recently transmitted. Listed below are "old" pixels 0 and 1, broken out in their color (alpha, red, green and blue) and depth (z)components.

OA0, OR0, OG0, OB0, OZ0

OA1, OR1, OG1, OB1, OZ1

As part of its normal rendering processing, the rendering controller 102 calculates a new pixel pair. In many cases, the old and new pixel components will have similar values, and the new pixel pairs will also have similar values. Listed below are "new" pixels 0 and 1, broken out in their color (alpha, red, green and blue) and depth (z)components.

NA0, NR0, NG0, NB0, NZ0

NA1, NR1, NG1, NB1, NZ1

If pixel components have similar values, their differences will be small and can be represented by fewer bits than the components themselves. Pixel component differences are calculated by the rendering controller 102 using the equations listed below, where the prefix "D" stands for difference or delta:

$DA0=NA0-OA0; \quad DA1=(NA1-OA1)-(NA0-OA0);$ $DR0=NR0-OR0; \quad DR1=(NR1-OR1)-(NR0-OR0);$ $DG0=NG0-OG0; \quad DG1=(NG1-OG1)-(NG0-OG0);$ $DB0=NB0-OB0; \quad DB1=(NB1-OB1)-(NB0-OB0);$ $DZ0=NZ0-OZ0; \quad DZ1=(NZ1-OZ1)-(NZ0-OZ0);$ Only the calculated differences are transmitted from the rendering controller 102 to Dual Pixel 3DRAM chip 110, thereby reducing the number of bits per pixel transmitted over the rendering bus 112. The new pixel components are recovered by the input data formatter 130 on the Dual Pixel 3DRAM chip 110 in the following manner:

NA0=OA0+DA0; NA1=OA1+DA0+DA1

NR0=OR0+DR0; NR1=OR1+DR0+DR1

NG0=OG0+DG0; NG1=OG1+DG0+DG1

NB0=OB0+DB0; NB1=OB1+DB0+DB1

NZ0=OZ0+DZ0; NZ1=OZ1+DZ0+DZ1

Figure 60:
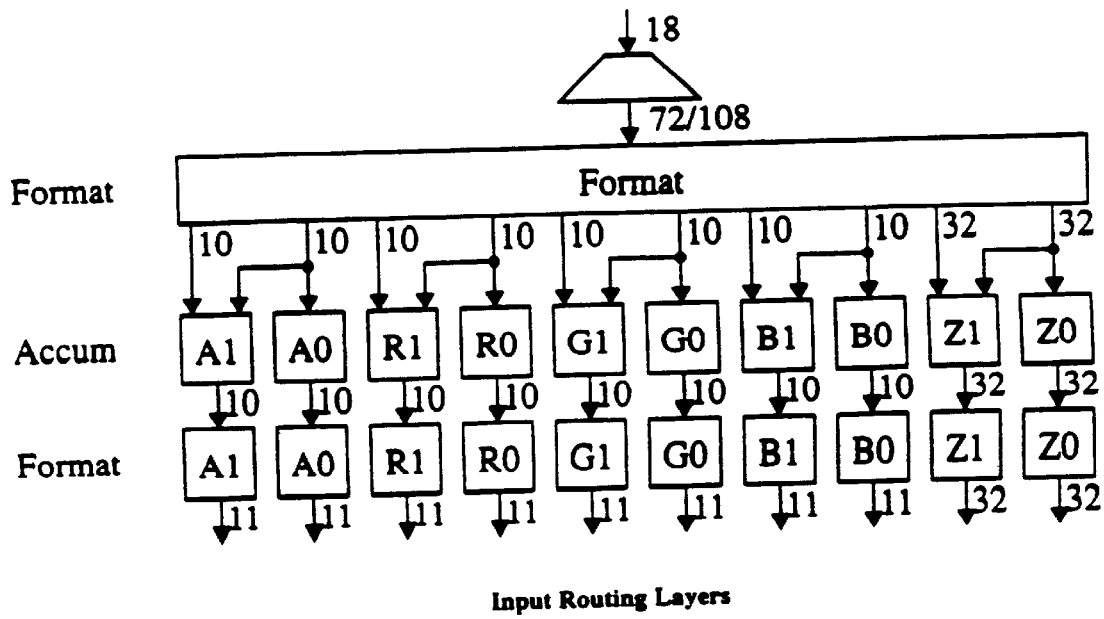
FIG. 60 illustrates the input routing layers of the input data formatter.

Referring to FIG. 60, the input data formatter 130 implements its decompression scheme in three layers. The first layer extracts the 10 difference components from a variety of formats and sign extends them if needed. The second layer adds the differences to the previous pixel components to recover the new pixel components. The third layer formats the new pixel components. Color components are shifted left according their final width, and the upper 16 bits of the depth values are masked.

2.1.2 Input Data Formats

Figure 61:
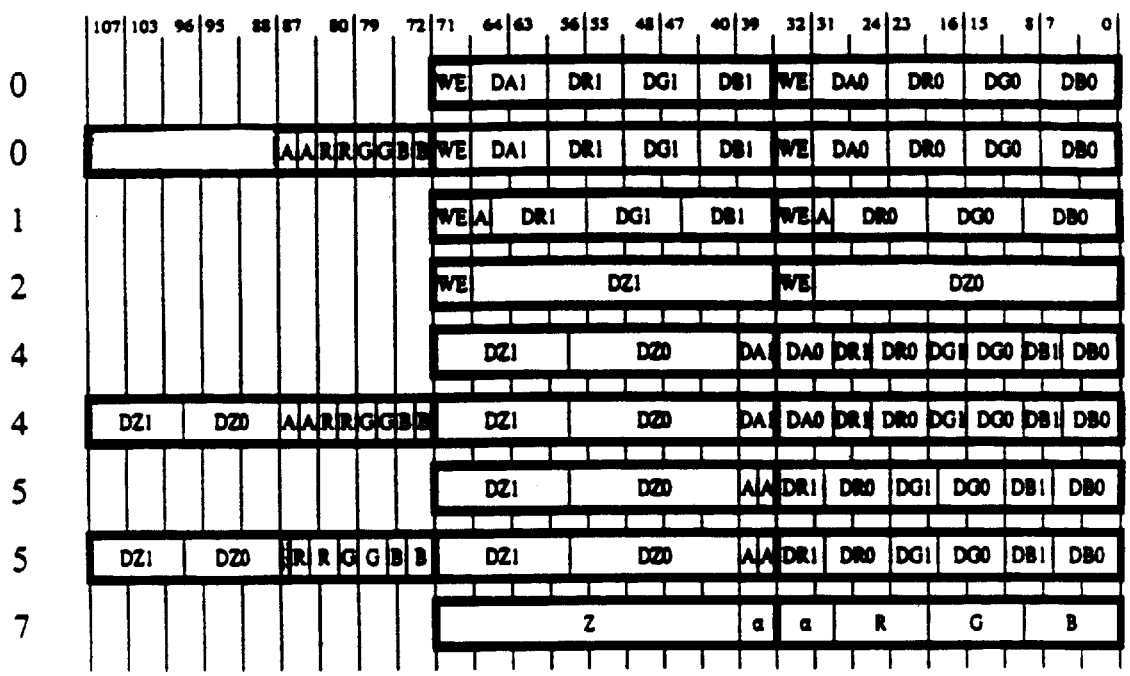
FIG. 61 illustrates input data formats.

As listed in Table 23 below, Dual Pixel 3DRAM 110 has the following input data formats. If the operation is WDAT or BDAT, the input format is forced to mode 0 regardless of how the registers are programmed. If the operation is SPIX, the input format is forced to mode 7. If the operation is DPIX, the input format is set by writing to the InputMode register field. Modes 0 and 1 are used for 2-dimensional pixel updates where depth is not needed. Mode 2 is used during anti-aliasing operations. Modes 4 and 5 are used for 3-dimensional pixel updates. FIG. 61 illustrates all of the possible formats for data being transmitted across the rendering bus 112 from the rendering controller 102 to the input data formatter 130.

2.1.4 Final Formatting

Figures 62, 63:
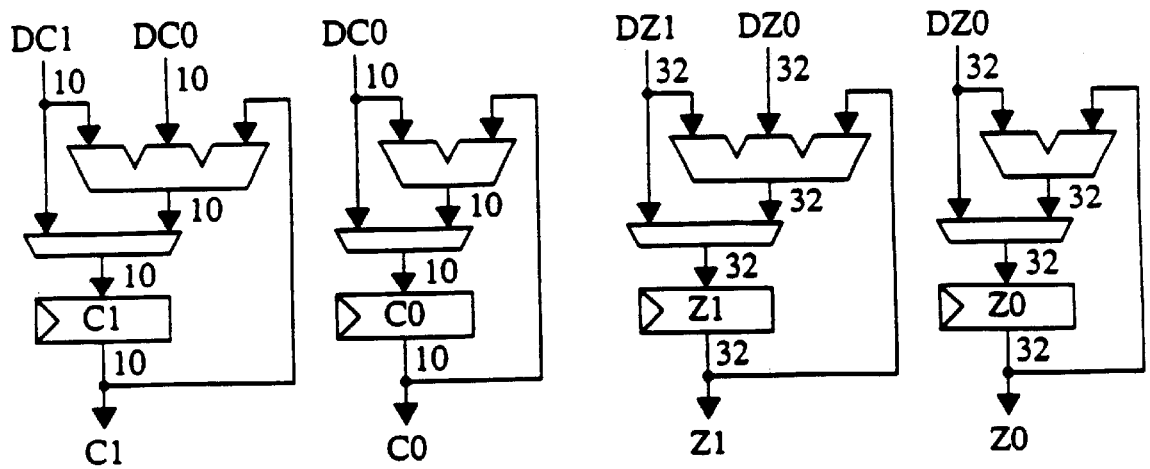
FIG. 62 illustrates color and depth accumulators in block diagram format.
FIG. 63 illustrates color component formatting for ROP/Blend units.

FIG. 63 illustrates the final format layer of the input data formatter 130. Color components are shifted left according to the number of bits that will be used by the ROP/Blend units 166. If the component is to be blended, a 1 is appended to the right of the least significant bit. Listed below are two verilog functions which perform the color and depth formatting of the final layer of processing within the input data formatter 130.

```
function [10:0] FormatColor;
    input [9:0] Data;      // Raw color component data
    input [3:0] Size;      // Size of color component
    input      Blend;      // Set if colors are to be blended
    begin
        casex(Size)
            4'b0001: FormatColor = {Data[ 0], Blend, 9'b000000000};
                                                          // 1 bit
            4'b0010: FormatColor = {Data[1:0], Blend, 8'b00000000};
                                                          // 2 bits
            4'b0011: FormatColor = {Data[2:0], Blend, 7'b0000000};
                                                          // 3 bits
            4'b0100: FormatColor = {Data[3:0], Blend, 6'b000000};
                                                          // 4 bits
            4'b0101: FormatColor = {Data[4:0], Blend, 5'b00000};
                                                          // 5 bits
            4'b0110: FormatColor = {Data[5:0], Blend, 4'b0000};
                                                          // 6 bits
            4'b0111: FormatColor = {Data[6:0], Blend, 3'b000};
                                                          // 7 bits
            4'b1000: FormatColor = {Data[7:0], Blend, 2'b00};
                                                          // 8 bits
            4'b1001: FormatColor = {Data[8:0], Blend, 1'b0};
                                                          // 9 bits
            4'b1010: FormatColor = {Data[9:0], Blend};
                                                          // 10 bits
            default: FormatColor = 'bx;
        endcase
    end
endfunction
```

The upper 16 bits of the depth value are bitwise anded with the DepthMask register field.

TABLE 23

Bit field allocations in input data formats

| Mode | Op | Cycles | Fill Rate | Alpha DA0 | DA1 | Red DR0 | DR1 | Green DG0 | DG1 | Blue DB0 | DB1 | Depth DZ0 | DZ1 |
|---|---|---|---|---|---|---|---|---|---|---|---|---|---|
| 0 | WDAT | 2 | 400 | 8 | 8 | 8 | 8 | 8 | 8 | 8 | 8 | — | — |
|   | BDAT | 3 | 267 | 10 | 10 | 10 | 10 | 10 | 10 | 10 | 10 | — | — |
|   | DPIX |   |   |   |   |   |   |   |   |   |   |   |   |
| 1 | DPIX | 2 | 400 | 2 | 2 | 10 | 10 | 10 | 10 | 10 | 10 | — | — |
| 2 | DPIX | 2 | 400 | — | — | — | — | — | — | — | — | 32 | 32 |
| 4 | DPIX | 2 | 400 | 6 | 4 | 6 | 4 | 6 | 4 | 6 | 4 | 18 | 14 |
|   |      | 3 | 267 | 8 | 6 | 8 | 6 | 8 | 6 | 8 | 6 | 28 | 24 |
| 5 | DPIX | 2 | 400 | 2 | 2 | 7 | 5 | 7 | 5 | 7 | 5 | 18 | 14 |
|   |      | 3 | 267 | 2 | 2 | 10 | 7 | 10 | 7 | 10 | 7 | 28 | 24 |
| 7 | SPIX | 2 | 200 | 10 |   | 10 |   | 10 |   | 10 |   | 32 |   |

2.1.3 Accumulators

FIG. 62 illustrates the implementation of the accumulator layer of the input data formatter. The same 10-bit color accumulator design is used for processing alpha, red, green and blue data, while similarly designed 32-bit accumulators are used for processing depth data. During WDT, BDT and SPIX operations, difference data is loaded directly into the accumulators. During DPIX operations, the loading of difference data is controlled by register bits.

```
function [31:0] FormatDepth;
    input [31:0] Data; // Raw depth data
    input [15:0] Mask; // Mask
    begin
    FormatDepth={Data[31:16]& Mask, Data[15:0]};
    end
endfunction
```

2.2 Output Data Formatter

When the operation is RDAT or when the operation is RPIX and the PixelSize field of the DisplayConfig register is set to 8, 16, 32 bit pixels, the formatter selects 64 bits of data from the 1024 cache line according to the P[3:0] bits of the operation. The ColorWIDLUT and OverlayWIDLUT registers are ignored in this case.

When the operation is RPIX and the PixelSize field of the DisplayConfig register is set to 64 bit pixels, the formatter extracts the 8 bit WID fields from the pair of 64 bit pixels addressed by the P[3:1] bits of the operation. The extracted WID fields index into the ColorWIDLUT to produce a pair of color A/B buffer selects. The extracted WID fields index into the OverlayWIDLUT to produce a pair of 16/32 bit selects.

The 16/32 bit selects determine whether to send all 32 bits of color data over the DQ pins or whether to send only 160 bits of color data over the DQ pins. In the latter case, the A/B buffer selects determine whether to send the upper or lower 16 bits of color data over the DQ pins.

When the operation is RPIX and the PixelSize field of the DisplayConfig register is set to 128 bit pixels, the formatter extracts the 8 bit WID fields from the pair of 128 bit pixels addressed by the P[3:2] bits of the operation. The extracted WID fields index into the ColorWIDLUT to produce a pair of color A/B buffer selects. The extracted WID fields index into the OverlayWIDLUT to produce a pair of overlay A/B buffer selects.

The color A/B buffer selects determine whether to transmit the A or B color buffer data over the DQ pins. The overlay A/B buffer selects determine whether to transmit the A or B overlay data over the DQ pins.

Figure 64:
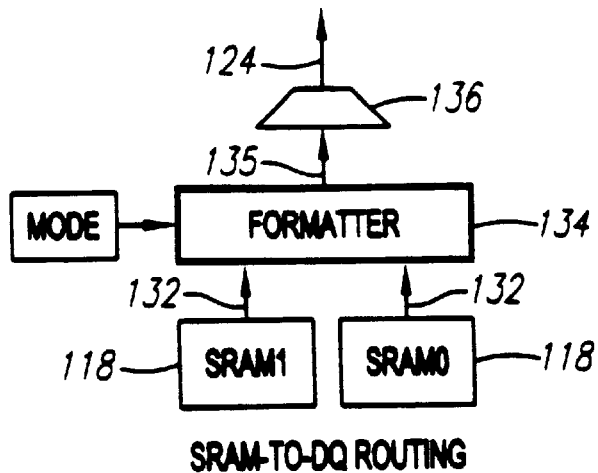
FIG. 64 illustrates the output data formatter in block diagram format.

Referring to FIG. 64, this section describes the routing and processing of outgoing data from the SRAM pixel buffer 118 to the rendering controller 102. The outgoing data is transmitted over the SRAM output data bus 132 to the output data formatter 134. The output data formatter 134 operates in different modes, depending on the pixel format that is being transmitted off the Dual Pixel 3DRAM chip 110. Modes are set by the mode register.

This path is used by the RDAT and RPIX operations, wherein 256 bits of data are read out of the SRAM pixel buffer 118, and either 72 or 108 bits of data are extracted from the 256 bits, and then sent to the output data multiplexer 136 for transmission off the chip 110 to the rendering controller 102 over the rendering bus 112. The RDAT operation reads 64 bits of data in two cycles while the RPIX operation reads one to eight pixels in two or three cycles.

2.2.1 RDAT, RPIX (8-, 16-, 32-bit Pixel) Operation

Figure 65:
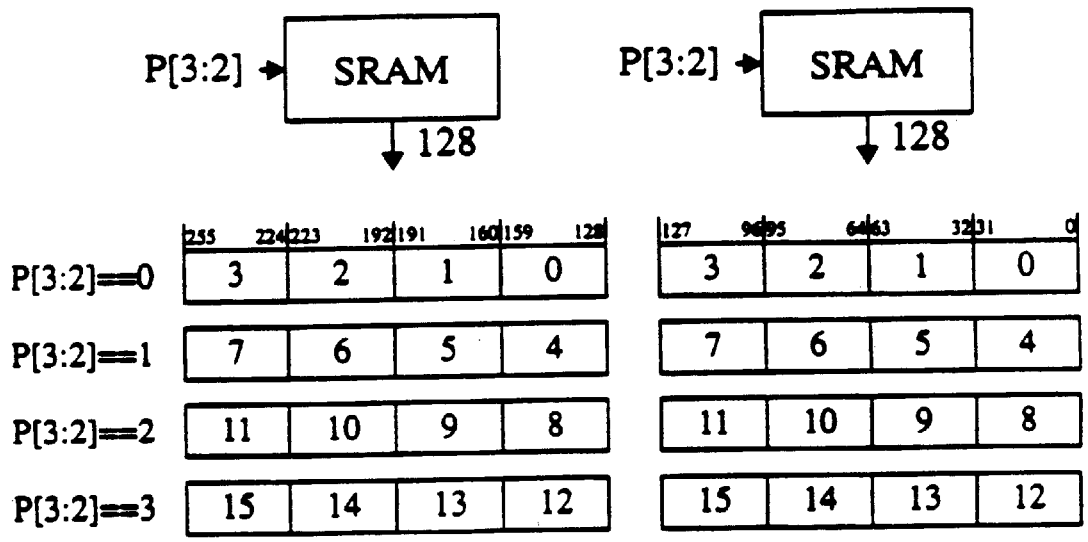
FIG. 65 illustrates output data routing: RDAT, RPIX operation.
Figure 66:
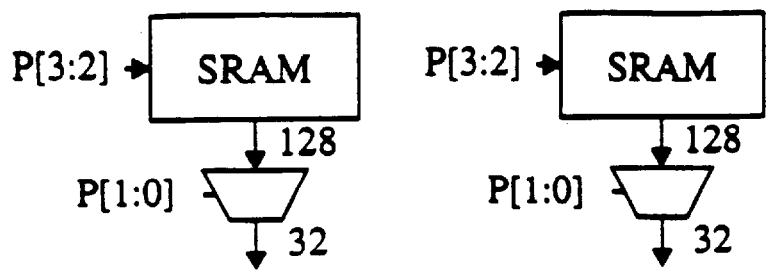
FIG. 66 illustrates output data routing.
Figure 67:
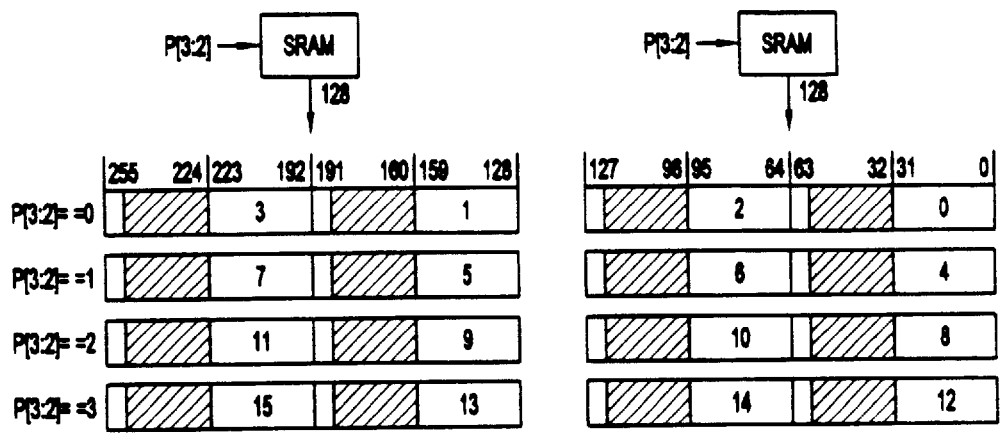
FIG. 67 illustrates output data routing: RPIX operation.

FIG. 65 illustrates the RDAT and RPIX operations for 8, 16, and 32-bit pixel formats. In this mode, 64 bits are selected from the 1024-bit cache line. The SRAM pixel buffer 118 provides 256 bits which are muxed down to 64 bits.

In this mode, 64 contiguous bits are selected from the 1024-bit cache line and presented to the output data multiplexer 136.

2.2.2 RPIX (64-bit Pixel) Operation

FIGS. 67–70 illustrate various modes and aspects of the 64-bit RPIX operation. In the mode depicted in FIG. 67, two contiguous 64-bit pixels are selected from the 1024-bit cache line, ignoring P[0].

Figure 68:
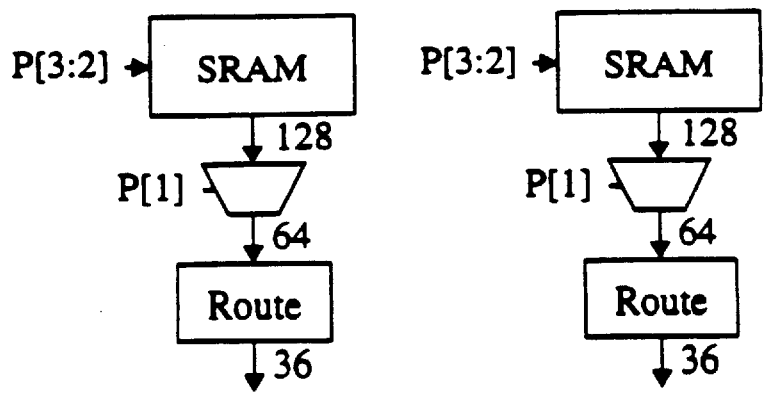
FIG. 68 illustrates output data routing.

In the mode depicted in FIG. 68, 2 contiguous 64-bit pixels are selected from the 1024-bit cache line, ignoring P[0], and are then processed and presented to the output data multiplexer 136.

Figure 69:
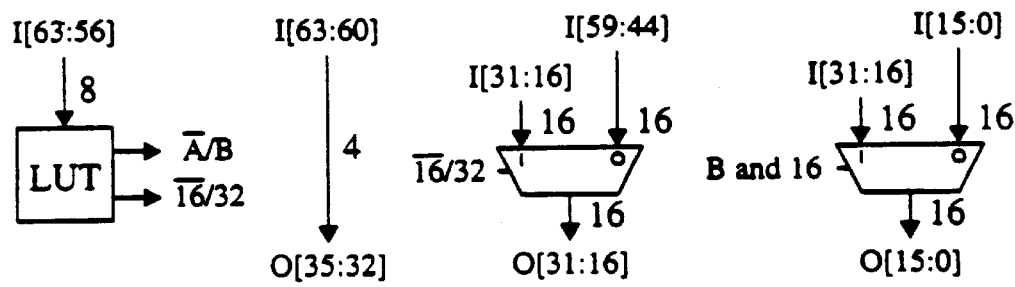
FIG. 69 illustrates output data routing.

The even 64-bit pixel is processed as shown in FIG. 69 to produce a 36-bit output to the output data multiplexer 136. The window ID bits determine whether the color data is 16-bit double buffered, or 32-bit single buffered, and if double buffered, whether to select the A or B buffer. The eight window ID bits index into the 256-bit ColorWIDLUT and 256-bit OverlayWIDLUT registers to produce the select bits.

Figure 70:
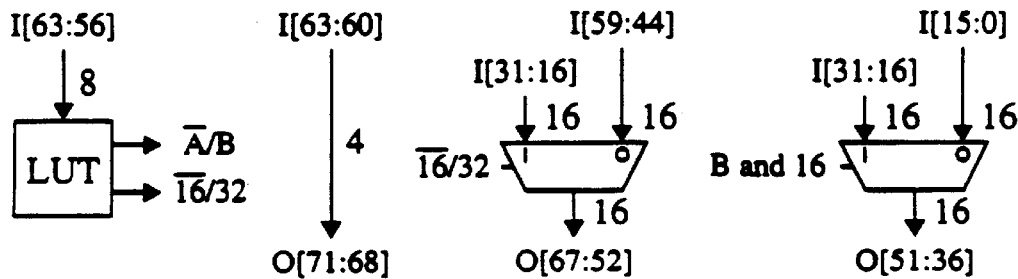
FIG. 70 illustrates output data routing.

The odd 64-bit pixel is processed as shown in FIG. 70 to produce a 36-bit output to the output data multiplexer 136. The window ID bits determine whether the color data is 16-bit double buffered or 32-bit single buffered, and if double buffered, whether to select the A or B buffer.

2.2.3 RPIX (96-bit Pixel) Operation

Figure 71:
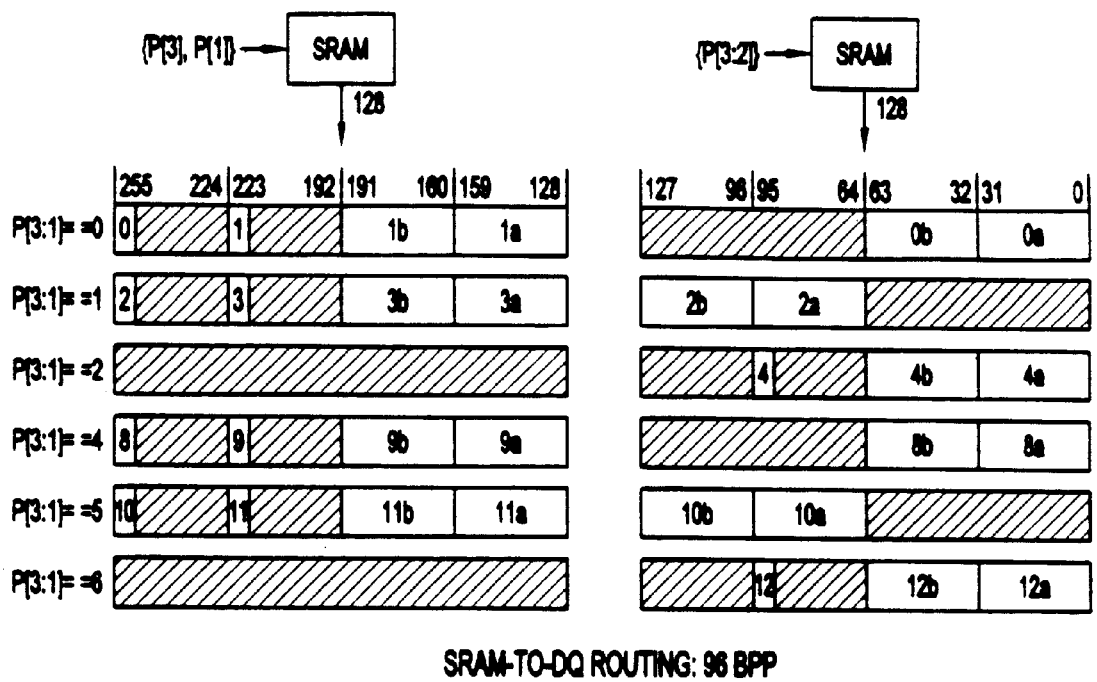
FIG. 71 illustrates output data routing: 96 bits per pixel.

FIGS. 71–74 illustrate various modes and aspects of the 96-bit RPIX operation. As illustrated in FIG. 71, in this mode, 2 contiguous 96-bit pixels are selected from the 1024-bit cache line, ignoring P[0].

Figure 72:
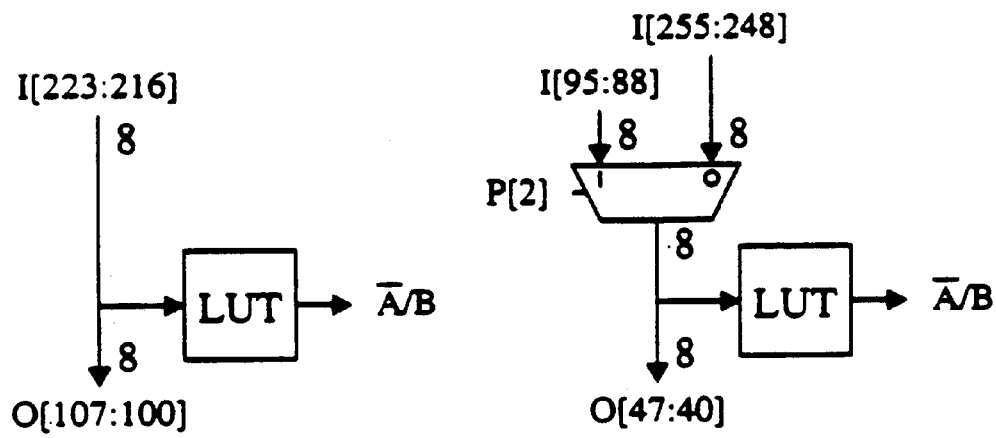
FIG. 72 illustrates output data routing.
Figure 73:
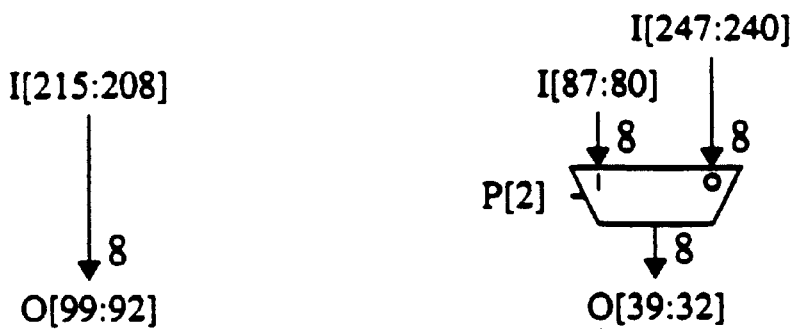
FIG. 73 illustrates output data routing.
Figure 74:
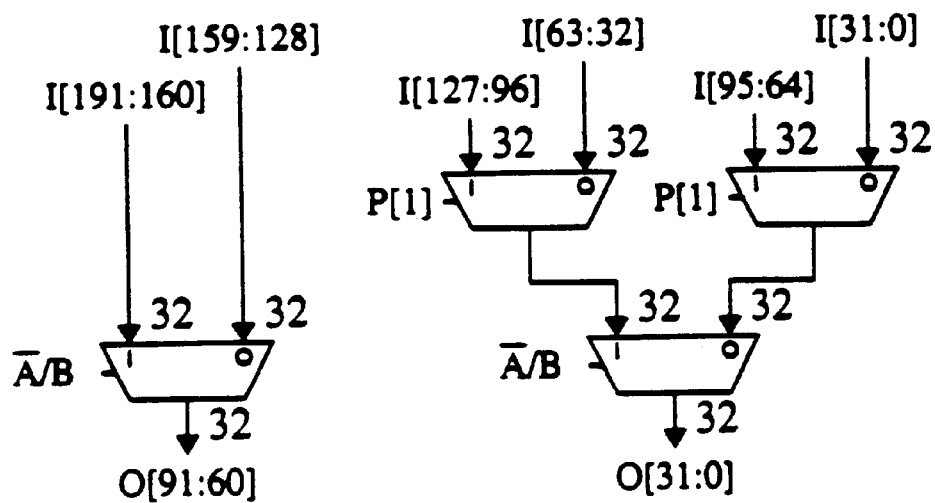
FIG. 74 illustrates output data routing.
Figure 75:
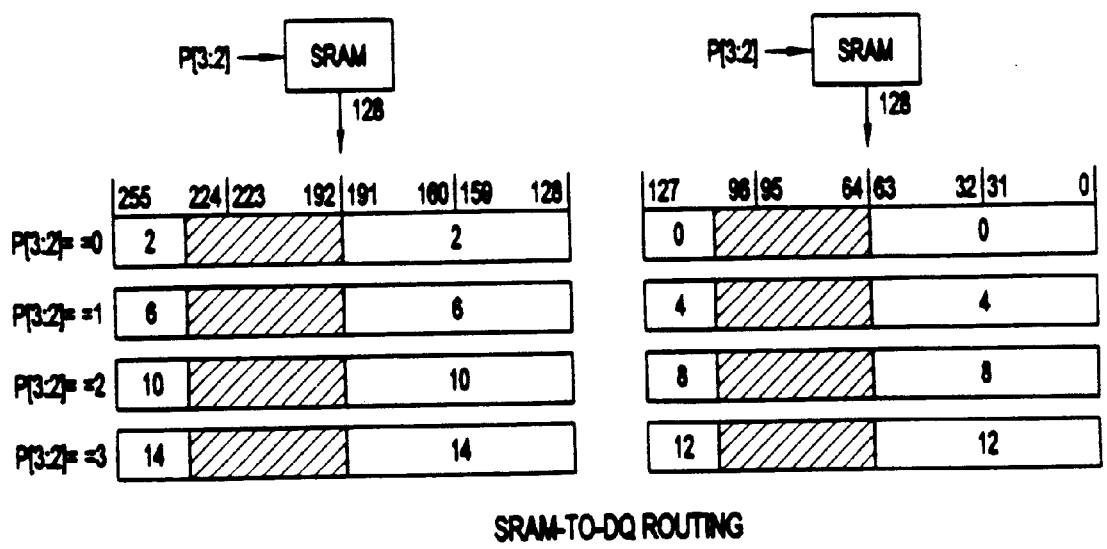
FIG. 75 illustrates output data routing.

The two 96-bit pixels are processed in parallel as shown in FIG. 72 to produce two 48-bit outputs to the output data multiplexer 136. The window ID bits determine whether to select the A or B buffer. FIGS. 73 and 74 show how window IDs and single buffered overlays for both pixels are handled. FIG. 74 illustrates the data path for the lower 3 bytes of color data.

2.2.4 RPIX (128-bit Pixel) Operation

FIGS. 75–78 illustrate various aspects of the 128-bit pixel RPIX operation. In the mode depicted in FIG. 75, 2 contiguous 128-bit pixels are selected from the 1024-bit cache line, ignoring P[1:0].

Figure 76:
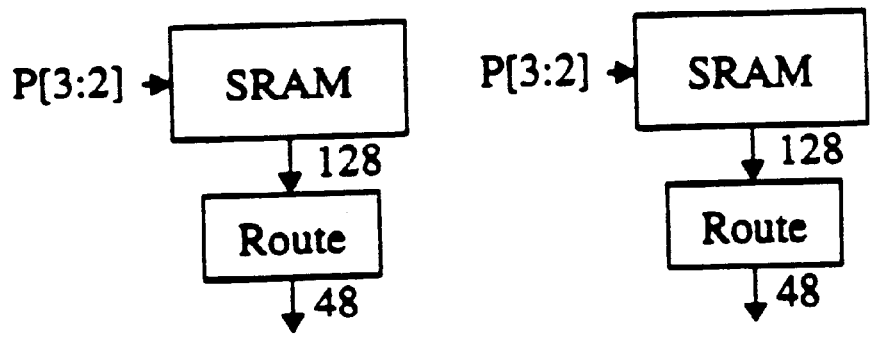
FIG. 76 illustrates output data routing.

In the mode illustrated in FIG. 76, 2 contiguous 128-bit pixels are selected from the 1024 bit cache line, ignoring P[1:0], processed and them presented to the output data multiplexer 136.

Figure 77:
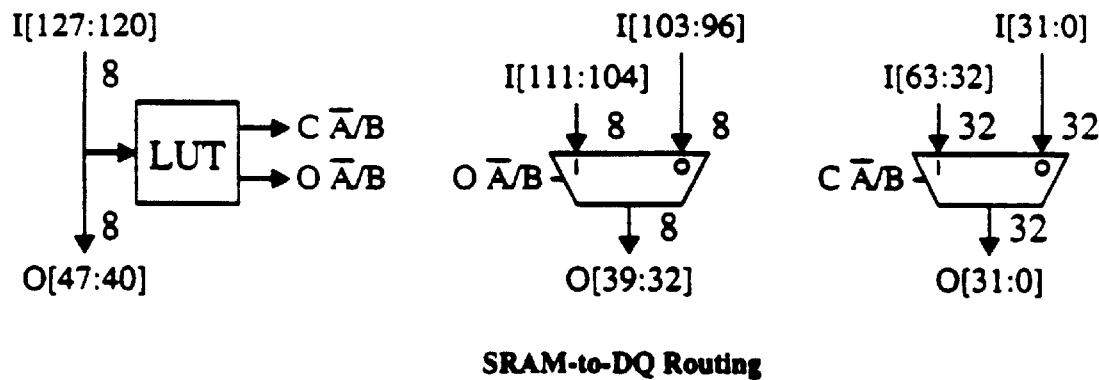
FIG. 77 illustrates output data routing.

The even 128-bit pixel is processed as shown in FIG. 77, to produce a 48-bit output to the output data multiplexer 136. The window ID bits select A or B buffer color, and A or B buffer overlay.

Figure 78:
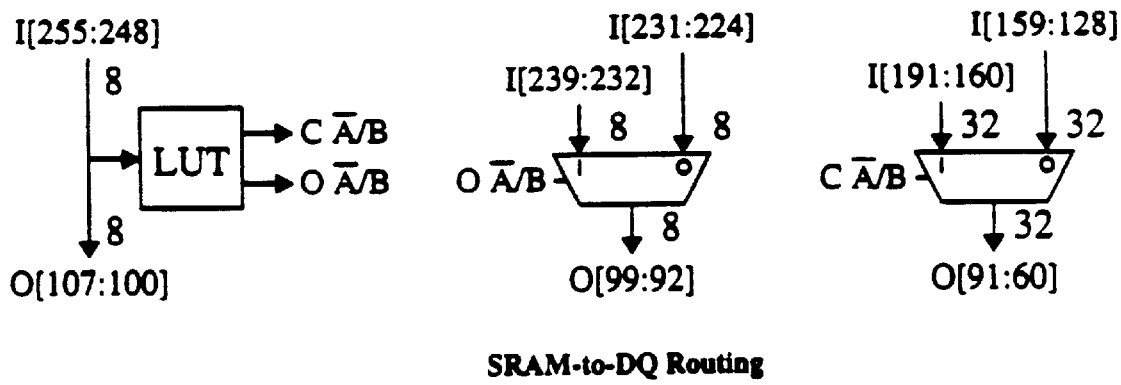
FIG. 78 illustrates output data routing.
Figure 79:
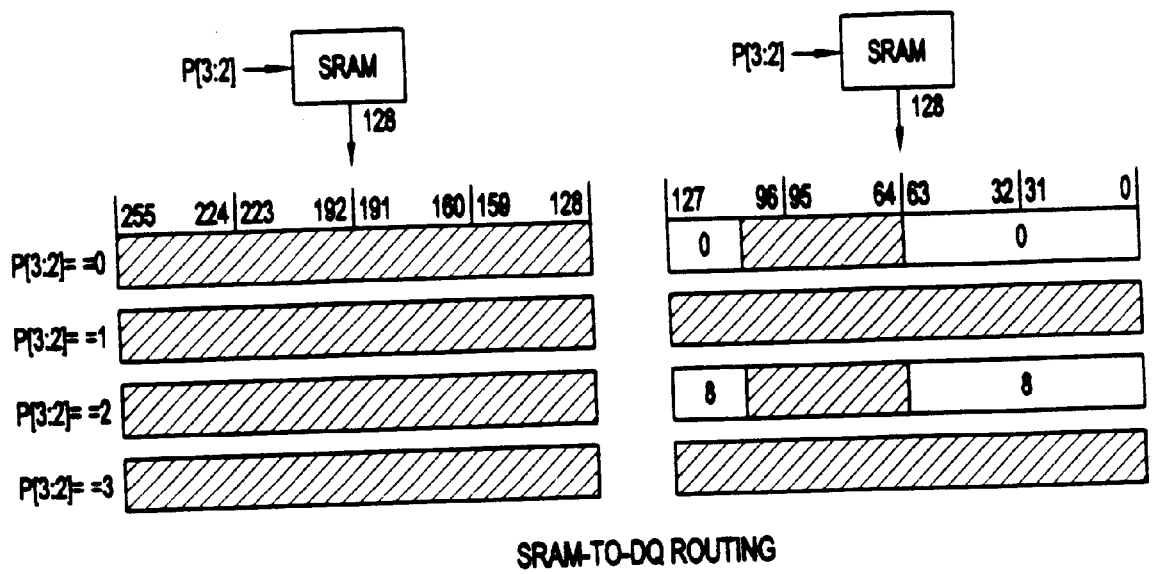
FIG. 79 illustrates output data routing.
Figure 80:
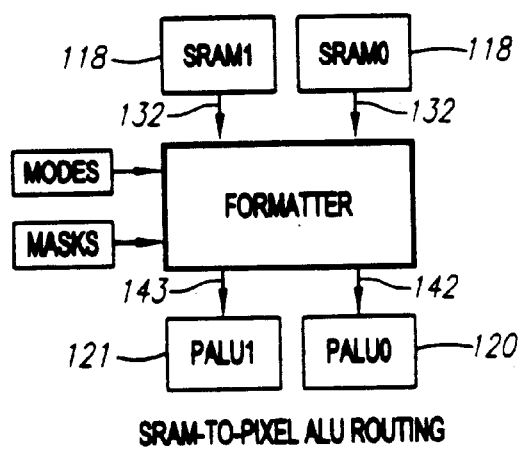
FIG. 80 illustrates the SRAM-to-pixel ALU formatter in block diagram format.
Figures 84, 85:
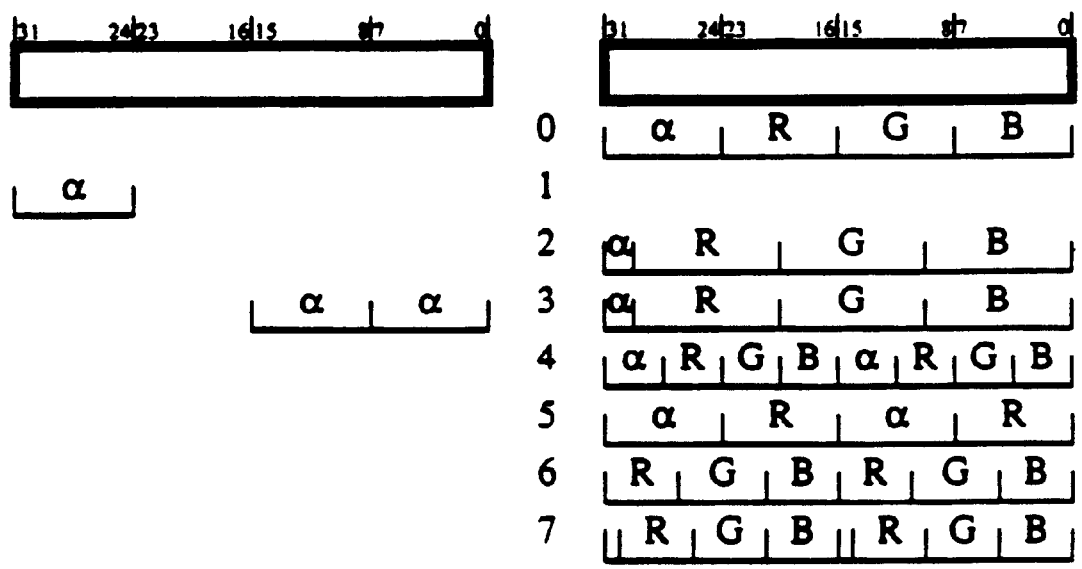
FIG. 84 illustrates an SRAM pixel buffer organization: 128 bits per pixel.
FIG. 85 illustrates unpack functions.
Figure 86:
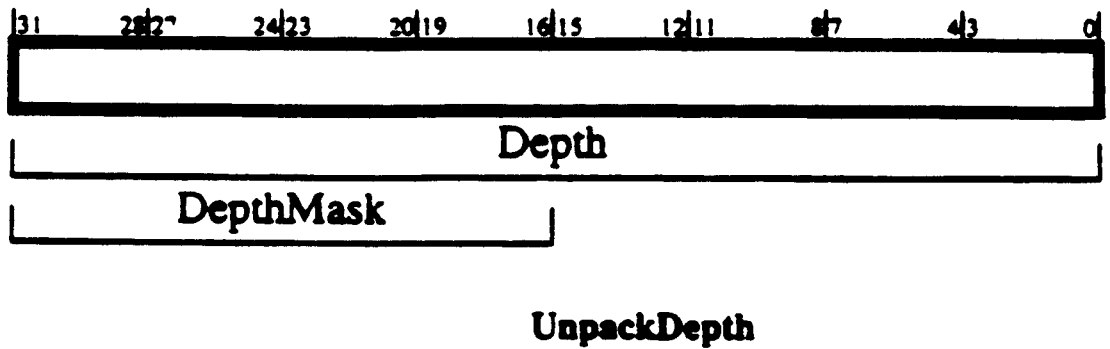
FIG. 86 illustrates the UnpackDepth function.
Figure 87:
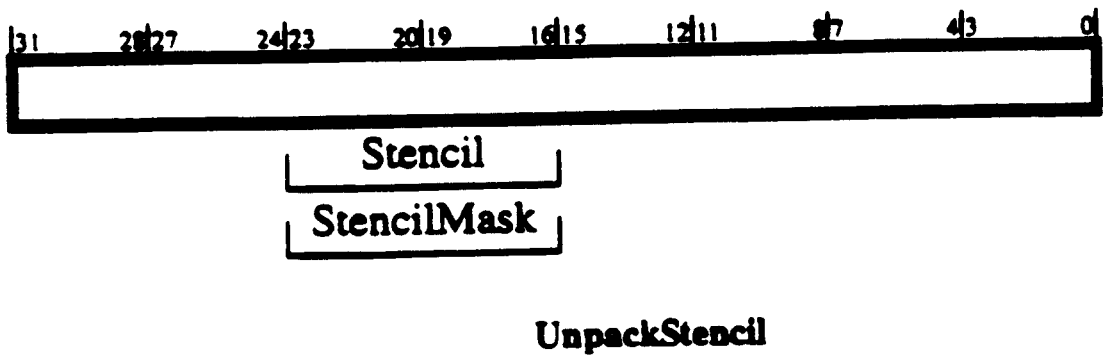
FIG. 87 illustrates the UnpackStencil function.
Figure 88:
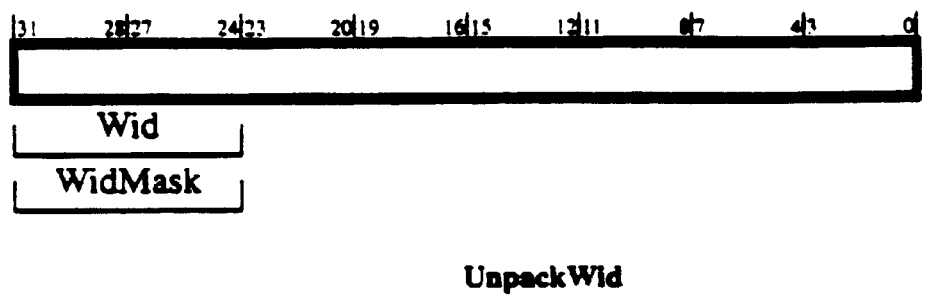
FIG. 88 illustrates the UnpackWid function.
Figure 89:
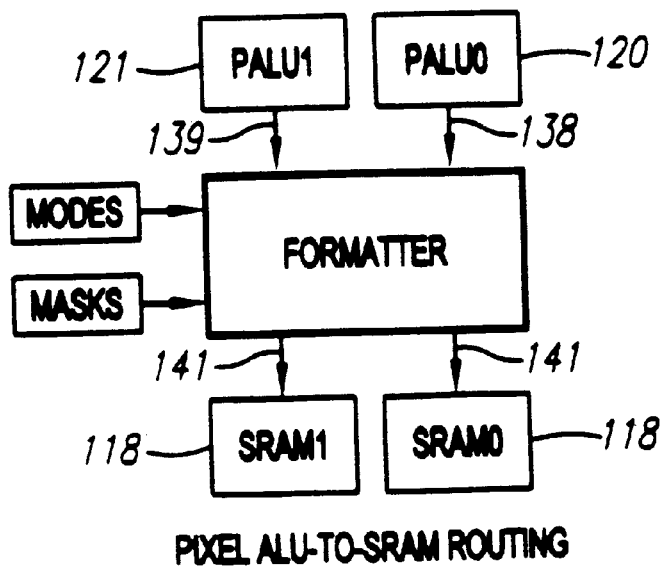
FIG. 89 illustrates pixel ALU-to-SRAM formatter in block diagram format.
Figure 90:
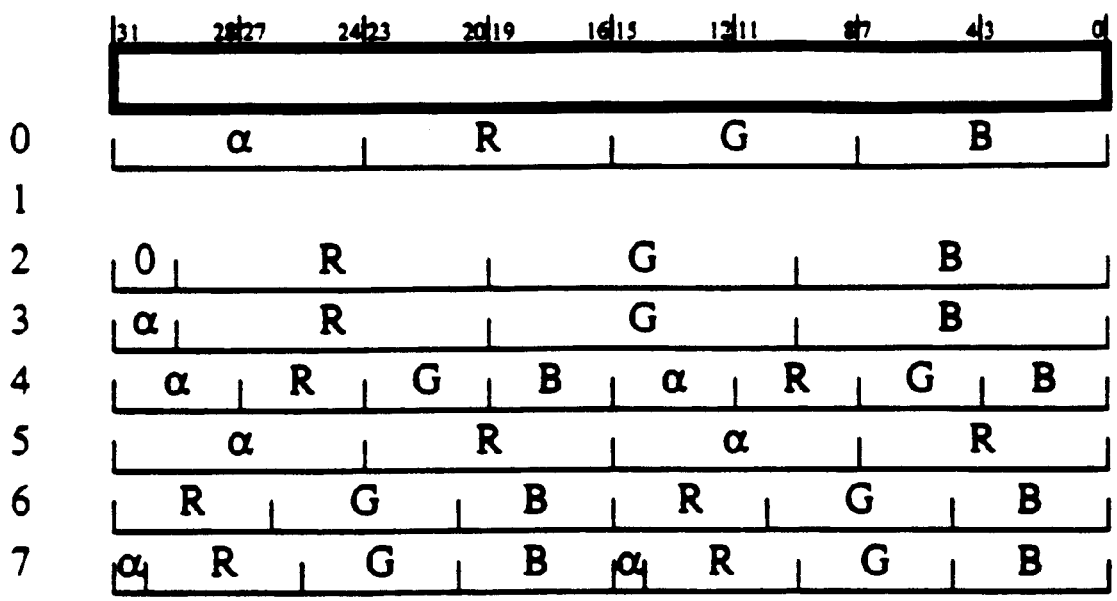
FIG. 90 illustrates the PackColor function.
Figure 91:
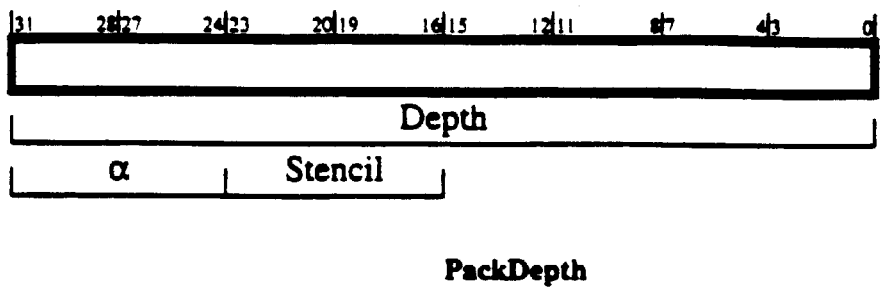
FIG. 91 illustrates the PackDepth function.
Figure 92:
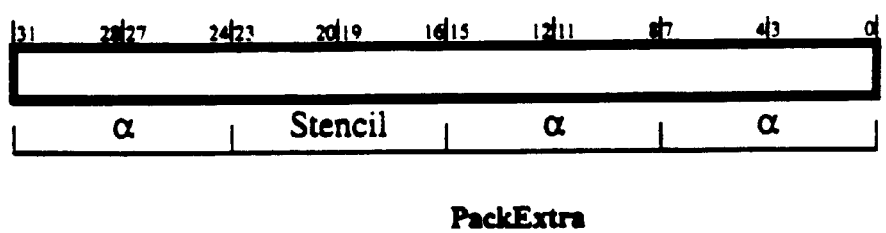
FIG. 92 illustrates the PackExtra function.
Figure 93:
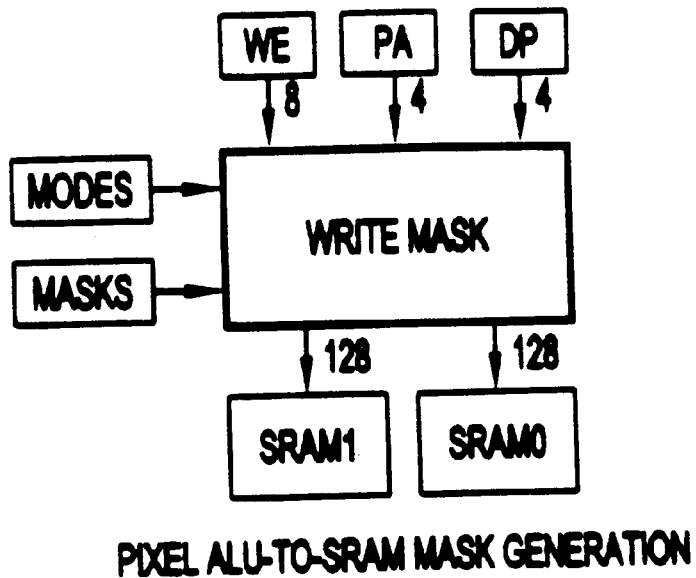
FIG. 93 illustrates pixel ALU-to-SRAM mask generation.

The odd 128-bit pixel is processed as shown in FIG. 78 to produce a 48-bit output to the output data multiplexer 136. The window ID bits select A or B buffer color, and A or B buffer overlay.

2.3 SRAM-to-Pixel ALU Routing

Routes destination data from the SRAM to the Pixel ALU. Reads 256 bits of data from the SRAM and routes appropriate fields to the following Pixel ALU inputs. Alpha0[10:0], Red0[10:0], Green0[10:0], Blue0[10:0], Depth0[31:0], Stencil0[7:0], WID0[7:0], Alpha1[10:0], Red1[10:0], Green1[10:0], Blue1[10:0], Depth1[31:0], Stencil1[7:0], and WID1[7:0]. All Pixel ALU inputs are masked by register values.

The SRAM->DQ and SRAM->PALU routing blocks will never be used at the same time so whatever circuitry they have in common can be shared.

The SRAM->PALU routing can be done in two phases. The first phase selects 32-bit sections of each pixel based on the pixel's size, address, and A/B color buffer select. The second phase unpacks color, depth, stencil, and WID fields according to A/B select, colormode, and various masks.

2.3.1 SRAM Organization of 8-, 16-, and 32-bit Pixels

These pixels contain only alpha, red, green, and blue data. Each operation deals with 64 bits worth of pixels which are evenly split across both halves of the SRAM.

2.3.2 SRAM Organization of 64-bit Pixels

Each operation can deal with two pixels residing in both halves of the SRAM. The 'ab' section of each pixel contains color data and the 'de' section contains depth, stencil, overlay, and WID data.

2.3.3 SRAM Organization of 96 Bit Pixels

Again, each operation can deal with two pixels but their sections are somewhat scrambled. Each pixel has separate 'a' and 'b' color sections.

2.3.4 SRAM Organization of 128 Bit Pixels

Each operation can deal with two pixels residing in both halves of the SRAM. The depth value is stored in its own section 'd' while stencil, overlay, and WID are stored in section 'e'.

2.3.5 UnpackColors

UnpackColors selects 64 bits of color data from the SRAM based on PixelSize, PixelAddress, and BufferSelect.

```
function [63:0] UnpackColors;
  input [255:0] Data;
  input [2:0] PixelSize;
  input [3:0] PixelAddress;
  input [1:0] BufferSelect;
  begin
    casex({PixelSize, PixelAddress, BufferSelect[1]})
    // 8, 16, 32 bit pixels
    8'b000_xx00_x: UnpackColors={Data[159:128], Data[31:0]};
    8'b000_xx01_x: UnpackColors={Data[191:160], Data[63:32]};
    8'b000_xx10_x: UnpackColors={Data[223:192], Data[95:64]};
    8'b000_xx11_x: UnpackColors={Data[255:224], Data[127:96]};
    // 64 bit pixels
    8'b001_xx0x_x: UnpackColors={Data[159:128], Data[31:0]};
    8'b001_xx1x_x: UnpackColors={Data[223:192], Data[95:64]};
    // 96 bit pixels
    8'b010_x00x_0: UnpackColors={Data[159:128], Data[31:0]};
    8'b010_x00x_1: UnpackColors={Data[191:160], Data[63:32]};
    8'b010_x01x_0: UnpackColors={Data[159:128], Data[95:64]};
    8'b010_x01x_1: UnpackColors={Data[191:160], Data[127:96]};
    8'b010_x10x_0: UnpackColors={{32{1'bx}}, Data[31:0]};
    8'b010_x10x_1: UnpackColors={{32{1'bx}}, Data[63:32]};
    // 128 bit pixels
    8'b011_xxxx_0: UnpackColors={Data[159:128], Data[31:0]};
    8'b011_xxxx_1: UnpackColors={Data[191:160], Data[63:32]};
    default: UnpackColors='bx;
    endcase
  end
endfunction
```

2.3.6 UnpackDepths

UnpackDepths selects 64 bits worth of depth, stencil, overlay, and WID based on PixelSize and PixelAddress.

```
function [63:0] UnpackDepths;
  input [255:0] Data;
  input [2:0] PixelSize;
  input [3:0] PixelAddress;
  begin
    casex({PixelSize, PixelAddress})
    // 64 bit pixels
    7'b001_xx0x: UnpackDepths={Data[191:160], Data[63:32]};
    7'b001_xx1x: UnpackDepths={Data[255:224], Data[127:96]};
    // 96 bit pixels
    7'b010_x0xx: UnpackDepths={Data[223:192], Data[255:224]};
    7'b010_x10x: UnpackDepths={{32{1'bx}}, Data[95:64]};
    // 128 bit pixels
    7'b011_xxxx: UnpackDepths={Data[223:192], Data[95:64]};
    default: UnpackDepths='bx;
    endcase
  end
endfunction
```

2.3.7 UnpackExtras

UnpackExtras selects 64 bits worth of stencil, overlay, and WID based on PixelSize and PixelAddress. UnpackDepths and UnpackExtras return the same data for 64 and 96 bit pixels.

```
function [63:0] UnpackExtras;
  input [255:0] Data;
  input [2:0] PixelSize;
  input [3:0] PixelAddress;
  begin
    casex({PixelSize, PixelAddress})
    // 64 bit pixels
    7'b001_xx0x: UnpackExtras={Data[191:160], Data[63:32]};
    7'b001_xx1x: UnpackExtras={Data[255:224], Data[127:96]};
    // 96 bit pixels
    7'b010_x0xx: UnpackExtras={Data[223:192], Data[255:224]};
    7'b010_x10x: UnpackExtras={{32{1'bx}}, Data[95:64]};
    // 128 bit pixels
    7'b011_xxxx: UnpackExtras={Data[255:224], Data[127:96]};
    default: UnpackExtras='bx;
    endcase
  end
endfunction
```

2.3.8 UnpackAlpha, UnpackRed, UnpackGreen, UnpackBlue

These functions unpack alpha, red, green, and blue data from a 32-bit color section. UnpackAlpha also needs the 32-bit extra section. ColorMode and BufferSelect determine how the colors are unpacked.

```
function [10:0] UnpackAlpha;
  input [31:0] Color;
  input [31:0] Extra;
  input [3:0] ColorMode;
  input [1:0] BufferSelect;
  begin
    casex({ColorMode, BufferSelect[0]})
    5'b0000_x: UnpackAlpha={Color[31:24], 3'b100};
    5'b0001_x: UnpackAlpha={Extra[31:24], 3'b100};
    5'b0010_x: UnpackAlpha={11{1'b1}};
    5'b0011_0: UnpackAlpha={Extra[7:0], Color[31:30], 1'b1};
```

```
    5'b0011__1: UnpackAlpha={Extra[15:8], Color[31:30],
        1'b1};
    5'b0100__0: UnpackAlpha={Color[15:12], 7'b1000000};
    5'b0100__1: UnpackAlpha={Color[31:28], 7'b1000000};
    5'b0101__0: UnpackAlpha={Color[15:8], 3'b100};
    5'b0101__1: UnpackAlpha={Color[31:24], 3'b100};
    5'b0110__x: UnpackAlpha={11{1'b1}};
    5'b0111__0: UnpackAlpha={11{Color[15]}};
    5'b0111__1: UnpackAlpha={11{Color[31]}};
    default: UnpackAlpha='bx;
    endcase
    end
endfunction function [10:0] UnpackRed;
    input [31:0] Color;
    input [3:0] ColorMode;
    input [1:0] BufferSelect;
    begin
    casex({ColorMode, BufferSelect[0]})
    5'b0000__x: UnpackRed={Color[23:16], 3'b100};
    5'b0001__x: UnpackRed={11{1'b1}};
    5'b001x__x: UnpackRed={Color[29:20], 1'b1};
    5'b0100__0: UnpackRed={Color[11:8], 7'b1000000};
    5'b0100__1: UnpackRed={Color[27:24], 7'b1000000};
    5'b0101__0: UnpackRed={Color[7:0], 3'b100};
    5'b0101__1: UnpackRed={Color[23:16], 3'b100};
    5'b0110__0: UnpackRed={Color[15:11], 6'b100000};
    5'b0110__1: UnpackRed={Color[31:27], 6'b100000};
    5'b0111__0: UnpackRed={Color[14:10], 6'b100000};
    5'b0111__1: UnpackRed={Color[30:26], 6'b100000};
    default: UnpackRed='bx;
    endcase
    end
endfunction function [10:0] UnpackGreen;
    input [31:0] Color;
    input [3:0] ColorMode;
    input [1:0] BufferSelect;
    begin
    casex({ColorMode, BufferSelect[0]})
    5'b0000__x: UnpackGreen={Color[15:8], 3'b100};
    5'b0001__x: UnpackGreen={11{1'b1}};
    5'b001x__x: UnpackGreen={Color[19:10], 1'b1};
    5'b0100__0: UnpackGreen={Color[4:7], 7'b1000000};
    5'b0100__1: UnpackGreen={Color[23:20], 7'b1000000};
    5'b0110__0: UnpackGreen={Color[10:5], 5'b10000};
    5'b0110__1: UnpackGreen={Color[26:21], 5'b10000};
    5'b0111__0: UnpackGreen={Color[9:5], 6'b100000};
    5'b0111__1: UnpackGreen={Color[25:21], 6'b100000};
    default: UnpackGreen='bx;
    endcase
    end
endfunction function [10:0] UnpackBlue;
    input [31:0] Color;
    input [3:0] ColorMode;
    input [1:0] BufferSelect;
    begin
    casex({ColorMode, BufferSelect[0]})
    5'b0000__x: UnpackBlue={Color[7:0], 3'b100};
    5'b0001__x: UnpackBlue={{11{1'b1}}};
    5'b001x__x: UnpackBlue={Color[9:0], 1'b1};
    5'b0100__0: UnpackBlue={Color[3:0], 7'b1000000};
    5'b0100__1: UnpackBlue={Color[19:16], 7'b1000000};
    5'b011x__0: UnpackBlue={Color[4:0], 6'b100000};
    5'b011x__1: UnpackBlue={Color[20:16], 6'b100000};
    default: UnpackBlue='bx;
    endcase
    end
endfunction
```

2.3.9 UnpackDepth

UnpackDepth masks out stencil, overlay, and WID data using DepthMask.

```
function [31:0] UnpackDepth;
    input [31:0] Depth;
    input [15:0] DepthMask;
    begin
        UnpackDepth={(Depth[31:16]&DepthMask), Depth
            [15:0]};
    end
endfunction
```

2.3.10 UnpackStencil

UnpackStencil masks out depth data using StencilMask.

```
function [7:0] UnpackStencil;
    input [31:0] Extra;
    input [7:0] StencilMask;
    begin
        UnpackStencil=Extra[23:16]&StencilMask;
    end
endfunction
```

2.3.11 UnpackWid

UnpackWid masks out overlay data using WidMask.

```
function [7:0] UnpackWid;
    input [31:0] Extra;
    input [7:0] WidMask;
    begin
        UnpackWid=Extra[31:24]&WidMask;
    end
endfunction
```

2.3.12 SramToPaluData

SramToPaluData unpacks 32-bit color, depth, and extra sections for two pixels from 256 bits of SRAM data. The alpha, red, green, blue, depth, stencil, and WID fields

```
function [183:0] SramToPaluData;
    input [255:0] Data;
    input [2:0] PixelSize;
    input [3:0] PixelAddress;
    input [1:0] BufferSelect;
    input [3:0] ColorMode;
    input [31:0] DepthMask;
    input [7:0] StencilMask;
    input [7:0] WidMask;

reg [31:0] Color1, Color0;
    reg [31:0] Depth1, Depth0;
    reg [31:0] Extra1, Extra0;
    begin
        {Color1, Color0}=UnpackColors(Data, PixelSize,
            PixelAddress, BufferSelect);
        {Depth1, Depth0}=UnpackDepths(Data, PixelSize,
            PixelAddress);
        {Extra1, Extra0}=UnpackExtras(Data, PixelSize,
            PixelAddress);
```

```
    SramToPaluData={
       UnpackWid(Extra1, WidMask),
       UnpackStencil(Extra1, StencilMask),
       UnpackDepth(Depth1, DepthMask),
       UnpackAlpha(Color1, ColorMode, BufferSelect),
       UnpackRed (Color1, ColorMode, BufferSelect),
       UnpackGreen(Color1, ColorMode, BufferSelect),
       UnpackBlue (Color1, ColorMode, BufferSelect),
       UnpackWid(Extra0, WidMask),
       UnpackStencil(Extra0, StencilMask),
       UnpackDepth(Depth0, DepthMask),
       UnpackAlpha(Color0, ColorMode, BufferSelect),
       UnpackRed (Color0, ColorMode, BufferSelect),
       UnpackGreen(Color0, ColorMode, BufferSelect),
       UnpackBlue (Color0, ColorMode, BufferSelect)
    };
  end
endfunction
```

2.4 Pixel ALU-to-SRAM Data Routing

Routes result data from the Pixel ALU to the SRAM. Alpha0[9:0], Red0[9:0], Green0[9:0], blue0[9:0], Depth0[31:0], Stencil0[7:0], DT0, ST0, WT0, Alpha1[9:0], Red1[9:0], Green1[9:0], Blue1[9:0], Depth1[31:0], Stencil1[7:0], DT1, ST1, and WT1. Each bit of data written to the SRAM has its own write enable.

This datapath can almost be split into two parts; 32 bits of data must be sent from the '0' half to the '1' half. Each half has a ColorPack unit, a DepthPack unit, and an ExtraPack unit. The ColorPack units reformat the ROP/blend unit results. The DepthPack units reformat the Depth, Stencil and Alpha ROP/Blend unit results. The ExtraPack units reformat the Alpha and Stencil unit results.

2.4.1 PackColor

PackColor takes 40bits of color data and packs it into a 32 bit word according to ColorMode. This function is used by all pixel sizes.

```
function [31:0] PackColor;
    input [3:0] ColorMode
    input [9:0] Alpha, Red, Green Blue;
    begin
       case(ColorMode)
         4'd0: PackColor={Alpha[9:2], Red[9:2], Green[9:2], Blue[9:2]};
         4'd2: PackColor={2'd0, Red[9:0], Green[9:0], Blue[9:0]};
         4'd3: PackColor={Alpha[1:0], Red[9:0], Green[9:0], Blue[9:0]};
         4'd4: PackColor={2{Alpha[9:6], Red[9:6], Green[9:6], Blue[9:6]}};
         4'd6: PackColor={2{Red[9:5], Green[9:4], Blue[9:5]}};
         4'd7: PackColor={2{Alpha[9], Red[9:5], Green[9:5], Blue[9:5]}};
       endcase
    end
endfunction
```

2.4.2 PackDepth

PackDepth takes depth, stencil, and alpha data and packs it into a 32 bit word according to DepthMask.

```
function [31:0] PackDepth;
    input [15:0] DepthMask;
    input [31:0] Depth;
    input [7:0] Stencil;
    input [7:0] Alpha;
    begin
       PackDepth[31:24]=(DepthMask[15:8]&Depth[31:24])|
          (~DepthMask[15:8]&Alpha);
       PackDepth[23:16]=(DepthMask[7:0]&Depth[23:16])|
          (~DepthMask[7:0]&Stencil);
       PackDepth[15:0]=Depth[15:0];
    end
endfunction
```

2.4.3 PackExtra

PackExtra takes stencil, and alpha data and packs it into a 32-bit word.

```
function [31:0] PackExtra;
    input [7:0] Stencil;
    input [7:0] Alpha;
    begin
       PackExtra={Alpha, Stencil, Alpha, Alpha};
    end
endfunction
```

2.4.4 PaluToSramData

PaluToSramData takes Pixel ALU result and packs it into a 256-bit word to be written to memory. The PixelSize and PixelAddress inputs determine the overall pixel format while ColorMode, AlphaMask, and StencilMask determine the detailed formatting of data.

```
function [255:0] PaluToSramData;
    // Per pixel info
    input [3:0] PixelAddress;
    input [9:0] Alpha0, Red0, Green0, Blue0
    input [9:0] Alpha1, Red1, Green1, Blue1;
    input [31:0] Depth1, Depth0;
    input [7:0] Stencil1, Stencil0;
    // Register field info
    input [2:0] PixelSize;
  input [2:0] ColorMode;
    input [31:0] DepthMask;

reg [31:0] CP1, CP0, DP1, DP0, EP1, EP0;
    reg [255:0] Data;
    begin
       CP0=ColorPack(ColorMode, Alpha0, Red0, Green0, Blue0);
       CP1=ColorPack(ColorMode, Alpha1, Red1, Green1, Blue1);
       DP0=DepthPack(DepthMask, Depth0, Stencil0, Alpha0);
       DP1=DepthPack(DepthMask, Depth1, Stencil1, Alpha1);
       EP0={(3{Alpha0}}, Stencil0};
       EP1={{3(Alpha1}}, Stencil1};
       casex({PixelSize, PixelAddress})
         7'b000_xxxx: Data={CP1, CP1, CP1, CP1, CP0, CP0, CP0, CP0};
         7'b001_xxxx: Data={DP1, CP1, DP1, CP1, DP0, CP0, DP0, CP0};
         7'b010_x0xx: Data={DP0, DP1, CP1, CP1, CP0, CP0, CP0, CP0};
         7'b010_x1xx: Data={DP0, DP1, CP1, CP1, CP0, DP0, CP0, CP0};
```

```
    7'b011__xxxx: Data={EP1, DP1, CP1, CP1, EP0, DP0,
        CP0, CP0};
    endcase PaluToSramData=Data;
  end
endfunction
```

2.5 Pixel ALU-to-SRAM Mask Generation

Generates a 256 bit write mask for the Pixel ALU->SRAM datapath.

2.5.1 WriteEnableMask

WriteEnableMask expands the byte write enable bits into a 256 bit word. The byte write enables are used to select individual 8-, 16-, and 32-bit pixels. They should only be used for 8-, 16-, and 32-bit pixels.

```
function [255:0] WriteEnableMask;
  input [7:0] WriteEnable;
  reg [31:0] Mask1, Mask0;
  begin
    Mask0={{8{WriteEnable[3]}}, {8{WriteEnable[2]}},
        {8{WriteEnable[1]}}, {8{WriteEnable[0]}}};
    Mask1={{8{WriteEnable[7]}}, {8{WriteEnable[6]}},
        {8{WriteEnable[5]}}, {8{WriteEnable[4]}}};
    WriteEnableMask={{4{Mask1}}, {4{Mask0}}};
  end
endfunction
```

2.5.2 Pixel Address Mask

Pixels larger than 32 bits are generally divided into 32 bit sections. PixelAddressMask uses DualPixel, PixelAddress, and PixelSize to determine which 32 bit sections of the 256 bit word should be written to.

```
function [255:0] PixelAddressMask;
  input DualPixel;
  input [3:0] PixelAddress;
  input [2:0] PixelSize;
  reg [1:0] PixelEnable;
  reg [7:0] WordEnable;
begin
  casex({PixelSize, DualPixel, PixelAddress})
    8'b000__x__xx00: WordEnable=8'b0001__0001; // 8,16,32
        bit
    8'b000__x__xx01: WordEnable=8'b0010__0010; // 8,16,32
        bit
    8'b000__x__xx10: WordEnable=8'b0100__0100; // 8,16,32
        bit
    8'b000__x__xx11: WordEnable=8'b1000__1000; // 8,16,32
        bit
    8'b001__0__xx00: WordEnable=8'b0000__0011; // 64 bit
        single
    8'b001__0__xx01: WordEnable=8'b0011__0000; // 64 bit
        single
    8'b001__0__xx10: WordEnable=8'b0000__1100; // 64 bit
        single
    8'b001__0__xx11: WordEnable=8'b1100__0000; // 64 bit
        single
    8'b001__1__xx0x: WordEnable=8'b0011__0011; // 64 bit
        dual
    8'b001__1__xx1x: WordEnable=8'b1100__1100; // 64 bit
        dual
    8'b010__0__x000: WordEnable=8'b1000__0011; // 96 bit
        single
    8'b010__0__x001: WordEnable=8'b0111__0000; // 96 bit
        single
    8'b010__0__x010: WordEnable=8'b1000__1100; // 96 bit
        single
    8'b010__0__x011: WordEnable=8'b0111__0000; // 96 bit
        single
    8'b010__0__x100: WordEnable=8'b0000__0111; // 96 bit
        single
    8'b010__0__x101: WordEnable=8'b0000__0000; // 96 bit
        single
    8'b010__0__x11x: WordEnable=8'b0000__0000; // 96 bit
        single
    8'b010__1__x00x: WordEnable=8'b1111__0011; // 96 bit
        dual
    8'b010__1__x01x: WordEnable=8'b1111__1100; // 96 bit
        dual
    8'b010__1__x10x: WordEnable=8'b0000__0111; // 96 bit
        dual
    8'b010__1__x11x: WordEnable=8'b0000__0000; // 96 bit
        dual
    8'b011__0__xx0x: WordEnable=8'b0000__1111; // 128 bit
        single
    8'b011__0__xx1x: WordEnable=8'b1111__0000; // 128 bit
        single
    8'b011__1__xxxx: WordEnable=8'b1111__1111; // 128 bit
        dual
  endcase
  PixelAddressMask={
    {32{WordEnable[7]}}, {32{WordEnable[6]}},
    {32{WordEnable[5]}}, {32{WordEnable[4]}},
    {32{WordEnable[3]}}, {32{WordEnable[2]}},
    {32{WordEnable[1]}}, {32{WordEnable[0]}}};
  end
endfunction
```

2.5.3 MaskDepth

MaskDepth is analogous to DepthPack except that the data inputs are replaced by write enables.

```
function [31:0] MaskDepth;
  input [15:0] DepthMask;
  input ColorEnable;
  input DepthEnable;
  input StencilEnable;
  begin
    MaskDepth[31:24]=(DepthMask[15:8]
        &{8{DepthEnable}})|
        (~DepthMask[15:8]&{8{ColorEnable}});
    MaskDepth[23:16]=(DepthMask[7:0]
        &{8{DepthEnable}})|
        (~DepthMask[7:0]&{8{StencilEnable}});
    MaskDepth[15:0]={16{DepthEnable}};
  end
endfunction
```

2.5.4 EnableMask

EnableMask separately enables (or disables) the color, depth, and stencil fields of a pixel. The WID, stencil and depth tests performed by the Pixel ALU determine which fields are written to.

```
function [255:0] EnableMask;
    input [3:0] PixelAddress;
    input ColorEnable1,ColorEnable0;
    input DepthEnable1,DepthEnable0;
    input StencilEnable1,StencilEnable0;
    input [2:0] PixelSize;
    input [31:0] DepthMask;
    reg [31:0] CM1, CM0, DM1, DM0, EM1, EM0;
    begin
        CM0={32{ColorEnable0}};
        CM1={32{ColorEnable1}};
        DM0=DepthMask(DepthMask,
            ColorEnable0, DepthEnable0, StencilEnable0);
        DM1=DepthMask(DepthMask,
            ColorEnable1, DepthEnable1, StencilEnable1);
        EM0={{24{ColorEnable0}}, {8(StencilEnable0}}};
        EM1={{24{ColorEnable1}}, (8{StencilEnable1)}};
        Casex({PixelSize, PixelAddress})
        7'b000-xxxx: EnableMask=(CM1, CM1, CM1, CM1,
            CM0, CM0, CM0, CM0);
        7'b001-xxxx: EnableMask={DM1, CM1, DM1, CM1,
            DM0, CM0, DM0, CM0);
        7'b010-x0xx: EnableMask={DM0, DM1, CM1, CM1,
            CM0, CM0, CM0, CM0);
        7'b010-x1xx: EnableMask={DM0, DM1, CM1, CM1,
            CM0, DM0, CM0, CM0};
        7'b011-xxxx: EnableMask={EM1, DM1, CM1, CM1,
            EMO, DM0, CM0, CM0};
        endcase
    end
endfunction
```

2.5.5 SelectPlaneMask

SelectPlaneMask selects the appropriate 128 bit sections from the 512-bit Plane Mask register.

```
function [255:0] SelectPlaneMask;
    input [3:0] PixelAddress;
    input [2:0] PixelSize;
    input [511:0] PlaneMask;
    begin
    casex({PixelSize, PixelAddress})
    7'b00x-x0xx: SelectPlaneMask=PlaneMask[255:01;
    7'b010-x00x: SelectPlaneMask=PlaneMask[255:0];
    7'b010-x01x: SelectPlaneMask={PlaneMask[511:384],
        PlaneMask[127:0]};
    7'b011-x0xx: SelectPlaneMask=PlaneMask[255:0];
    7'b1xx-x0xx: SelectPlaneMask=PlaneMask[255:01;
    7'bxxx-x1xx: SelectPlaneMask=PlaneMask[511:256];
    endcase
    end
endfunction
```

2.5.6 Pixel ALU-to-SRAM Mask

PaluToSramMask generates the final write per bit mask by bitwise anding the results of WriteEnableMask, PixelAddressMask, EnableMask, and SelectPlaneMask

```
function [255:0] PaluToSramMask;
    // Per pixel information
    input [7:0] WriteEnable;
    input DualPixel;
    input [3:0] PixelAddress;
    input ColorEnable1,ColorEnable0;
    input DepthEnable1,DepthEnable0;
    input StencilEnable1,StencilEnable0;

// Info from register fields
    input [2:0] PixelSize;
    input [15:0] AlphaMask;
    input [7:0] StencilMask;
    input [511:0] PlaneMask;

begin
        PaluToSramMask
        WriteEnableMask(WriteEnable) &
        PixelAddressMask(DualPixel, PixelAddress,
            PixelSize) &
        EnableMask(PixelAddress,
            ColorEnable1, ColorEnable0, DepthEnable1,
            DepthEnable0,
            StencilEnable1, StencilEnable0, PixelSize,
            DepthMask) &
        SelectPlaneMask(PixelAddress, PixelSize,
            PlaneMask);
    end
endfunction
```

3.0 Pixel Formats

The Dual Pixel 3DRAM chip 110 supports many different pixel formats from 8 bits to 512 bits. Pixel sizes of 8 bits through 32 bits do not support 3-dimensional graphics rendering operations. Pixel sizes of 256 bits and 512 bits support multi-sampled, anti-aliasing operations. Table 24 below lists peak pixel rates for different pixel rates and sizes.

TABLE 24

Peak Pixel Rates for Various Pixel Transfers and Sizes in Mpixels/sec

| Bits per pixel | ML Clear Rate | FL Clear Rate | 2D Render | 3D Render | Display |
|---|---|---|---|---|---|
| 8 | 12,800 | 51,200 | 1600 | — | 1600 |
| 16 | 6400 | 25,600 | 800 | — | 800 |
| 32 | 3200 | 12,800 | 400 | — | 400 |
| 64 | 1600 | 6400 | 400 | 267–400 | 400 |
| 128 | 800 | 3200 | 400 | 200–400 | 267 |
| 256 | 400 | 1600 | 200 | 66.7 | 200 |
| 512 | 200 | 800 | 200 | 50 | 200 |

The pixel capacities of three embodiments of the Dual Pixel 3DRAM device 110 can be found in the Table 25 below, where 1K equals 1024 bits, and 1 M equals 1024K or 1,048,576 bits.

TABLE 25

Pixel Capacity by Pixel Size and Device Size

| Bits per pixel | 40 Mbit | 80 Mbit | 160 Mbit |
|---|---|---|---|
| 8 | 5,242,880 | 10,485,760 | 20,971,520 |
| 16 | 2,621,440 | 5,242,880 | 10,485,760 |
| 32 | 1,310,720 | 2,621,440 | 5,242,880 |
| 64 | 655,360 | 1,310,720 | 2,621,440 |
| 128 | 327,680 | 655,360 | 1,310,720 |
| 256 | 163,840 | 327,680 | 655,360 |
| 512 | 81,920 | 163,840 | 327,680 |

Figure 94:
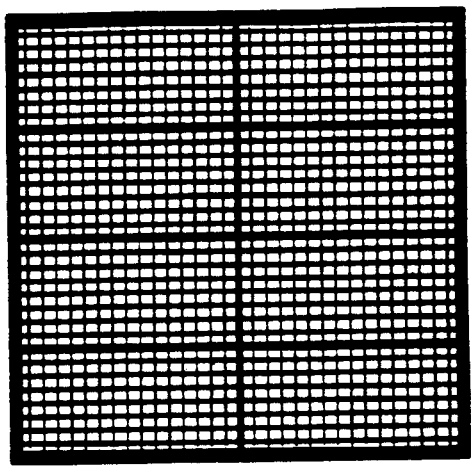
FIG. 94 illustrates an 8-bit per pixel display mapping.

FIGS. 94 through 202 show how the various pixel formats listed in Table 25 are processed in the Dual Pixel 3DRAM chip 110.

3.1 8-Bit Pixel Formats

FIGS. 94–99 show how 8-bit pixels can be processed by the Dual Pixel 3DRAM chip 110. For graphics rendered in 8-bit pixels, display refresh requires 1 byte/pixel, and 2-dimensional writes require 1 byte/pixel.

FIG. 94 shows a suggested display mapping of 8-bit pixels to lines 164 and lines 164 to pages 162.

Figure 95:
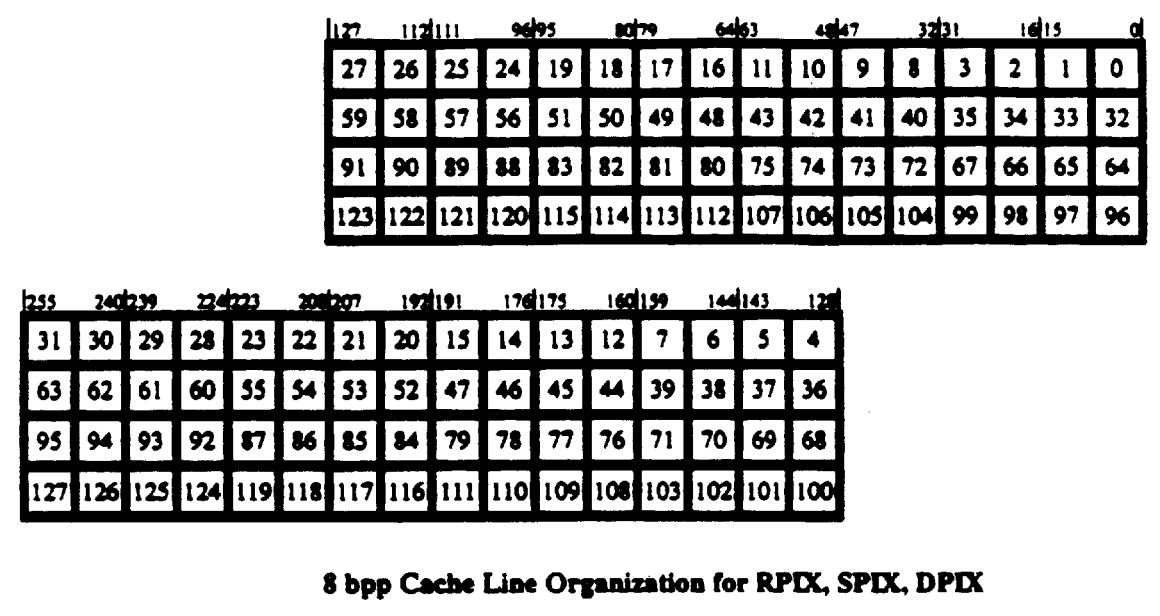

FIG. 95 shows a suggested cache line organization of 8-bit pixels for the RPIX, SPIX or DPIX operations.

FIG. 96 shows a suggested cache line organization of 8-bit pixels viewed using the RDAT operation.

Figure 97:
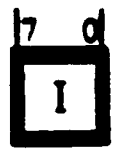
FIG. 97 illustrates an 8-bit per pixel format.
Figure 98:
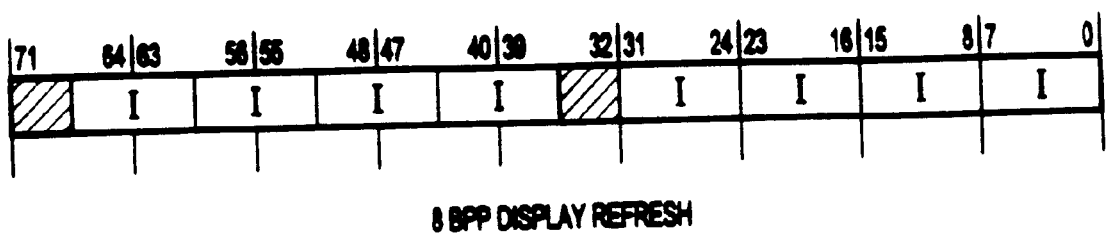
FIG. 98 is reserved.

FIG. 97 shows a suggested format for an 8-bit pixel, where "I" stands for an 8-bit index color which is used to address a 256-bit entry in the SRAM pixel buffer 118. Each entry has 8 bits for red, 8 bits for green and 8 bits for blue. With only 8 bits per pixel, this allows the programmer to select any 256 colors out of a possible 16,777,216 ($2^{24}$) colors.

Figures 99, 100:
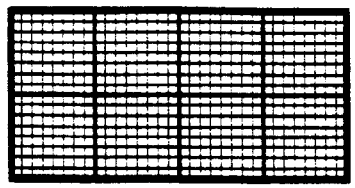
FIG. 99 illustrates an 8-bit per pixel display refresh.
FIG. 100 illustrates a 16-bit per pixel display mapping.

FIG. 99 shows how a display refresh operation of 8-bit pixels of the format specified in FIG. 97 requires a 2-cycle RPIX operation to transmit 8 pixels.

3.2 16-Bit Pixel Formats

FIG. 99–107 show how 16-bit pixels can be processed by the Dual Pixel 3DRAM chip 110. Display refresh requires 2 bytes/pixel. Two-dimensional raster operations require 2 bytes/pixel. 2-dimensional blend operations require 4 bytes/pixel.

FIG. 99 shows a suggested display mapping of 16-bit pixels to lines 164 and lines 164 to pages 162.

FIG. 100 shows a suggested cache line organization of 16-bit pixels for the RPIX, SPIX or DPIX operations.

FIG. 101 shows a suggested cache line organization of 16-bit pixels viewed using the RDAT operation.

FIG. 102 shows the following format for a 16-bit pixel: Alpha: 4, Red: 4, Green: 4, Blue: 4. Each of the alpha, red, green and blue components are represented in 4 bits.

FIG. 103 shows how a display refresh operation requires a 2-cycle RPIX operation to transmit four 16-bit pixels of the format specified in FIG. 102.

Figure 104:
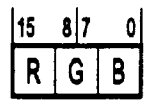
FIG. 104 is illustrates a 16-bit per pixel format: 5:6:5.

FIG. 104 shows the following alternative format for a 16-bit pixel: Red: 5, Green: 6, Blue: 5, where the red component is represented by 5 bits, the green component is represented by 6 bits and the blue component is represented by 5 bits. No alpha component is used in this pixel format.

Figure 105:
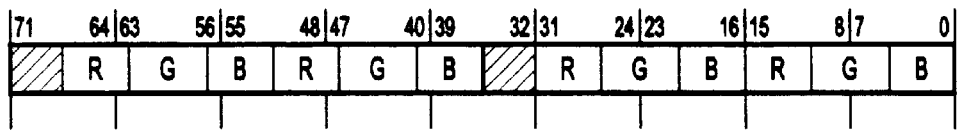
FIG. 105 illustrates a 16-bit per pixel display refresh: 5:6:5.
Figure 106:
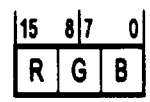
FIG. 106 illustrates a 16-bit per pixel format: 1:5:5:5.

FIG. 105 shows a display refresh operation which requires a 2-cycle RPIX operation to transmit four 16-bit pixels of the format specified in FIG. 106.

FIG. 106 shows the following alternative format for a 16-bit pixel: Alpha: 1, Red: 5, Green: 5, Blue: 5. The alpha pixel component is represented by 1 bit, and the red, green and blue pixel components are each represented by 5 bits.

Figure 107:
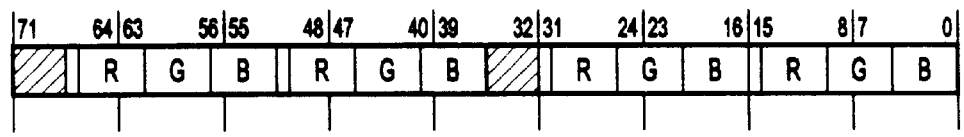
FIG. 107 is illustrates a 16-bit per pixel display refresh: 1:5:5:5.

FIG. 107 shows a display refresh operation which requires a 2-cycle RPIX operation to transmit four 16-bit pixels of the format specified in FIG. 106.

3.3 32-Bit Pixel Formats

FIGS. 108–114 show how 32-bit pixels can be processed by the Dual Pixel 3DRAM chip 110. Display refresh requires 4 bytes/pixel, and 2-dimensional writes require 4 bytes/pixel.

Figure 108:
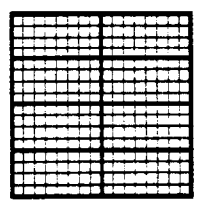
FIG. 108 illustrates a 32-bit per pixel display mapping.

FIG. 108 shows a suggested display mapping of 32-bit pixels to lines 164 and lines 164 to pages 162.

FIG. 109 shows a suggested cache line organization of 32-bit pixels for the RPIX, SPIX, or DPIX operations.

FIG. 110 shows a suggested cache line organization of 32-bit pixels viewed using RDAT operation.

Figure 111:
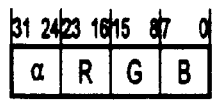
FIG. 111 illustrates a 32-bit per pixel format: 8:8:8:8.

FIG. 111 shows the following format for a 32-bit pixel: Alpha: 8, Red: 8, Green: 8, Blue: 8. Each of the alpha, red, green and blue pixel components are represented by 8 bits.

Figure 112:
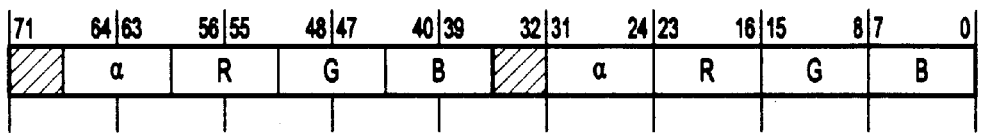
FIG. 112 illustrates a 32-bit per pixel display refresh: 8:8:8:8.

FIG. 112 shows how a display refresh operation requires a 2-cycle RPIX operation to transmit two 32-bit pixels of the format specified in FIG. 111.

Figure 113:
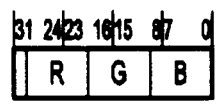
FIG. 113 illustrates a 32-bit per pixel format: 10:10:10:10.

FIG. 113 shows the following format for a 32-bit pixel: Red: 10, Green: 10, Blue: 10. Each of the red, green and blue pixel components is represented by 10 bits, and there is no alpha component.

Figure 114:
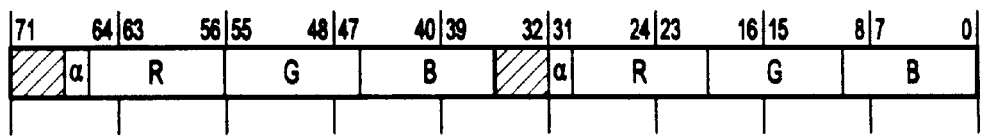
FIG. 114 illustrates a 32-bit per pixel display refresh: 2:10:10:10.

FIG. 114 shows how a display refresh operation requires a 2-cycle RPIX operation to transmit two 32-bit pixels of the format specified in FIG. 113.

3.4 64-Bit Pixel Formats

FIGS. 115–133 show how 64-bit pixels can be processed by the Dual Pixel 3DRAM 110. For 2-dimensional fill and display refresh operations, two pixels can be accessed in two cycles.

Display refresh requires four bytes/pixel, 2-dimensional render operations require four bytes/pixel, and 3-dimensional render operations require six bytes/pixel.

Figure 115:
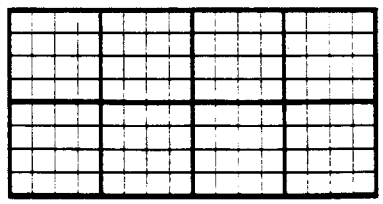
FIG. 115 illustrates a 64-bit per pixel display mapping.

FIG. 115 shows a suggested display mapping of 64-bit pixels to lines 164 and lines 164 to pages 162.

FIG. 116 shows a suggested cache line organization of 64-bit pixels for the RPIX, SPIX, or DPIX operations.

FIG. 117 shows a suggested cache line organization of 64-bit pixels viewed using RDAT.

FIG. 118 shows the following format for a 64-bit pixel: WID: 4, Alpha: 8, Red: 8, Green: 8, Blue: 8. Each of the alpha, red, green and blue pixel components are represented by 8 bits, and the Window ID is represented by 4 bits. This format does not support 3-dimensional applications.

FIG. 119 shows how a display refresh operation requires a 2-cycle RPIX operation to transmit two 64-bit pixels of the format specified in FIG. 118.

FIG. 120 shows the following format for a 64-bit pixel: WID: 4, Red: 10, Green: 10, Blue: 10. Each of the alpha, red, green and blue pixel components are represented by 10 bits. This format does not support 3-dimensional applications.

FIG. 121 shows how a display refresh operation requires a 2-cycle RPIX operation to transmit two 64-bit pixels of the format specified in FIG. 120.

FIG. 122 shows the following format for a 64-bit pixel: WID: 4, Depth/Stencil: 28, 2*(Alpha: 4, Red: 4, Green: 4, Blue: 4). This pixel format includes two sets of 4-bit alpha, red, green and blue pixel components, a 28-bit depth/stencil field and a 4-bit window ID field.

Figure 123:
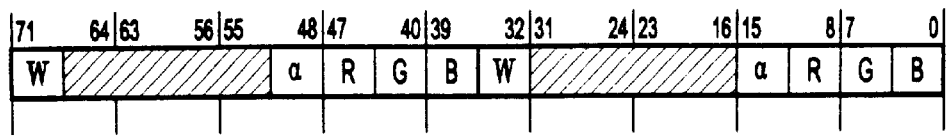

FIG. 123 shows that the display refresh sequence requires a 2-cycle RPIX operation to transmit two 64-bit pixels of the format specified in FIG. 122.

Figure 124:
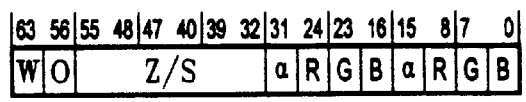

FIG. 124 shows the following format for a 64-bit pixel: WID: 4, Overlay: 4, Depth/Stencil: 24, 2*(Alpha: 4, Red: 4, Green: 4, Blue: 4). This pixel format includes two sets of 4-bit alpha, red, green and blue pixel components, a 24-bit depth/stencil field, a 4-bit overlay field and a 4-bit Window ID field.

Figure 125:
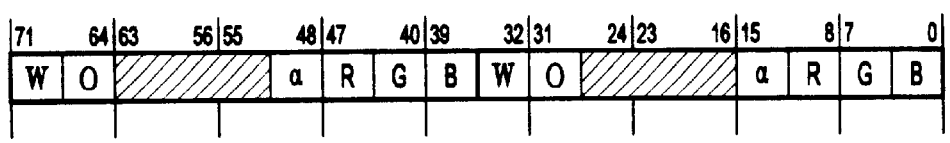

FIG. 125 shows how a display refresh operation requires a 2-cycle RPIX operation to transmit two 64-bit pixels of the format specified in FIG. 124.

Figure 126:
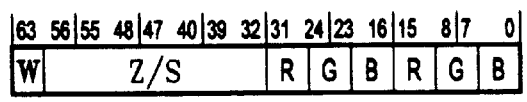

FIG. 126 shows the following format for a 64-bit pixel: WID: 4, Depth/Stencil: 28, 2*(Red: 5, Green: 6, Blue: 5). This pixel format includes two sets of 5-bit red, 6-bit green and 5-bit blue pixel components, a 28-bit depth/stencil field, and a 4-bit Window ID field.

Figure 127:
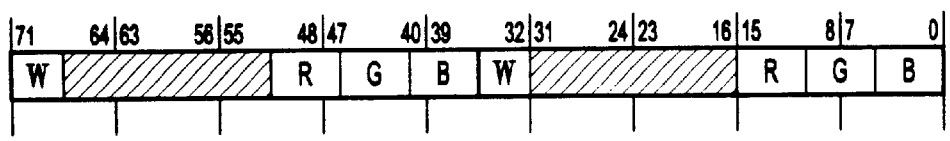

FIG. 127 shows how a display refresh requires a 2-cycle RPIX operation to transmit two 64-bit pixels of the format specified in FIG. 126.

FIG. 128 shows the following format for a 64-bit pixel: WID: 4, Overlay: 4, Depth/Stencil: 24, 2*(Red: 5, Green: 6, Blue: 5). This pixel format includes two sets of 5-bit red, 6-bit green and 5-bit blue pixel component fields, a 24-bit depth/stencil field, a 4-bit overlay field, and a 4-bit Window ID field.

FIG. 129 shows how a display refresh operation requires a 2-cycle RPIX operation to transmit two 64-bit pixels of the format specified in FIG. 128.

FIG. 130 shows the following format for a 64-bit pixel: WID: 4, Depth/Stencil: 28, 2*(Alpha: 1, Red: 5, Green: 5, Blue: 5). This format includes two sets of 5-bit fields for the red, green and blue pixel components, two sets of 1-bit fields for the alpha pixel components, a 28-bit depth/stencil field, and a 4-bit window ID field.

FIG. 131 shows how a display refresh requires a 2-cycle RPIX operation to transmit two 64-bit pixels of the format specified in FIG. 130.

FIG. 132 shows the following format for a 64-bit pixel: WID: 4, Overlay: 4, Depth/Stencil: 24, 2*(Alpha: 1, Red: 5, Green: 5, Blue: 5). This format includes two sets of 5-bit fields for the red, green and blue pixel components, two sets of 1-bit fields for the alpha pixel component, a 24-bit depth/stencil field, a 4-bit overlay field and a 4-bit window ID field.

FIG. 133 shows how a display refresh requires a 2-cycle RPIX operation to transmit two 64-bit pixels having the format specified in FIG. 132.

3.5 96-Bit Pixel Formats

FIGS. 134–148 show how 96-bit pixels can be processed by the Dual Pixel 3DRAM chip 110. In this pixel format, 56 bits of data per pixel are written, and 40 bits per pixel are displayed, which allows for packing of five pixels into eight cycles. Display refresh requires 6.4 bytes/pixel, 2-dimensional render operations require 4 bytes/pixel.

FIG. 134 shows a suggested display mapping of 96-bit pixels to lines 164 and lines 164 to pages 162.

FIG. 135 shows a suggested cache line organization of 96-bit pixels for the RPIX, SPIX, or DPIX operations.

FIG. 136 shows a suggested cache line organization of 96-bit pixels viewed using RDAT.

FIG. 137 shows one format for a 64-bit pixel: WID: 4, Depth/Stencil: 28, 2*(Overlay: 8, Red: 8, Green: 8, Blue: 8). This format includes two sets of 8-bit fields for overlay, red, green and blue pixel components, a 28-bit depth/stencil field, and a 4-bit window ID field.

FIG. 138 shows how a display refresh requires a 3-cycle RPIX operation to transmit two 96-bit pixels having the format specified in FIG. 137 or a 2-cycle RPIX operation to transmit one 96-bit pixel having the format specified in FIG. 137.

FIG. 139 shows the following format for a 96-bit pixel: WID: 4, Depth/Stencil: 28, 2*(Alpha: 8, Red: 8, Green: 8, Blue: 8). This format includes two sets of 8-bit fields for alpha, red, green and blue pixel components, a 28-bit depth/stencil field, and a 4-bit window ID field.

FIG. 140 shows how display refresh of the 96-bit pixel format specified in FIG. 139 requires a 3-cycle RPIX operation to transmit two pixels, or a 2-cycle RPIX operation to transmit one pixel.

FIG. 141 shows the following format for a 96-bit pixel: WID: 4, Overlay: 4, Depth/Stencil: 24, 2*(Alpha: 8, Red: 8, Green: 8, Blue: 8). This format includes two sets of 8-bit fields for alpha, red, green and blue pixel components, a 24-bit depth/stencil field, a 4-bit overlay field and a 4-bit window ID field.

FIG. 142 shows how display refresh of the 96-bit pixel format specified in FIG. 141 requires a 3-cycle RPIX operation to transmit two pixels, or a 2-cycle RPIX operation to transmit one pixel.

FIG. 143 shows the following format for a 96-bit pixel: WID: 4, Depth/Stencil: 28, 2*(Red: 10, Green: 10, Blue: 10). This format includes two sets of 10-bit fields of red, green and blue pixel components, a 28-bit depth/stencil field and a 4-bit window ID field.

FIG. 144 shows how display refresh of the 96-bit pixel format specified in FIG. 143 requires a 3-cycle RPIX operation to transmit two pixels, or a 2-cycle RPIX operation to transmit one pixel.

FIG. 145 shows the following format for a 96-bit pixel: WID: 4, Overlay: 4, Depth/Stencil: 24, 2*(Red: 10, Green: 10, Blue: 10). This format includes two sets of 10-bit fields of red, green and blue pixel components, a 24-bit depth/stencil field, a 4-bit overlay field, and a 4-bit window ID field.

FIG. 146 shows how display refresh of the 96-bit pixel format specified in FIG. 145 requires a 3-cycle RPIX operation to transmit two pixels, or a 2-cycle RPIX operation to transmit one pixel.

FIG. 147 shows the following format for a 96-bit pixel: WID: 4, Overlay: 4, Depth/Stencil: 24, 4*(Alpha: 4, Red: 4, Green: 4, Blue: 4). This format includes four sets of 4-bit fields of alpha, red, green and blue pixel components, a 24-bit depth/stencil field, a 4-bit overlay field, and a 4-bit window ID field.

FIG. 148 shows how display refresh of the 96-bit pixel format specified in FIG. 147 requires a 3-cycle RPIX operation to transmit two pixels, or a 2-cycle RPIX operation to transmit one pixel.

3.6 128-Bit Pixel Formats

FIGS. 149–157 show how 128-bit pixels can be processed by the Dual Pixel 3DRAM chip 110. At this depth, 64 bits per pixel are written, and 48 bits per pixel are displayed so 4 pixels can be packed into 3 cycles. To enhance 2-dimensional performance, pixels may be updated at a rate of 2 pixels per cycle. Display refresh requires 6 bytes/pixel, 2-dimensional render operations require 4 bytes/pixel. Every 128-bit pixel format has an 8-bit WID field at a consistent location.

FIG. 149 shows a suggested display mapping of 128-bit pixels to lines 164 and lines 164 to pages 162.

FIG. 150 shows a suggested cache line organization of 128-bit pixels for the RPIX, SPIX or DPIX operations.

FIG. 151 shows a suggested cache line organization of 128-bit pixels viewed using the RDAT operation.

FIG. 152 shows the following format for a 128-bit pixel: WID: 8, Depth: 32, Stencil: 8, 2*(Overlay: 8, Alpha: 8, Red: 8, Green: 8, Blue: 8). This format includes two sets of 8-bit fields for overlay, alpha, red, green and blue pixel components, an 8-bit stencil field, a 32-bit depth field, and an 8-bit window ID field.

FIG. 153 shows how display refresh of the 128-bit pixel format specified in FIG. 152 requires a 3-cycle RPIX operation to transmit two pixels.

FIG. 154 shows the following format for a 128-bit pixel: WID: 8, Depth: 32, Stencil: 8, 2*(Overlay: 8, Red: 10, Green: 10, Blue: 10). This format includes two sets of 10-bit fields for red, green, and blue pixel components, two sets of 8-bit fields for overlay, an 8-bit stencil field, a 32-bit depth field, and an 8-bit window ID field.

FIG. 155 shows how display refresh of 128-bit pixels having the format specified in FIG. 154 requires a 3-cycle RPIX operation to transmit two pixels.

FIG. 156 shows the following format for a 128-bit pixel: WID: 8, Stencil: 8, Depth: 32, 2*(Alpha: 10, Red: 10, Green: 10, Blue: 10). This format includes two sets of 10-bit fields for alpha, red, green and blue pixel components, a 32-bit depth field, an 8-bit stencil field, and an 8-bit window ID field.

FIG. 157 shows that display refresh of 128-bit pixels having the format specified in FIG. 156 requires a 3-cycle RPIX operation to transmit 2 pixels.

3.7 Multi-Sample Polygon Anti-Aliasing Pixels having formats of 256 bits or 512 bits support multi-sample polygon anti-aliasing render operations. A discussion of several polygon anti-aliasing algorithms, focusing on their relative advantages, follows:

3.7.1 Accumulation Buffer

This algorithm accumulates multiple aliased images to produce a final anti-aliased image. Each aliased image is rendered with a different subpixel offset in X and Y. The final aliased image is added to the current contents of the accumulation buffer. After all of the aliased images are rendered and accumulated, the pixel components in the accumulation buffer are divided by the number of accumulated images to produce the final anti-aliased image.

The accumulation buffer is a very flexible technique that can accommodate motion blur, depth of field, and soft shadows in addition to polygon anti-aliasing.

While the quality and flexibility of the accumulation buffer are outstanding, this technique takes too much time to produce the final anti-aliased image, and thus may be suitable for high frame rate applications.

A detailed discussion of this technique is provided in the following publication, which is incorporated herein by reference: Haeberli, Paul, K. Akeley, "The Accumulation Buffer: Hardware Support for High-Quality Rendering," Computer Graphics, Vol. 24, No. 4, August 1990, pp. 309–318

3.7.2 A buffer

This algorithm maintains a sorted list of polygon fragments for each pixel. If a triangle fully covers a pixel and is fully opaque, all of the fragments behind it can be thrown away. Otherwise, the fragment is inserted into the list at the appropriate place. At a minimum, each fragment has the following components: color, depth, pixelmask, and a pointer to the next fragment. After the entire frame has been rendered, an additional pass is needed to resolve every pixel's fragment list into a final color.

The A buffer algorithm is very good at rendering transparent triangles correctly, even when they are not sorted by depth. The A buffer algorithm is usually poor at handling cases where triangles intersect each other, unless a significant amount of additional information is stored in each fragment. The main disadvantage of the A buffer algorithm is that it requires an unlimited amount of storage and processing per pixel. The frame buffer storage required is roughly proportional to the number of polygons in a frame.

A detailed discussion of this technique is provided in the following publication, which is incorporated herein by reference: Carpenter, Loren, "The A-buffer, an Anti-aliased Hidden Surface Method," Computer Graphics, Vol. 18, No. 3, July 1984, pp. 103–108.

3.7.3 Multi-sample

Multi-sample anti-aliasing stores several samples per pixel. Each sample is positioned at a different location within or near the pixel. A sample stores either color, or color, depth, and stencil information. When a pixel is rendered, the samples that are inside the triangle are calculated and merged with the samples in the frame buffer. After the entire frame is rendered, a weighted average of all of the sample colors is sent to the display.

FIG. 158 shows two pixels and the locations of each sample within each pixel. Samples within the current triangle are solid, while those outside the triangle are hollow.

Multi-sample anti-aliasing requires a fixed amount of storage per pixel, regardless of the number of triangles rendered per frame. This technique requires almost no API changes for OpenGL or DirectX; all that is needed is some way of enabling or disabling the anti-aliasing feature.

A detailed discussion of this technique is provided in the following publication, which is incorporated herein by reference: Akeley, Kurt, "RealityEngine Graphics," Computer Graphics, August 1993, pp. 109–116

3.7.3.1 Only Color Per Sample

In this case, each pixel has storage for WID, stencil, depth, back color, front color, and each sample has storage for color. The rendering controller 102 sends a common pixel color, a common pixel depth, and one bit per sample to indicate whether the sample is inside the triangle or not. Triangle edges are anti-aliased correctly; however triangle intersections will be aliased because the pixel stores only one depth value, as described by the verilog code below.

```
if WID test passes {
   update stencil
   if stencil and depth tests pass {
      colorsum=0
      for each sample {
         if sample is inside triangle
            merge source color with sample's color
         colorsum.+=sample's color
      }
      back color=colorsum/# of samples
      overwrite depth
   }
}
```

3.7.3.2 Color and Depth Per Sample

In this case, each pixel has storage for WID, back color, front color, and each sample has storage for color, depth, and stencil. The rendering controller 102 sends a common pixel color, a different depth value per sample, and one bit per sample to indicate whether the sample is inside the triangle or not. Both triangle edges and intersections will be anti-aliased correctly, as described by the verilog code below:

```
if WID test passes {
   colorsum=0
   for each sample {
      if sample is inside triangle {
         update sample stencil
         if sample's stencil and depth tests pass {
            merge source color with sample color
            overwrite sample depth
         }
      }
      colorsum+=sample color
   }
   back color=colorsum/# of samples
}
```

3.7.4 Accelerating Color and Depth Per Sample

Depth values are usually calculated as a linear function of X and Y as follows:

$$Depth\ (X, Y) = \frac{dDepth}{dX} X + \frac{dDepth}{dY} Y + Depth\ (0, 0)$$

The equation can be rewritten in the following form which is more useful:

$$Depth\ (X + \Delta X, Y + \Delta Y) = Depth\ (X, Y) + \frac{dDepth}{dX} \Delta X + \frac{dDepth}{dY} \Delta Y$$

Usually, sample locations within a pixel are located at the same offset in X and Y from the center, corner or a fixed reference point within the pixel, as illustrated in FIG. 182.

If the depth at the center of the pixel (or some other reference point) is known, the depth of sample n can be calculated by:

$$Depth\ (X + \Delta X_n, Y + \Delta Y_n) = Depth\ (X, Y) + \frac{dDepth}{dX}\Delta X_n + \frac{dDepth}{dY}\Delta Y_n$$

This calculation can be done in two steps:

$$\Delta Depth_n = \frac{dDepth}{dX}\Delta X_n + \frac{dDepth}{dY}\Delta Y_n$$

$$Depth(X+\Delta X_n, Y+\Delta Y_n) = Depth(X, Y) + \Delta Depth_n$$

The terms $$\frac{dDepth}{dX} \text{ and } \frac{dDepth}{dY}$$

are the same for all of the pixels in the same triangle. Thus, the $\Delta Depth_n$ terms are the same for all of the pixels in the same triangle as well.

It is possible to calculate all of the $\Delta Depth_n$ terms for each sample once per triangle, and transmit them to the Dual Pixel 3DRAM's Pixel ALUs as register writes before rendering the first pixel in the triangle. Then for each pixel in the triangle, only the color and depth value at the center of the pixel (or some other reference point) is transmitted. The depth value at each sample is calculated using:

$$Depth(X+)X_n, Y+)Y_n) = Depth(X, Y) + )Depth_n.$$

If each sample has a dedicated depth adder, depth comparator, and color blend unit in the Dual Pixel 3DRAM's pixel ALUs, it would be possible to render an entire anti-aliased pixel in one operation. The Dual Pixel 3DRAM chip 110 has such capabilities.

3.8 256-Bit Pixel Formats (4× Multisample)

FIGS. 160–165 show how 256-bit pixels can be processed by the Dual Pixel 3DRAM chip 110. In addition to a 128-bit pixel, the chip 110 can store four subsamples per pixel. To write a pixel, it sends color and depth values, and a 4-bit sample mask. If the Pixel ALUs can process two samples per cycle, the chip 110 can update each pixel in two cycles. While a pixel is being updated, all four sample color values are accumulated and then written to the A or B color buffer.

Multisample antialiasing is easier to implement than A-buffer based antialiasing. Multisample requires a large but finite amount of storage per pixel, a fixed amount of time to update pixels, and does not require a fragment resolve processing stage between rendering a frame and displaying the frame. When the triangle rate is several million per second, most pixels will have partial coverage, and the A-buffer fill rate will go down while fragment storage requirements will increase significantly.

Display refresh requires 8 bytes/pixel, 2-dimensional render requires four bytes/pixel and 3-dimensional render requires 9 bytes/pixel.

Every 256-bit pixel format has an 8-bit WID field at a consistent location. All render formats require two-cycle SPIX or two-cycle DPIX operations. Display refresh requires a two-cycle RPIX operation to transmit one pixel.

FIG. 160 shows a suggested display mapping of 256-bit pixels to lines 164 and lines 164 to pages 162.

FIG. 161 shows a suggested cache line organization of 256-bit pixels for the RPIX, SPIX and DPIX operations.

FIG. 162 shows a suggested cache line organization of 256-bit pixels viewed using the RDAT operation.

FIG. 163 shows one format for a 256-bit pixel: WID:8, Stencil:8, Depth:32, 2*(Overlay:8, Alpha:8, Red:8, Green:8, Blue:8), 4*(Alpha:8, Red:8, Green:8, Blue:8). This format includes 8-bit fields for Window ID and stencil, a 32-bit field for Depth, 2 sets of 8-bit fields of Overlay, Alpha, Red, Green and Blue pixel components, and then four samples of color comprising 8-bit components of Alpha, Red, Green and Blue.

FIG. 164 shows how display refresh of the 256-bit pixel format specified in FIG. 183 requires a 2-cycle RPIX operation to transmit one pixel.

FIG. 165 shows the SRAM read/write format for the 256-bit pixel format.

3.9 512-Bit Pixel Formats (6× Multisample)

FIGS. 166–174 show how 512-bit pixels can be processed by the Dual Pixel 3DRAM chip 110. This pixel format supports 6× multi-sampling operations. In this format, 6 sub-samples per pixel are stored in addition to a 128-bit pixel. To write a pixel, a common color value is first transmitted, followed by 6 depth values. If the Pixel ALUs can process two samples per cycle, each pixel can be updated in eight cycles. While a pixel is being updated, all 6 sample color values are accumulated and then written to the A or B color buffer.

Multi-sampled anti-aliasing is easier to implement than A-buffer based anti-aliasing. Multi-sampling requires a large, but finite amount of storage per pixel, a fixed amount of time to update pixels, and does not require a fragment resolve stage between rendering a frame and displaying the frame. The multi-sampling technique anti-aliases interpenetrating surfaces. Enhancing A-buffer to anti-alias interpenetrating surfaces is expensive. When the triangle rate is several million per second, most pixels will have partial coverage, and the A-buffer fill rate will go down, while fragment storage requirements will increase significantly.

Display refresh requires 8 bytes/pixel, 2-dimensional render operations require 4 bytes/pixel, and 3-dimensional render operations require 32 bytes/pixel.

Every 512 bit pixel format has an 8-bit WID field at a consistent location.

FIG. 166 shows a suggested display mapping of 512-bit pixels to lines 164 and lines 164 to pages 162.

FIG. 167 shows a suggested cache line organization of 512-bit pixels for the RPIX, SPIX or DPIX operations.

FIG. 168 shows a suggested cache line organization of 512-bit pixels viewed using the RDAT operation.

FIG. 169 shows one format for a 512-bit pixel: WID: 8, 2*(Overlay: 8, Alpha: 8, Red: 8, Green: 8, Blue: 8), 6*(alpha: 8, Red: 8, Green: 8, Blue: 8, Stencil/Depth: 32). This format includes six samples of the pixel where each sample has 8-bit fields for alpha, red, green and blue pixel components, and a 32-bit field for depth/stencil, two sets of 8-bit fields for overlay, alpha, red, green and blue pixel components, and an 8-bit window ID.

FIG. 170 shows how display refresh of the 512-bit pixel format specified in FIG. 169 requires a 2-cycle RPIX operation to transmit one pixel.

FIG. 171 shows the read format to, and the write format from the SRAM pixel buffer 118 for 512-bit pixels of the format specified in FIG. 169.

FIG. 172 shows the following format for a 512-bit pixel: WID: 8, 2*(Overlay: 8, Red: 10, Green: 10, Blue: 10), 6*(Red: 10, Green: 10, Blue: 10, Stencil/Depth: 32). This format includes six samples of the pixel where each sample has 10-bit fields for red, green and blue pixel components, and a 32-bit field for depth/stencil, two sets of 10-bit fields for red, green and blue pixel components, two sets of an 8-bit field for overlay, and an 8-bit window ID.

FIG. 173 shows how display refresh of the 512-bit pixel format specified in FIG. 172 requires a 2-cycle RPIX operation to transmit one pixel.

FIG. 174 shows the read format to, and the write format from the SRAM pixel buffer 118 for 512-bit pixels of the format specified in FIG. 172.

4.0 Bidirectional I/O

Viable implementations of high-speed simultaneous bidirection signalling have recently been implemented. This technology allows data to be transmitted in both directions over a single wire connecting two devices at Gigabit speeds. This section shows how this I/O technology can be applied to Dual Pixel 3DRAM devices to either increase performance or lower cost. A detailed description of the high-speed, simultaneous bidirectional signalling disclosed is presented in the following publication, which is incorporated herein by reference: Haycock, M., Mooney, R., "A 2.5 Gb/s Bidirectional Signaling Technology," Hot Interconnects Symposium V, August 1997, pp. 149–156.

FIG. 175 illustrates a scheme which improves performance by sending display refresh data over the control/address pins instead of time sharing the data pins. The display refresh path requires a state machine to generate control and address information for fetching display refresh information. The traffic on the data pins will usually be unidirectional.

FIG. 176 illustrates a scheme which allows the pixel ALU to be moved to the rendering controller. The data pins allow for the simultaneous transmission of source and result pixel data. Control/address information and display refresh data share the same set of pins.

What is claimed is:

1. A method for compressing pixel data transmitted from a controller to a memory, the method comprising the steps of:

storing in both the controller and the memory old pixel data corresponding to a plurality of old pixels, which old pixel data comprises a set of old pixel components for each old pixel represented by the old pixel data;

calculating, in the controller, new pixel data for a plurality of new pixels, which new pixel data comprises a set of new pixel components for each new pixel represented by the new pixel data;

calculating, in the controller, the differences between certain pixel components of the new pixel data and certain pixel components of the old pixel data;

calculating, in the controller, the differences of the previously calculated differences between certain pixel components of the new pixel data and certain pixel components of the old pixel data;

determining, in the controller, a compression format based on the calculated differences and the calculated differences of the differences;

compressing the new pixel data by formatting the calculated differences and the calculated differences of the differences into the determined compression format in the controller;

transmitting the compressed new pixel data from the controller to the memory; and decompressing the new pixel information within the memory.

2. The method of claim 1 whereby the step of calculating, in the controller, new pixel data for a plurality of new pixels, which new pixel data comprises a set of new pixel components for each new pixel represented by the new pixel data comprises the step of sign-extending the difference values to the widths of the original pixel data from which they were calculated.

3. The method of claim 1 whereby the step of decompressing the new pixel information within the memory comprises the steps of:

extracting the calculated differences and the calculated differences of differences from a plurality of data formats;

sign-extending the extracted differences and differences of differences to data widths which correspond to the corresponding old pixel components;

recovering the new pixel components by adding the sign-extended differences and differences of differences to the stored old pixel components; and formatting the pixel data.

* * * * *